US009998251B2

(12) United States Patent
Nair et al.

(10) Patent No.: US 9,998,251 B2
(45) Date of Patent: Jun. 12, 2018

(54) METHOD AND SYSTEM FOR SELECTING SPREADING SEQUENCES WITH VARIABLE SPREADING FACTORS

(71) Applicant: Samsung Electronics Co., Ltd., Suwon-si (KR)

(72) Inventors: Jinesh Parameshwaran Nair, Bangalore (IN); Young Jun Hong, Suwon-si (KR); Chang Soon Park, Suwon-si (KR); Sujit Jos, Bangalore (IN); Young Soo Kim, Suwon-si (KR); Manoj Choudhary, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/033,391

(22) PCT Filed: Oct. 22, 2014

(86) PCT No.: PCT/KR2014/009928
§ 371 (c)(1),
(2) Date: Apr. 29, 2016

(87) PCT Pub. No.: WO2015/064949
PCT Pub. Date: May 7, 2015

(65) Prior Publication Data
US 2016/0261359 A1    Sep. 8, 2016

(30) Foreign Application Priority Data

Oct. 30, 2013    (IN) ............................ 4895/CHE/2013
Sep. 29, 2014    (IN) ............................ 4895/CHE/2013

(51) Int. Cl.
*H04J 13/10*    (2011.01)
*H04B 1/707*    (2011.01)
(Continued)

(52) U.S. Cl.
CPC ............ *H04J 13/16* (2013.01); *H04B 1/0475* (2013.01); *H04B 1/7097* (2013.01);
(Continued)

(58) Field of Classification Search
CPC .... H04J 13/0044; H04J 13/0011; H04J 13/10; H04J 13/12; H04J 13/20; H04J 13/0022; H04L 25/4923; H04L 27/04
See application file for complete search history.

(56) References Cited

U.S. PATENT DOCUMENTS 6,798,825 B1    9/2004 Horne
2002/0024455 A1    2/2002 Abbiate et al.
(Continued)

FOREIGN PATENT DOCUMENTS

EP    1063780 A2    12/2000

OTHER PUBLICATIONS

IEEE P802.15-13-0623-00-004q, IEEE P802.15 Working Group for Wireless Personal Area Networks (WPANs), Samsung physical layer proposal, Oct. 31, 2013.*
(Continued)

*Primary Examiner* — Aristocratis Fotakis
(74) *Attorney, Agent, or Firm* — NSIP Law

(57) ABSTRACT

Embodiments herein achieve a method and system for selecting non-coherent spreading sequences with binary alphabets {0, 1} with variable spreading factors. The method generates circular shift equivalent sets of spreading sequences by circularly shifting base sequences with elements {1, 0} and having at least one variable spreading factor. The method determines whether each spreading sequence in the circular shift equivalent set meets pre-defined spreading sequence criteria. The spreading sequence criteria comprise balanced criteria, a non-repetition criteria, non-circular criteria, and conjugate criteria. Furthermore,
(Continued)

the method selects the spreading sequence from expansions of at least one spreading sequence from the circular shift equivalent sets in response to determining that the spreading sequences in the circular shift equivalent sets meets the pre-defined spreading sequence criteria.

57 Claims, 27 Drawing Sheets

(51) Int. Cl.

| | | |
|---|---|---|
| *H04B 1/04* | (2006.01) | |
| *H04J 13/00* | (2011.01) | |
| *H04L 27/04* | (2006.01) | |
| *H04J 13/16* | (2011.01) | |
| *H04L 25/49* | (2006.01) | |
| *H04B 1/7097* | (2011.01) | |

(52) U.S. Cl.
CPC ....... *H04J 13/0011* (2013.01); *H04J 13/0022* (2013.01); *H04J 13/10* (2013.01); *H04J 13/107* (2013.01); *H04L 25/4923* (2013.01); *H04L 27/04* (2013.01); *H04B 2201/70707* (2013.01); *H04B 2201/709709* (2013.01); *H04J 13/0044* (2013.01)

(56) References Cited

U.S. PATENT DOCUMENTS

| | | | |
|---|---|---|---|
| 2006/0056360 A1* | 3/2006 | Parkvall | H04B 1/7103 370/335 |
| 2006/0098679 A1* | 5/2006 | Cheng | H04J 13/00 370/441 |
| 2007/0019710 A1 | 1/2007 | Lakkis | |
| 2008/0137617 A1* | 6/2008 | Michel | H04J 13/10 370/335 |
| 2008/0207152 A1 | 8/2008 | Welborn | |
| 2008/0247442 A1 | 10/2008 | Orlik et al. | |
| 2009/0285326 A1 | 11/2009 | Lablans | |
| 2009/0303089 A1* | 12/2009 | Chin | H04B 1/71632 341/57 |
| 2010/0158087 A1 | 6/2010 | Chin | |
| 2010/0309875 A1 | 12/2010 | Flury et al. | |
| 2011/0150044 A1 | 6/2011 | Rousseaux et al. | |
| 2012/0275385 A1 | 11/2012 | Dick et al. | |
| 2013/0136119 A1* | 5/2013 | Hund | H04B 1/7183 370/350 |
| 2014/0301257 A1* | 10/2014 | Bebawy | H04W 52/0212 370/311 |
| 2015/0063424 A1* | 3/2015 | Jos | H04B 1/69 375/130 |
| 2015/0256289 A1* | 9/2015 | Emami | H04L 1/0041 714/776 |
| 2016/0323056 A1* | 11/2016 | Park | H04J 13/0011 |

OTHER PUBLICATIONS

Sujit Jos, Jinesh P. Nair, Debarati Sen and Arun Naniyat, "Method of Generating Multiple Sets of Orthogonal Codes with Wide Choice of Spreading Factors", Samsung and Chalmers University of Technology, Sweden, Jul. 9, 2012, IEEE.*

Dong Li and Jiang Feibo, "Design of the DS-UWB communication system based on Chaotic Variable Spreading Factor", Hunan International Economics University, China, 2011, IEEE.*

Zhongding Lei, Francois Chin and Yuen-Sam Kwok, "UWB ranging with energy detectors using ternary preamble sequences", Institute for Infocomm Research, Singapore, 2006, IEEE.*

H. Donelan and T. O'Farrell, "Method for generating sets of orthogonal sequences", Electronics Letters, Sep. 2, 1999 vol. 35 No. 78.*

Huang, Xiaojing, and Yunxin Li. "The Multicode Interleaved DSSS System for High Speed Wireless Digital Communications." *Communications, 2001. ICC 2001. IEEE International Conference on.* vol. 10. IEEE, 2001. (6 pages, in English).

Supplementary European Search Report dated Feb. 23, 2017 in counterpart European Patent Application No. 14858036.8 (8 pages, in English).

Huang et al. "Incoherent Hybrid Spectral Polarization and Amplitude Coding Implemented with Specified Orthogonal Ternary Code Over Balanced Photo-Detectors," *Communication Networks and Services Research Conference, 2006. CNSR 2006. Proceedings of the 4th Annual.* IEEE, 2006.

Park et al. "Impulse Based TOA Estimation Method Using Non-Periodic Transmission Pattern in LR-WPAN." *The Journal of Korean Institute of Communications and Information Sciences* 33.4A (2008): 352-360.

Mitra, Abhijit. "On Pseudo-Random and Orthogonal Binary Spreading Sequences," *Int. J. Information Techn* 4.2 (2008): 137-144.

\* cited by examiner

Fig. 15

| Format | Spreading Factor | | | Preamble Sequence $p_0 p_1 ... p_{31}$ | | | | | | | | | | | | | | | | | | | | | | | | | | | | | | | | Number of -1 | Number of +1 |
|---|---|---|---|---|---|---|---|---|---|---|---|---|---|---|---|---|---|---|---|---|---|---|---|---|---|---|---|---|---|---|---|---|---|---|---|---|---|
| | | Total Length [bits] | Repetition Factor $N_{rep}$ | $p_0$ | $p_1$ | $p_2$ | $p_3$ | $p_4$ | $p_5$ | $p_6$ | $p_7$ | $p_8$ | $p_9$ | $p_{10}$ | $p_{11}$ | $p_{12}$ | $p_{13}$ | $p_{14}$ | $p_{15}$ | $p_{16}$ | $p_{17}$ | $p_{18}$ | $p_{19}$ | $p_{20}$ | $p_{21}$ | $p_{22}$ | $p_{23}$ | $p_{24}$ | $p_{25}$ | $p_{26}$ | $p_{27}$ | $p_{28}$ | $p_{29}$ | $p_{30}$ | $p_{31}$ | | |
| | | | [chips] | | | | | | | | | | | | | | | | | | | | | | | | | | | | | | | | | | | |
| P1 | 2 | 32 | 64 | 2 | -1 | 0 | -1 | 0 | +1 | 0 | +1 | 0 | -1 | 0 | -1 | 0 | +1 | 0 | -1 | 0 | +1 | 0 | +1 | 0 | +1 | 0 | -1 | 0 | -1 | 0 | +1 | 0 | -1 | 0 | -1 | 0 | 9 | 7 |
| P2 | 4 | 32 | 128 | 4 | +1 | 0 | 0 | +1 | +1 | 0 | 0 | +1 | +1 | 0 | 0 | +1 | +1 | 0 | 0 | -1 | -1 | 0 | 0 | +1 | +1 | -1 | 0 | 0 | +1 | -1 | 0 | 0 | +1 | -1 | 0 | 0 | -1 | 6 | 10 |
| P3 | 8 | 32 | 256 | 8 | +1 | 0 | -1 | 0 | 0 | -1 | 0 | -1 | +1 | 0 | +1 | 0 | 0 | -1 | 0 | +1 | +1 | 0 | +1 | 0 | 0 | -1 | 0 | +1 | -1 | 0 | +1 | 0 | 0 | +1 | 0 | +1 | | 6 | 10 |
| P4 | 16 | 32 | 512 | 16 | -1 | 0 | -1 | 0 | -1 | 0 | -1 | 0 | 0 | -1 | 0 | +1 | 0 | +1 | 0 | -1 | -1 | 0 | +1 | 0 | -1 | 0 | +1 | 0 | 0 | +1 | 0 | +1 | 0 | -1 | 0 | -1 | 10 | 6 |

Fig. 16

| Format | Spreading Factor | | Spreading Sequence $c_0 c_1 ... c_{N\_sfd-1}$ | | | | | | | | | | | | | | | | Number of -1 | Number of +1 |
|---|---|---|---|---|---|---|---|---|---|---|---|---|---|---|---|---|---|---|---|---|
| | $N_{sfd}$ | $b_0$ | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | | |
| S1 | 2 | 0 | +1 | 0 | | | | | | | | | | | | | | | 0 | 1 |
| | | 1 | 0 | -1 | | | | | | | | | | | | | | | 1 | 0 |
| S2 | 4 | 0 | +1 | 0 | 0 | +1 | | | | | | | | | | | | | 0 | 2 |
| | | 1 | 0 | -1 | -1 | 0 | | | | | | | | | | | | | 2 | 0 |
| S3 | 8 | 0 | +1 | 0 | -1 | 0 | 0 | -1 | 0 | +1 | | | | | | | | | 2 | 2 |
| | | 1 | 0 | -1 | 0 | +1 | +1 | 0 | -1 | 0 | | | | | | | | | 2 | 2 |
| S4 | 16 | 0 | +1 | 0 | -1 | 0 | -1 | 0 | +1 | 0 | 0 | +1 | 0 | -1 | 0 | -1 | 0 | +1 | 4 | 4 |
| | | 1 | 0 | -1 | 0 | +1 | 0 | +1 | 0 | -1 | -1 | 0 | +1 | 0 | +1 | 0 | -1 | 0 | 4 | 4 |

| Proposal Format | | | 2.4 GHz Channel | | | Modulation | | | | | Interleaving | Coding | | |
|---|---|---|---|---|---|---|---|---|---|---|---|---|---|---|
| Preamble | SFD Sequence | Payload | Chip Rate | Maximum Symbol Rate | Minimum Symbol Rate | Spreading Sequence | Bits-per-Symbol | Chips-per-Symbol | Spreading Factor | Duty Cycle | Interleaver Depth | Code Rate | Shortening Bit | Forward Error Correction |
| | | | [Mcps] | [kbps] l=0 | [kbps] l=50 | | M | L | | | d | r | | |
| P2 | S2 | D1 | 1 | 809.5 | 76.9 | 1/1-OOK | 1 | 1 | 1 | 1/2 | 1 or 2 or 3 | (51-l)/(63-l) | — | (63, 51, 2) BCH |
| P2 | S2 | D2 | 1 | 404.8 | 38.5 | 1/2-OOK | 1 | 2 | 2 | 1/2 | 1 | | | |
| P3 | S3 | D3 | 1 | 404.8 | 38.5 | 2/4-SPPM | 2 | 4 | 2 | 1/4 | 2 | | | |
| P3 | S3 | | 1 | 303.6 | 28.8 | 3/8-MPPM | 3 | 8 | 8/3 = 2.67 | 1/2 | 3 | | | |
| P3 | S3 | D4 | 1 | 303.6 | 28.8 | 3/8-SPPM | 3 | 8 | 8/3 = 2.67 | 1/8 | 3 | | | |
| P3 | S3 | D5 | 1 | 202.4 | 19.2 | 1/4-OOK | 1 | 4 | 4 | 1/2 | 1 | | | |
| P3 | S3 | | 1 | 202.4 | 19.2 | 4/16-MPPM | 4 | 16 | 4 | 1/2 | 4 | | | |
| P4 | S4 | D6 | 1 | 202.4 | 19.2 | 4/16-SPPM | 4 | 16 | 4 | 1/16 | 4 | | | |
| P4 | S4 | D7 | 1 | 126.5 | 12.0 | 5/32-MPPM | 5 | 32 | 32/5 = 6.4 | 1/2 | 5 | | | |
| | | | 1 | 101.2 | 9.6 | 1/8-OOK | 1 | 8 | 8 | 1/2 | 1 | | | |
| | | | 1 | 50.6 | 4.8 | 1/16-OOK | 1 | 16 | 16 | 1/2 | 1 | | | |
| P2 | | D1 | 2 | 1619.0 | 153.8 | 1/1-OOK | 1 | 1 | 1 | 1/2 | 1 or 2 or 3 | (51-l)/(63-l) | — | (63, 51, 2) BCH |
| P2 | | D2 | 2 | 809.5 | 76.9 | 1/2-OOK | 1 | 2 | 2 | 1/2 | 1 | | | |
| P2 | | D3 | 2 | 809.5 | 76.9 | 2/4-SPPM | 2 | 4 | 2 | 1/4 | 2 | | | |
| P3 | | | 2 | 607.1 | 57.7 | 3/8-MPPM | 3 | 8 | 8/3 = 2.67 | 1/2 | 3 | | | |
| P3 | | D4 | 2 | 607.1 | 57.7 | 3/8-SPPM | 3 | 8 | 8/3 = 2.67 | 1/8 | 3 | | | |
| P3 | | D5 | 2 | 404.8 | 38.5 | 1/4-OOK | 1 | 4 | 4 | 1/2 | 1 | | | |
| P3 | | | 2 | 404.8 | 38.5 | 4/16-MPPM | 4 | 16 | 4 | 1/2 | 4 | | | |
| P3 | | | 2 | 404.8 | 38.5 | 4/16-SPPM | 4 | 16 | 4 | 1/16 | 4 | | | |
| P4 | | D6 | 2 | 253.0 | 24.0 | 5/32-MPPM | 5 | 32 | 32/5 = 6.4 | 1/2 | 5 | | | |
| | | D7 | 2 | 202.4 | 19.2 | 1/8-OOK | 1 | 8 | 8 | 1/2 | 1 | | | |
| | | | 2 | 101.2 | 9.6 | 1/16-OOK | 1 | 16 | 16 | 1/2 | 1 | | | |

METHOD AND SYSTEM FOR SELECTING SPREADING SEQUENCES WITH VARIABLE SPREADING FACTORS

TECHNICAL FIELD

The present invention relates to communications systems and more particularly to a mechanism of selecting spreading sequences with variable spreading factors. The present application is based on, and claims priority from an Indian Application Number 4895/CHE/2013 filed on 30 Oct., 2013, the disclosure of which is hereby incorporated by reference herein.

BACKGROUND ART

Communications systems depend on various protocols for transmitting signals from a transmitter to a receiver. Some protocols reflect physical layer of communications. When signals are transmitted on the physical layer, spreading sequences may be used to overcome noise that may exist on the signal. Specifically, each bit in the signal is encoded with a predefined series of bits. The number of bits in the series is specified by a spreading factor. For example, a zero (0) may be encoded with a predefined series of bits having a length defined by the spreading factor. Conversely, a one (1) may be encoded with a different predefined series of bits having a length defined by the spreading factor.

It is desired to generate spreading sequences that is useful for energy efficient ultra-low power communication. Non-coherent communication is preferred for the ultra-low power communication over short ranges. To enable ultra-low power communications, the spreading sequences play a vital role that is used as preambles and for spreading the data. The properties of the spreading sequences impact the energy efficiency of the overall communication system. Also for interoperability and adherence to spectral mask constraints in unlicensed bands; it is attractive that the sequences also be usable in coherent mode communications.

The above information is presented as background information only to help the reader to understand the present invention. Applicants have made no determination and make no assertion as to whether any of the above might be applicable as Prior Art with regard to the present application.

DISCLOSURE

Technical Solution

The principal object of the embodiments herein is to provide a method and system for selecting non-coherent spreading sequences with binary alphabets {0,1} with variable spreading factors.

Another object of the embodiments herein is to provide a method and system that adapts non-coherent preamble and spreading sequences suitable for coherent mode of operation. The sequences with binary alphabets are adapted to ternary alphabets.

Accordingly the embodiments provide a method for selecting spreading sequences with variable spreading factors. The method comprising generating circular shift equivalent sets of spreading sequences by circularly shifting base sequences with elements {1, 0} and having at least one variable spreading factor. The method further comprises determining whether each spreading sequence in the circular shift equivalent set meets pre-defined spreading sequence criteria. The spreading sequence criteria comprises a balanced criteria, a non-repetition criteria, a non-circular criteria, and a conjugate criteria. Furthermore, the method comprises selecting the spreading sequence from expansions of at least one spreading sequence from the circular shift equivalent sets in response to determining that the spreading sequences in the circular shift equivalent sets meets the pre-defined spreading sequence criteria.

Accordingly the embodiments provides a method for selecting an N length ternary sequence with elements {1, 0, −1} from a spreading sequence of length N with elements {1 0}. The method comprising generating all combinations of binary sequences with at least one of alphabets {+1, −1} for the spreading sequence with half the variable spreading factor of length N i.e. N/2. The method further comprises generating combinations of ternary sequences of length N with at least one of alphabets {+1, 0, −1} for the spreading sequence of length N. The combinations are generated by substituting positions of ones in the selected spreading sequence of length N by all possible combinations of at least one of elements {1, −1}. Further the method comprises selecting a set of sequences with minimum sum of squares of cyclic correlations of all the combinations of the ternary sequence. Further, the method comprises computing a probability of correct detection over a range of Signal-to-noise ratio (SNR) values for the set of sequences with minimum sum of squares of the cyclic correlations. Furthermore the method comprises selecting the ternary sequence for which the probability of correct detection is maximum as ternary synchronization preamble.

Accordingly the embodiments provides a method for selecting an N length ternary sequence with elements {1, 0, −1} from a spreading sequence of length N with elements {1, 0}. The method comprising generating a ternary sequence with elements {1, 0, −1} of length N from the spreading sequence with elements {1, 0} of length N. The method comprises generating a PN sequence with elements {1,−1} of length N/2−1. The PN sequence is appended with a '−1' to obtain balanced binary sequences with N/4+1s and N/4−1s. The method comprises creating a benchmark ternary sequence by substituting the balanced binary sequence at positions of ones in the spreading sequence with elements {1, 0}. The balanced binary sequence is multiplied with various masking functions and computing all cyclic auto-correlation values of the sequence at all lags. The method further comprises creating unbalanced binary sequences from balanced binary sequences using at least one masking function. Then the at least one masking function is multiplied with the balanced binary sequences such that number of ones exceed number of zeroes. Further, the method comprises creating unbalanced ternary sequences from the unbalanced binary sequences by substituting the unbalanced binary sequences with alphabets {+1, −1s} in positions of ones in the selected N length binary spreading sequence with elements {1, 0} and computing all cyclic auto-correlation values of sequence at all lags. Further, the method comprises selecting all ternary sequences from the unbalanced ternary sequences whose maximum out of phase cyclic auto-correlations are lesser than the maximum out of phase cyclic autocorrelations of the benchmark ternary sequence as candidate ternary spreading sequences. Furthermore, the method comprises selecting at least one ternary sequence with a probability of correct detection performance satisfying constraints as the candidate ternary sequences for synchronization preamble sequences.

Accordingly the embodiments provide a method of operating a transmitter to use electromagnetic signals. The method comprising storing at least one ternary sequence in at least one memory unit. The at least one memory unit comprises of memory registers each register storing one element of the ternary sequence. The method comprises generating time series of voltages based on at least one element of the at least one ternary sequence received as an input from the memory unit. The time series of voltages comprises '+V' volts for a '+1' as the input received from the memory unit, '−V' volts for a '−1' as the input received from the memory unit and '0' volts for a '0' as input received from the memory unit. Further the method comprises generating electromagnetic signals corresponding to the time series of voltages for transmission.

Accordingly the embodiments provide a system for selecting spreading sequences with variable spreading factors. The system is configured to generate circular shift equivalent sets of spreading sequences by circularly shifting a base sequence with elements {1, 0} and having at least one variable spreading factor. The system is configured to determine whether each the spreading sequence in the circular shift equivalent set meets a pre-defined spreading sequence criteria. The spreading sequence criteria comprises a balanced criteria, a non-repetition criteria, a non-circular criteria, and a conjugate criteria. The system is configured to select the spreading sequences from expansions of at least one spreading sequence from the circular shift equivalent sets in response to determining that the spreading sequences in the circular shift equivalent sets meets the pre-defined spreading sequence criteria.

Accordingly the embodiments provide a system for selecting an N length ternary sequence with elements {1, 0, −1} from a spreading sequence of length N with elements {1 0}. The system is configured to generate all combinations of binary sequences with at least one of alphabets {+1, −1} for the spreading sequence with half the variable spreading factor of length N i.e. N/2. The system is configured to generate combinations of ternary sequences of length N with at least one of alphabets {+1, 0, −1} for the spreading sequence of length N. The combinations are generated by substituting positions of ones in the selected spreading sequence of length N by all possible combinations of at least one of elements {1, −1}. The system is further configured to select a set of sequences with minimum sum of squares of cyclic correlations of all the combinations of the ternary sequence. The system is configured to compute a probability of correct detection over a range of SNR values for the set of sequences with minimum sum of squares of the cyclic correlations and select the ternary sequence for which the probability of correct detection is maximum as ternary synchronization preamble.

Accordingly the embodiments provide a system for selecting an N length ternary sequence with elements {1, 0, −1} from a spreading sequence of length N with elements {1, 0}. The system is configured to generate a ternary sequence with elements {1, 0, −1} of length N from the spreading sequence with elements {1, 0} of length N. The system is configured to generate an PN sequence with elements {1,−1} of length N/2−1. The PN sequence is appended with a '−1' to obtain balanced binary sequences with N/4+1s and N/4−1s. The system is configured to create a benchmark ternary sequence by substituting the balanced binary sequence at positions of ones in the spreading sequence with elements {1, 0}. The balanced binary sequence is multiplied with various masking functions and computing all cyclic auto-correlation values of the sequence at all lags and create unbalanced binary sequences from balanced binary sequences using at least one masking function. The at least one masking function is multiplied with the balanced binary sequences such that number of ones exceed number of zeros. Further the system is configured to create unbalanced ternary sequences from the unbalanced binary sequences by substituting the unbalanced binary sequences with alphabets {+1, −1s} in positions of ones in the selected N length binary spreading sequence with elements {1, 0} and computing all cyclic auto-correlation values of sequence at all lags. Further the system is configured to select all ternary sequences from the unbalanced ternary sequences whose maximum out of phase cyclic auto-correlations are lesser than the maximum out of phase cyclic autocorrelations of the benchmark ternary sequence as candidate ternary spreading sequences. Furthermore the system is configured to select at least one ternary sequence with a probability of correct detection performance as the candidate ternary sequences for synchronization preamble sequences.

Accordingly the embodiment provides a system of operating a transmitter to send electromagnetic signals. The system comprising a memory unit configured to store at least one ternary sequence. The at least one memory unit comprises of memory registers each register storing one element of the ternary sequence. The system further comprises a voltage converter configured to receive an input as at least one element of the at least one ternary sequence from the memory unit. The voltage converter is further configured to generate time series of voltages based on at least one element received from the memory unit. The time series of voltages comprises '+V' volts for a '+1' as the input received from the memory unit, '−V' volts for a '−1' as input received from memory unit, and '0' volts for a '0' as input received from memory unit. The system further comprising an electromagnetic signal generator configured to generate electromagnetic signals corresponding to the time series of voltages for transmission.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 15 is a table showing a preamble sequence, according to embodiments as disclosed herein;

FIG. 16 is a table showing a Start Frame Delimiter (SFD) Sequence, according to embodiments as disclosed herein;

FIG. 17 is a table showing the spreading sequences used for various modulations formats namely orthogonal variable spreading factor on-off keying (OOK) and also single pulse and pseudo-random multi-pulse pulse position modulations, according to embodiments as disclosed herein;

FIG. 18 is a table showing exemplary modes of transmission using various spreading sequences and modulations in the preamble, data portion, and also the start frame delimiter, according to embodiments as disclosed herein.

MODE FOR INVENTION

Figure 1A:
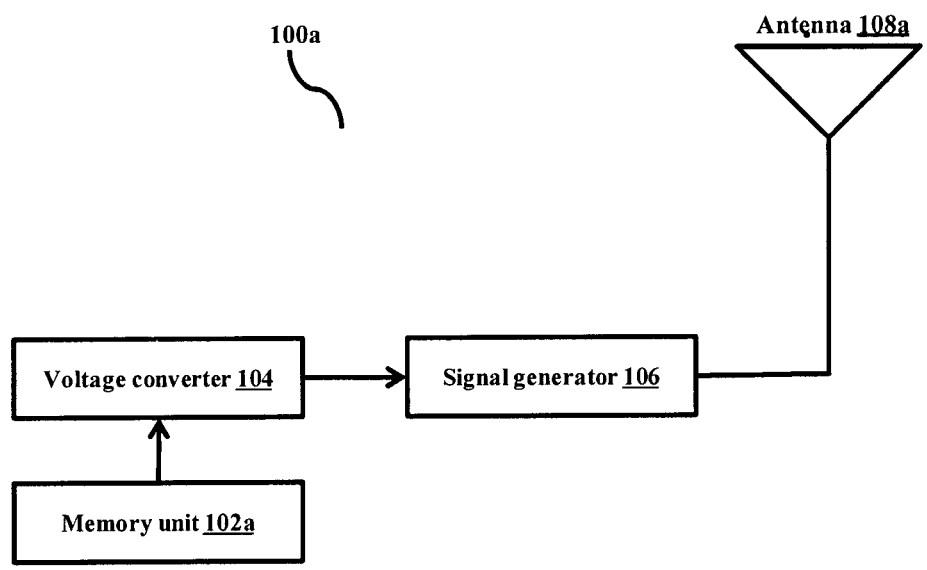
FIG. 1a illustrates a functional block diagram of a transmitter, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for selecting non-coherent spreading sequences with binary alphabets {0, 1} with variable spreading factors. Further, the proposed method adapts non-coherent preamble and spreading sequences for coherent mode of operation.

Due to different complexity limitations in coherent and non-coherent receivers, these preamble sequences are designed to provide different periods for coherent and non-coherent receivers in the transmission of a common sequence. That is, the preamble for coherent receiver is designed based on the repetitive extension of the preamble for non-coherent receiver.

Referring now to the drawings and more particularly to FIGS. 1 through 19 where similar reference characters denote corresponding features consistently throughout the figures, there are shown preferred embodiments.

FIG. 1a illustrates a functional block diagram of a transmitter 100a, according to embodiments as disclosed herein. As shown in the FIG. 1a, the transmitter 100a comprises a memory unit 102a, a voltage converter 104, an electromagnetic signal generator 106 and an antenna 108a. The transmitter 100a is configured to use electromagnetic signals.

In an embodiment, a control signal with two states is provided as an input to the memory unit. In one state, no action is performed. In another state, the contents of pre-defined memory units are serially input to a digital to analog voltage convertor (not shown). The pre-defined memory units to be selected are input to the memory unit from a memory unit selector block (not shown).

In an embodiment, the memory unit 102a is configured to store a ternary sequence {1, 0, −1}. In an embodiment, the memory unit 102a further includes memory registers and each register stores one element of the ternary sequence.

The voltage converter 104 is configured to receive an input as the element of the ternary sequence from the memory unit 102a and generate time series of voltages based on the element received from the memory unit 102a. In an embodiment, the voltage converter 104 is a digital to analog voltage convertor. The time series of voltages comprises '+V' volts for a '+1' as the input received from the memory unit 102a. The time series of voltages further comprises '−V' volts for a '−1' as the input received from the memory unit 102a, and '0' volts for a '0' as the input received from the memory unit 102a. Further the electromagnetic signal generator 106 accepts the time series of voltages and is configured along with a transmitting antenna to generate electromagnetic signals corresponding to the time series of voltages and send the electromagnetic signals corresponding to the time series of voltages to the wireless medium using the antenna 108a.

Figure 1B:
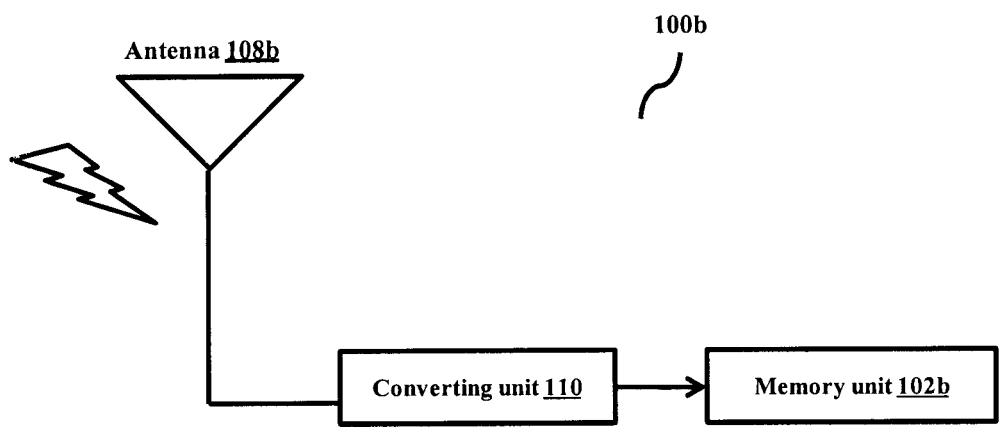
FIG. 1b illustrates a functional block diagram of a receiver, according to embodiments as disclosed herein.

FIG. 1b illustrates a functional block diagram of a receiver 100b, according to embodiments as disclosed herein. The receiver 100b comprises an antenna 108b, a converting unit 110 and a memory unit 102b. The antenna 108b receives the transmitted electromagnetic signals transmitted over the air from the transmitter 100a. Further the converting unit 110 is configured to convert the electromagnetic signals into the time series of voltages. This time series of voltages can then be converted back to the sequences stored in the memory unit 102b in the receiver 100b. Due to different complexity limitations in coherent and non-coherent receivers, the preamble sequences are designed to provide different periods for coherent and non-coherent receivers in the transmission of a common sequence. That is, the preamble for coherent receiver is designed based on the repetitive extension of the preamble for non-coherent receiver.

Spreading sequences for variable spreading factor are defined as $C=\{c_m | m \in \mathcal{N}_{SF}\}$, the spreading factor is denoted as $m \in \mathcal{N}_{SF}=\{2, 4, 8, 16, \ldots\}$, and $c_m$ is the spreading sequence for spreading factor m. If the preamble symbol length is M, then preamble sequences become $1_M \otimes c_m$ where $1_m$ all one vector of length is m and $\otimes$ is the Kronecker product operation. This means that M repetitions of sequence $c_m$ having length m.

$W=\{w_m \triangleq 1_{N/m} \otimes c_m | m \in \mathcal{N}_{SF}\}$ is the codebook for variable spreading factor where N is the correlator size. $w_m$ is a sequence with $$\frac{N}{m}$$

repetitions of sequence $c_m$. Note that $w_m=[w_1\ w_2\ \ldots\ w_N]$ is the code-word for spreading factor m where $\forall l, w_l \in \{0,1\}$, $v_m=[v_1\ v_2\ \ldots\ v_N]$ is the correlation sequence where $\forall l, v_l \triangleq 2w_l-1 \in \{-1, 1\}$ and $y_n=[y_n\ y_{n+1}\ \ldots\ y_n+N-1]$ is the input sequence. The correlation output for spreading factor is given as, in an example mode, the correlator size is chosen to be the highest spreading factor among the variable spreading factors.

$$\Sigma_n(w_m) = y_n \cdot v_m = \sum_{l=1}^{N} y_{n+l-1} \cdot v_l$$

Based on the correlation output, the blind detection of spreading factor and packet detection is determined by $$\hat{N}_{SF} = \arg \max_{m \in N_{SF}} \Sigma_n(w_m)$$

and $$\max_{m \in N_{SF}} \Sigma_n(w_m) \underset{\mathcal{H}_0}{\overset{\mathcal{H}_1}{\gtrless}} \gamma_{pd},$$

respectively, where $\mathcal{H}_0$: Packet is not transmitted, $\mathcal{H}_1$: Packet is transmitted and $\gamma_{pd}$ is the threshold for packet detection. The spreading factor estimate is the index 'm' associated with the maximum value of the computations $\Sigma w_m$ as m is varied from $\{2, 4, 8, \ldots\}$. In order to enhance the preamble performance, the orthogonal sequence design based on the circular shift equivalent set for variable spreading factor is required. Circular shift equivalent set is defined as follows:

$$\mathbb{C}_{(c_m)}=\{c_m^{[l]} | c_m^{[0]}=c_m, c_m^{[l]}=[c_{m-l+1}\ \ldots\ c_m c_1 c_2\ \ldots\ c_{m-l}]\text{ for } 0<l<m\} \text{ with } c_m=[c_1 c_2 \ldots c_m].$$

The above set is obtained by first selecting a sequence $c_m$ and then circularly shifting it by one position to obtain another sequence in the set. The next sequence is obtained by shifting the newly obtained sequence by another one position in the same direction as the earlier shift was carried out. This procedure is repeated so on and so forth to obtain all the sequences in the set. The shifting by one position is done to the extent just before $c_m$ appears once more. The elements so formed are the members of the set.

The proposed method includes generating circular shift equivalent sets of spreading sequences by circularly shifting base sequences with elements $\{1, 0\}$ and having at least one variable spreading factor.

In an embodiment, the binary sequence meets a predefined spreading sequence criteria comprises a balanced criteria, a non-repetition criteria, a non-circular criteria, and a conjugate criteria. The details of each criteria are given below:

Balanced criteria: The number of zeros in the sequence is equal to the number of non-zeros/ones in the sequence for the length of the spreading factor.

Non-repetition criteria: Prevent ambiguity on the consecutive 1's or 0's. For a sequence with a spreading factor 'm' the sequence cannot be further divided into two identical halves.

$$\{c_m=[c_{m/2,1} c_{m/2,2}] | c_{m/2,1} \neq c_{m/2,2}\}$$

Non-circular criteria: Prevent ambiguity on the nested code-words. Once sequence in a sequence set cannot be fully comprised of the periodic repetition of the other.

$$\{c_m | c_m \neq [1_{m/n} \otimes c_n] \mathbb{C}_l,\ 0 \leq l < m,\ m=2^t,\ n=2^s,\ t>s\}$$

Conjugate criteria: For a binary sequence with a spreading factor 'm', the two identical halves are complementary to each other.

$$\{c_m=[c_{m/2,1} c_{m/2,2}] | c_{m/2,2}=\tilde{c}_{m/2,1}\}$$

Based on the above criteria, the proposed method creates finite number of circular shift equivalent set as listed in the table-1 below:

TABLE 1

| | |
|---|---|
| m = 4: | 1 set |
| m = 8: | 2 set |
| m = 16: | 16 set |

Figure 2:
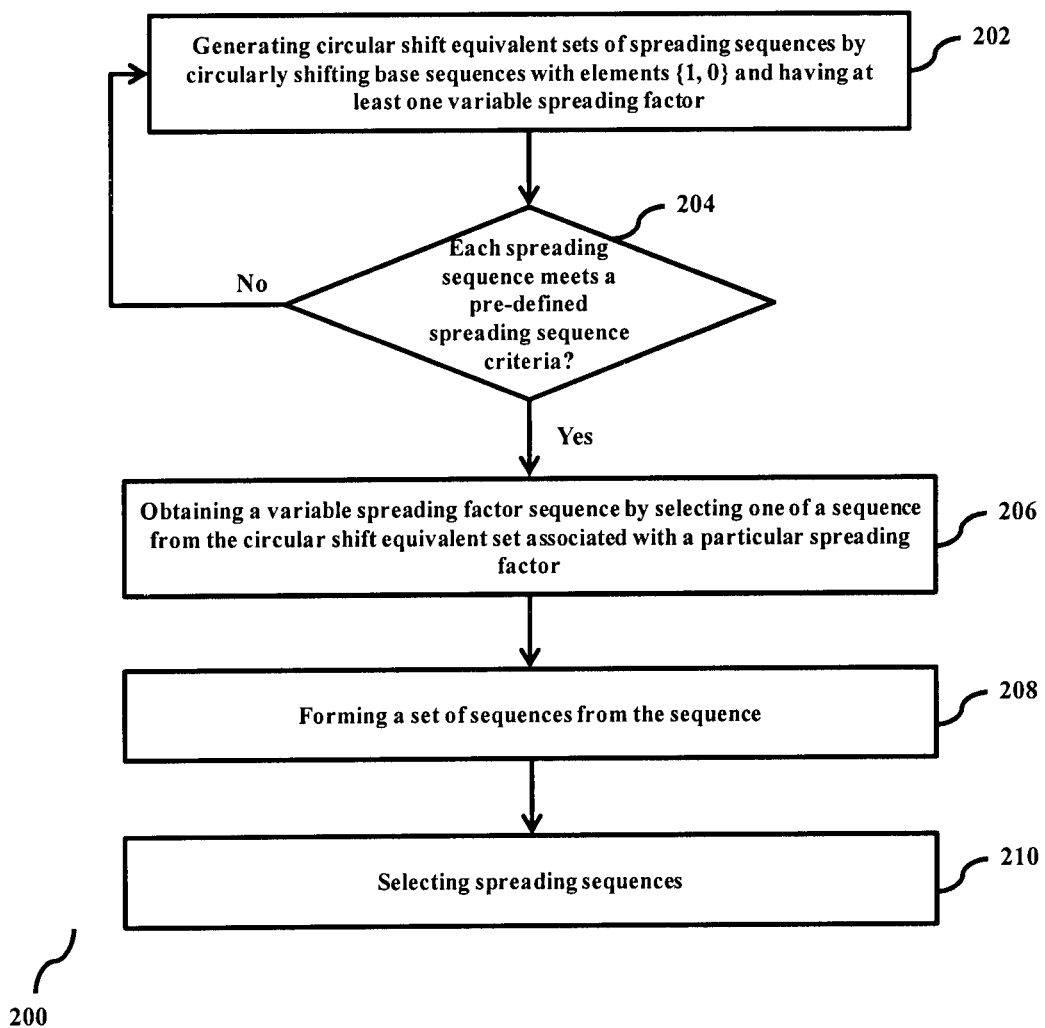
FIG. 2 is a flow diagram illustrating a method of selecting spreading sequences with variable spreading factors in a non-coherent mode, according to embodiments as disclosed herein.

FIG. 2 is a flow diagram illustrating a method 200 of selecting spreading sequences with variable spreading factors in a non-coherent mode, according to embodiments as disclosed herein. At step 202, the method 200 includes generating circular shift equivalent sets of spreading sequences by circularly shifting base sequences with elements {1, 0} and having at least one variable spreading factor.

Examples of the circular shift equivalent set for m=4 case is shown in table-2 below.

TABLE 2

| Index | $c_0$ | $c_1$ | $c_2$ | $c_3$ | $w_H$ | min $d_H$ | min $d_E$ | p |
|---|---|---|---|---|---|---|---|---|
| 3 | 1 | 1 | 0 | 0 | 2 | 2 | $\sqrt{2}$ | 0 |
| 6 | 0 | 1 | 1 | 0 | 2 | 2 | $\sqrt{2}$ | 0 |
| 9 | 1 | 0 | 0 | 1 | 2 | 2 | $\sqrt{2}$ | 0 |
| 12 | 0 | 0 | 1 | 1 | 2 | 2 | $\sqrt{2}$ | 0 | where, Index: Is the integer value of $c_{m-1}, c_{m-2}, \ldots, c_0$.
$w_H$ is the hamming weight,
min $d_H$ is the minimum hamming distance,
min $d_E$ is the Euclidean distance.

The circular shift equivalent sets for m=8 case. There are two such sets are shown in the table-3 and table-4 below.

TABLE 3

| Index | $c_0$ | $c_1$ | $c_2$ | $c_3$ | $c_4$ | $c_5$ | $c_6$ | $c_7$ | $w_H$ | min $d_H$ | min $d_E$ | p |
|---|---|---|---|---|---|---|---|---|---|---|---|---|
| 15 | 1 | 1 | 1 | 1 | 0 | 0 | 0 | 0 | 4 | 4 | 2 | 0 |
| 30 | 0 | 1 | 1 | 1 | 1 | 0 | 0 | 0 | 4 | 4 | 2 | 0 |
| 60 | 0 | 0 | 1 | 1 | 1 | 1 | 0 | 0 | 4 | 4 | 2 | 0 |
| 120 | 0 | 0 | 0 | 1 | 1 | 1 | 1 | 0 | 4 | 4 | 2 | 0 |
| 135 | 1 | 1 | 1 | 0 | 0 | 0 | 0 | 1 | 4 | 4 | 2 | 0 |
| 195 | 1 | 1 | 0 | 0 | 0 | 0 | 1 | 1 | 4 | 4 | 2 | 0 |
| 225 | 1 | 0 | 0 | 0 | 0 | 1 | 1 | 1 | 4 | 4 | 2 | 0 |
| 240 | 0 | 0 | 0 | 0 | 1 | 1 | 1 | 1 | 4 | 4 | 2 | 0 |

TABLE 4

| Index | $c_0$ | $c_1$ | $c_2$ | $c_3$ | $c_4$ | $c_5$ | $c_6$ | $c_7$ | $w_H$ | min $d_H$ | min $d_E$ | p |
|---|---|---|---|---|---|---|---|---|---|---|---|---|
| 45 | 1 | 0 | 1 | 1 | 0 | 1 | 0 | 0 | 4 | 4 | 2 | 0 |
| 75 | 1 | 1 | 0 | 1 | 0 | 0 | 1 | 0 | 4 | 4 | 2 | 0 |
| 90 | 0 | 1 | 0 | 1 | 1 | 0 | 1 | 0 | 4 | 4 | 2 | 0 |
| 105 | 1 | 0 | 0 | 1 | 0 | 1 | 1 | 0 | 4 | 4 | 2 | 0 |
| 150 | 0 | 1 | 1 | 0 | 1 | 0 | 0 | 1 | 4 | 4 | 2 | 0 |
| 165 | 1 | 0 | 1 | 0 | 0 | 1 | 0 | 1 | 4 | 4 | 2 | 0 |
| 180 | 0 | 0 | 1 | 0 | 1 | 1 | 0 | 1 | 4 | 4 | 2 | 0 |
| 210 | 0 | 1 | 0 | 0 | 1 | 0 | 1 | 1 | 4 | 4 | 2 | 0 |

Circular shift equivalent sets for m=16 case. There are 16 such sets shown in tables 5-20 below.

TABLE 5

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 255 | 1 | 1 | 1 | 1 | 1 | 1 | 1 | 1 | 0 | 0 | 0 | 0 | 0 | 0 | 0 | 0 | 8 | 8 | $\sqrt{8}$ | 0 |
| 310 | 0 | 1 | 1 | 1 | 1 | 1 | 1 | 1 | 1 | 0 | 0 | 0 | 0 | 0 | 0 | 0 | 8 | 8 | $\sqrt{8}$ | 0 |
| 1020 | 0 | 0 | 1 | 1 | 1 | 1 | 1 | 1 | 1 | 1 | 0 | 0 | 0 | 0 | 0 | 0 | 8 | 8 | $\sqrt{8}$ | 0 |
| 2040 | 0 | 0 | 0 | 1 | 1 | 1 | 1 | 1 | 1 | 1 | 1 | 0 | 0 | 0 | 0 | 0 | 8 | 8 | $\sqrt{8}$ | 0 |
| 4080 | 0 | 0 | 0 | 0 | 1 | 1 | 1 | 1 | 1 | 1 | 1 | 1 | 0 | 0 | 0 | 0 | 8 | 8 | $\sqrt{8}$ | 0 |
| 8160 | 0 | 0 | 0 | 0 | 0 | 1 | 1 | 1 | 1 | 1 | 1 | 1 | 1 | 0 | 0 | 0 | 8 | 8 | $\sqrt{8}$ | 0 |
| 36320 | 0 | 0 | 0 | 0 | 0 | 0 | 1 | 1 | 1 | 1 | 1 | 1 | 1 | 1 | 0 | 0 | 8 | 8 | $\sqrt{8}$ | 0 |
| 32640 | 0 | 0 | 0 | 0 | 0 | 0 | 0 | 1 | 1 | 1 | 1 | 1 | 1 | 1 | 1 | 0 | 8 | 8 | $\sqrt{8}$ | 0 |
| 32895 | 1 | 1 | 1 | 1 | 1 | 1 | 1 | 0 | 0 | 0 | 0 | 0 | 0 | 0 | 0 | 1 | 8 | 8 | $\sqrt{8}$ | 0 |
| 49215 | 1 | 1 | 1 | 1 | 1 | 1 | 0 | 0 | 0 | 0 | 0 | 0 | 0 | 0 | 1 | 1 | 8 | 8 | $\sqrt{8}$ | 0 |
| 57375 | 1 | 1 | 1 | 1 | 1 | 0 | 0 | 0 | 0 | 0 | 0 | 0 | 0 | 1 | 1 | 1 | 8 | 8 | $\sqrt{8}$ | 0 |
| 61455 | 1 | 1 | 1 | 1 | 0 | 0 | 0 | 0 | 0 | 0 | 0 | 0 | 1 | 1 | 1 | 1 | 8 | 8 | $\sqrt{8}$ | 0 |
| 63495 | 1 | 1 | 1 | 0 | 0 | 0 | 0 | 0 | 0 | 0 | 0 | 1 | 1 | 1 | 1 | 1 | 8 | 8 | $\sqrt{8}$ | 0 |
| 64515 | 1 | 1 | 0 | 0 | 0 | 0 | 0 | 0 | 0 | 0 | 1 | 1 | 1 | 1 | 1 | 1 | 8 | 8 | $\sqrt{8}$ | 0 |
| 65025 | 1 | 0 | 0 | 0 | 0 | 0 | 0 | 0 | 0 | 1 | 1 | 1 | 1 | 1 | 1 | 1 | 8 | 8 | $\sqrt{8}$ | 0 |
| 65280 | 0 | 0 | 0 | 0 | 0 | 0 | 0 | 0 | 1 | 1 | 1 | 1 | 1 | 1 | 1 | 1 | 8 | 8 | $\sqrt{8}$ | 0 |

TABLE 6

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 765 | 1 | 0 | 1 | 1 | 1 | 1 | 1 | 1 | 0 | 1 | 0 | 0 | 0 | 0 | 0 | 0 | 8 | 8 | $\sqrt{8}$ | 0 |
| 1530 | 0 | 1 | 0 | 1 | 1 | 1 | 1 | 1 | 1 | 0 | 1 | 0 | 0 | 0 | 0 | 0 | 8 | 8 | $\sqrt{8}$ | 0 |
| 3060 | 0 | 0 | 1 | 0 | 1 | 1 | 1 | 1 | 1 | 1 | 0 | 1 | 0 | 0 | 0 | 0 | 8 | 8 | $\sqrt{8}$ | 0 |
| 6120 | 0 | 0 | 0 | 1 | 0 | 1 | 1 | 1 | 1 | 1 | 1 | 0 | 1 | 0 | 0 | 0 | 8 | 8 | $\sqrt{8}$ | 0 |
| 12240 | 0 | 0 | 0 | 0 | 1 | 0 | 1 | 1 | 1 | 1 | 1 | 1 | 0 | 1 | 0 | 0 | 8 | 8 | $\sqrt{8}$ | 0 |
| 16575 | 1 | 1 | 1 | 1 | 1 | 0 | 1 | 0 | 0 | 0 | 0 | 0 | 0 | 1 | 0 | 0 | 8 | 8 | $\sqrt{8}$ | 0 |
| 24480 | 0 | 0 | 0 | 0 | 0 | 1 | 0 | 1 | 1 | 1 | 1 | 1 | 1 | 0 | 1 | 0 | 8 | 8 | $\sqrt{8}$ | 0 |
| 32385 | 1 | 0 | 0 | 0 | 0 | 0 | 1 | 0 | 1 | 1 | 1 | 1 | 1 | 1 | 0 | 0 | 8 | 8 | $\sqrt{8}$ | 0 |
| 33150 | 0 | 1 | 1 | 1 | 1 | 1 | 1 | 0 | 1 | 0 | 0 | 0 | 0 | 0 | 1 | 0 | 8 | 8 | $\sqrt{8}$ | 0 |
| 41055 | 1 | 1 | 1 | 1 | 1 | 0 | 1 | 0 | 0 | 0 | 0 | 0 | 1 | 0 | 0 | 1 | 8 | 8 | $\sqrt{8}$ | 0 |
| 48960 | 0 | 0 | 0 | 0 | 0 | 0 | 1 | 0 | 1 | 1 | 1 | 1 | 1 | 0 | 1 | 1 | 8 | 8 | $\sqrt{8}$ | 0 |
| 53295 | 1 | 1 | 1 | 1 | 0 | 1 | 0 | 0 | 0 | 0 | 0 | 1 | 0 | 0 | 1 | 1 | 8 | 8 | $\sqrt{8}$ | 0 |
| 59415 | 1 | 1 | 1 | 0 | 1 | 0 | 0 | 0 | 0 | 0 | 1 | 0 | 0 | 1 | 1 | 1 | 8 | 8 | $\sqrt{8}$ | 0 |
| 62475 | 1 | 1 | 0 | 1 | 0 | 0 | 0 | 0 | 0 | 1 | 0 | 0 | 1 | 1 | 1 | 1 | 8 | 8 | $\sqrt{8}$ | 0 |
| 64005 | 1 | 0 | 1 | 0 | 0 | 0 | 0 | 0 | 1 | 0 | 0 | 1 | 1 | 1 | 1 | 1 | 8 | 8 | $\sqrt{8}$ | 0 |
| 64770 | 0 | 1 | 0 | 0 | 0 | 0 | 0 | 1 | 0 | 0 | 1 | 1 | 1 | 1 | 1 | 1 | 8 | 8 | $\sqrt{8}$ | 0 |

TABLE 7

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 1275 | 1 | 1 | 0 | 1 | 1 | 1 | 1 | 1 | 0 | 0 | 1 | 0 | 0 | 0 | 0 | 0 | 8 | 8 | $\sqrt{8}$ | 0 |
| 2550 | 0 | 1 | 1 | 0 | 1 | 1 | 1 | 1 | 1 | 0 | 0 | 1 | 0 | 0 | 0 | 0 | 8 | 8 | $\sqrt{8}$ | 0 |
| 5100 | 0 | 0 | 1 | 1 | 0 | 1 | 1 | 1 | 1 | 1 | 0 | 0 | 1 | 0 | 0 | 0 | 8 | 8 | $\sqrt{8}$ | 0 |
| 10200 | 0 | 0 | 0 | 1 | 1 | 0 | 1 | 1 | 1 | 1 | 1 | 0 | 0 | 1 | 0 | 0 | 8 | 8 | $\sqrt{8}$ | 0 |
| 16065 | 1 | 0 | 0 | 0 | 0 | 0 | 1 | 1 | 0 | 1 | 1 | 1 | 1 | 1 | 0 | 0 | 8 | 8 | $\sqrt{8}$ | 0 |
| 20400 | 0 | 0 | 0 | 0 | 1 | 1 | 0 | 1 | 1 | 1 | 1 | 1 | 0 | 0 | 1 | 0 | 8 | 8 | $\sqrt{8}$ | 0 |
| 24735 | 1 | 1 | 1 | 1 | 1 | 0 | 0 | 1 | 0 | 0 | 0 | 0 | 1 | 1 | 0 | 0 | 8 | 8 | $\sqrt{8}$ | 0 |
| 32130 | 0 | 1 | 0 | 0 | 0 | 0 | 1 | 1 | 0 | 1 | 1 | 1 | 1 | 1 | 1 | 0 | 8 | 8 | $\sqrt{8}$ | 0 |
| 33405 | 1 | 0 | 1 | 1 | 1 | 1 | 1 | 0 | 0 | 1 | 0 | 0 | 0 | 0 | 0 | 1 | 8 | 8 | $\sqrt{8}$ | 0 |
| 40800 | 0 | 0 | 0 | 0 | 0 | 1 | 1 | 0 | 1 | 1 | 1 | 1 | 0 | 0 | 1 | 1 | 8 | 8 | $\sqrt{8}$ | 0 |
| 45135 | 1 | 1 | 1 | 1 | 0 | 1 | 0 | 0 | 0 | 0 | 0 | 1 | 1 | 0 | 1 | 1 | 8 | 8 | $\sqrt{8}$ | 0 |
| 49470 | 0 | 1 | 1 | 1 | 1 | 1 | 0 | 0 | 1 | 0 | 0 | 0 | 0 | 1 | 1 | 1 | 8 | 8 | $\sqrt{8}$ | 0 |
| 55335 | 1 | 1 | 1 | 0 | 0 | 1 | 0 | 0 | 0 | 0 | 1 | 1 | 0 | 1 | 1 | 1 | 8 | 8 | $\sqrt{8}$ | 0 |
| 60435 | 1 | 1 | 0 | 0 | 1 | 0 | 0 | 0 | 0 | 0 | 1 | 1 | 0 | 1 | 1 | 1 | 8 | 8 | $\sqrt{8}$ | 0 |
| 62985 | 1 | 0 | 0 | 1 | 0 | 0 | 0 | 0 | 1 | 1 | 0 | 1 | 1 | 1 | 1 | 1 | 8 | 8 | $\sqrt{8}$ | 0 |
| 64260 | 0 | 0 | 1 | 0 | 0 | 0 | 0 | 0 | 1 | 1 | 0 | 1 | 1 | 1 | 1 | 1 | 8 | 8 | $\sqrt{8}$ | 0 |

TABLE 8

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 1785 | 1 | 0 | 0 | 1 | 1 | 1 | 1 | 1 | 0 | 1 | 1 | 0 | 0 | 0 | 0 | 0 | 8 | 8 | $\sqrt{8}$ | 0 |
| 3570 | 0 | 1 | 0 | 0 | 1 | 1 | 1 | 1 | 1 | 0 | 1 | 1 | 0 | 0 | 0 | 0 | 8 | 8 | $\sqrt{8}$ | 0 |
| 7140 | 0 | 0 | 1 | 0 | 0 | 1 | 1 | 1 | 1 | 1 | 0 | 1 | 1 | 0 | 0 | 0 | 8 | 8 | $\sqrt{8}$ | 0 |
| 8415 | 1 | 1 | 1 | 1 | 1 | 0 | 1 | 1 | 0 | 0 | 0 | 0 | 1 | 0 | 0 | 0 | 8 | 8 | $\sqrt{8}$ | 0 |
| 14280 | 0 | 0 | 0 | 1 | 0 | 0 | 1 | 1 | 1 | 1 | 1 | 0 | 1 | 1 | 0 | 0 | 8 | 8 | $\sqrt{8}$ | 0 |
| 16830 | 0 | 1 | 1 | 1 | 1 | 1 | 0 | 1 | 1 | 0 | 0 | 0 | 0 | 1 | 0 | 0 | 8 | 8 | $\sqrt{8}$ | 0 |
| 28560 | 0 | 0 | 0 | 0 | 1 | 0 | 0 | 1 | 1 | 1 | 1 | 0 | 1 | 1 | 1 | 0 | 8 | 8 | $\sqrt{8}$ | 0 |
| 31875 | 1 | 1 | 0 | 0 | 0 | 0 | 1 | 0 | 0 | 1 | 1 | 1 | 1 | 1 | 1 | 0 | 8 | 8 | $\sqrt{8}$ | 0 |
| 33660 | 0 | 0 | 1 | 1 | 1 | 1 | 0 | 1 | 1 | 0 | 0 | 0 | 0 | 0 | 1 | 0 | 8 | 8 | $\sqrt{8}$ | 0 |
| 36975 | 1 | 1 | 1 | 1 | 0 | 1 | 1 | 0 | 0 | 0 | 0 | 1 | 0 | 0 | 1 | 0 | 8 | 8 | $\sqrt{8}$ | 0 |
| 48705 | 1 | 0 | 0 | 0 | 0 | 1 | 0 | 0 | 1 | 1 | 1 | 1 | 1 | 0 | 1 | 1 | 8 | 8 | $\sqrt{8}$ | 0 |
| 51255 | 1 | 1 | 1 | 0 | 1 | 1 | 0 | 0 | 0 | 0 | 1 | 1 | 0 | 0 | 1 | 1 | 8 | 8 | $\sqrt{8}$ | 0 |
| 57120 | 0 | 0 | 0 | 0 | 0 | 1 | 0 | 0 | 1 | 1 | 1 | 1 | 1 | 0 | 1 | 1 | 8 | 8 | $\sqrt{8}$ | 0 |
| 58395 | 1 | 1 | 0 | 1 | 1 | 0 | 0 | 0 | 0 | 0 | 1 | 0 | 0 | 1 | 1 | 1 | 8 | 8 | $\sqrt{8}$ | 0 |
| 61965 | 1 | 0 | 1 | 1 | 0 | 0 | 0 | 0 | 1 | 0 | 0 | 1 | 1 | 1 | 1 | 1 | 8 | 8 | $\sqrt{8}$ | 0 |
| 63750 | 0 | 1 | 1 | 0 | 0 | 0 | 0 | 1 | 0 | 0 | 1 | 1 | 1 | 1 | 1 | 1 | 8 | 8 | $\sqrt{8}$ | 0 |

TABLE 9

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 2295 | 1 | 1 | 1 | 0 | 1 | 1 | 1 | 1 | 0 | 0 | 0 | 1 | 0 | 0 | 0 | 0 | 8 | 8 | $\sqrt{8}$ | 0 |
| 4590 | 0 | 1 | 1 | 1 | 0 | 1 | 1 | 1 | 1 | 0 | 0 | 0 | 1 | 0 | 0 | 0 | 8 | 8 | $\sqrt{8}$ | 0 |
| 7905 | 1 | 0 | 0 | 0 | 0 | 1 | 1 | 1 | 0 | 1 | 1 | 1 | 1 | 0 | 0 | 0 | 8 | 8 | $\sqrt{8}$ | 0 |
| 9180 | 0 | 0 | 1 | 1 | 1 | 0 | 1 | 1 | 1 | 1 | 0 | 0 | 0 | 1 | 0 | 0 | 8 | 8 | $\sqrt{8}$ | 0 |
| 15810 | 0 | 1 | 0 | 0 | 0 | 0 | 1 | 1 | 1 | 0 | 1 | 1 | 1 | 1 | 0 | 0 | 8 | 8 | $\sqrt{8}$ | 0 |
| 18360 | 0 | 0 | 0 | 1 | 1 | 1 | 0 | 1 | 1 | 1 | 1 | 0 | 0 | 1 | 0 | 0 | 8 | 8 | $\sqrt{8}$ | 0 |
| 28815 | 1 | 1 | 1 | 1 | 0 | 0 | 0 | 1 | 0 | 0 | 0 | 1 | 1 | 1 | 1 | 0 | 8 | 8 | $\sqrt{8}$ | 0 |
| 31620 | 0 | 0 | 1 | 0 | 0 | 0 | 1 | 1 | 1 | 0 | 1 | 1 | 1 | 1 | 1 | 0 | 8 | 8 | $\sqrt{8}$ | 0 |
| 33915 | 1 | 1 | 0 | 1 | 1 | 1 | 0 | 0 | 0 | 1 | 0 | 0 | 0 | 0 | 1 | 0 | 8 | 8 | $\sqrt{8}$ | 0 |
| 36720 | 0 | 0 | 0 | 0 | 1 | 1 | 1 | 0 | 1 | 1 | 1 | 0 | 0 | 0 | 1 | 0 | 8 | 8 | $\sqrt{8}$ | 0 |
| 47175 | 1 | 1 | 1 | 0 | 0 | 1 | 0 | 0 | 0 | 0 | 1 | 1 | 1 | 0 | 1 | 1 | 8 | 8 | $\sqrt{8}$ | 0 |
| 49725 | 1 | 0 | 1 | 1 | 1 | 1 | 0 | 0 | 1 | 0 | 0 | 0 | 0 | 1 | 1 | 1 | 8 | 8 | $\sqrt{8}$ | 0 |
| 56355 | 1 | 1 | 0 | 0 | 0 | 1 | 0 | 0 | 0 | 1 | 1 | 1 | 0 | 1 | 1 | 1 | 8 | 8 | $\sqrt{8}$ | 0 |
| 57630 | 0 | 1 | 1 | 1 | 1 | 0 | 0 | 0 | 1 | 0 | 0 | 0 | 1 | 1 | 1 | 1 | 8 | 8 | $\sqrt{8}$ | 0 |
| 60945 | 1 | 0 | 0 | 0 | 1 | 0 | 0 | 0 | 1 | 1 | 0 | 1 | 1 | 1 | 1 | 1 | 8 | 8 | $\sqrt{8}$ | 0 |
| 63240 | 0 | 0 | 0 | 1 | 0 | 0 | 0 | 1 | 1 | 1 | 0 | 1 | 1 | 1 | 1 | 1 | 8 | 8 | $\sqrt{8}$ | 0 |

TABLE 10

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 2805 | 1 | 0 | 1 | 0 | 1 | 1 | 1 | 1 | 0 | 1 | 0 | 1 | 0 | 0 | 0 | 0 | 8 | 8 | $\sqrt{8}$ | 0 |
| 5610 | 0 | 1 | 0 | 1 | 0 | 1 | 1 | 1 | 1 | 0 | 1 | 0 | 1 | 0 | 0 | 0 | 8 | 8 | $\sqrt{8}$ | 0 |

TABLE 10-continued

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 11220 | 0 | 0 | 1 | 0 | 1 | 0 | 1 | 1 | 1 | 1 | 0 | 1 | 0 | 1 | 0 | 0 | 8 | 8 | $\sqrt{8}$ | 0 |
| 17085 | 1 | 0 | 1 | 1 | 1 | 0 | 1 | 0 | 1 | 0 | 0 | 0 | 0 | 1 | 0 | 8 | 8 | 8 | $\sqrt{8}$ | 0 |
| 20655 | 1 | 1 | 1 | 1 | 0 | 1 | 0 | 1 | 0 | 0 | 0 | 0 | 1 | 0 | 1 | 0 | 8 | 8 | $\sqrt{8}$ | 0 |
| 22440 | 0 | 0 | 0 | 1 | 0 | 1 | 0 | 1 | 1 | 1 | 1 | 0 | 1 | 0 | 1 | 0 | 8 | 8 | $\sqrt{8}$ | 0 |
| 24225 | 1 | 0 | 0 | 0 | 0 | 1 | 0 | 1 | 0 | 1 | 1 | 1 | 1 | 0 | 1 | 0 | 8 | 8 | $\sqrt{8}$ | 0 |
| 31365 | 1 | 0 | 1 | 0 | 0 | 0 | 0 | 1 | 0 | 1 | 0 | 1 | 1 | 1 | 1 | 0 | 8 | 8 | $\sqrt{8}$ | 0 |
| 34170 | 0 | 1 | 0 | 1 | 1 | 1 | 1 | 0 | 1 | 0 | 1 | 0 | 0 | 0 | 0 | 1 | 8 | 8 | $\sqrt{8}$ | 0 |
| 41310 | 0 | 1 | 1 | 1 | 1 | 0 | 1 | 0 | 1 | 0 | 0 | 0 | 0 | 1 | 0 | 1 | 8 | 8 | $\sqrt{8}$ | 0 |
| 43095 | 1 | 1 | 1 | 0 | 1 | 0 | 1 | 0 | 0 | 0 | 0 | 1 | 0 | 1 | 0 | 1 | 8 | 8 | $\sqrt{8}$ | 0 |
| 44880 | 0 | 0 | 0 | 0 | 1 | 0 | 1 | 0 | 1 | 1 | 1 | 1 | 0 | 1 | 0 | 1 | 8 | 8 | $\sqrt{8}$ | 0 |
| 48450 | 0 | 0 | 0 | 0 | 0 | 1 | 1 | 0 | 0 | 1 | 1 | 1 | 1 | 0 | 1 | 1 | 8 | 8 | $\sqrt{8}$ | 0 |
| 54315 | 1 | 1 | 0 | 1 | 0 | 1 | 0 | 0 | 0 | 0 | 1 | 0 | 1 | 0 | 1 | 1 | 8 | 8 | $\sqrt{8}$ | 0 |
| 59925 | 1 | 0 | 1 | 0 | 1 | 0 | 0 | 0 | 0 | 1 | 0 | 1 | 0 | 1 | 1 | 1 | 8 | 8 | $\sqrt{8}$ | 0 |
| 62730 | 0 | 1 | 0 | 1 | 0 | 0 | 0 | 0 | 1 | 0 | 1 | 0 | 1 | 1 | 1 | 1 | 8 | 8 | $\sqrt{8}$ | 0 |

TABLE 11

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 3315 | 1 | 1 | 0 | 0 | 1 | 1 | 1 | 1 | 0 | 0 | 1 | 1 | 0 | 0 | 0 | 0 | 8 | 8 | $\sqrt{8}$ | 0 |
| 6630 | 0 | 1 | 1 | 0 | 0 | 1 | 1 | 1 | 1 | 0 | 0 | 1 | 1 | 0 | 0 | 0 | 8 | 8 | $\sqrt{8}$ | 0 |
| 12495 | 1 | 1 | 1 | 1 | 0 | 0 | 1 | 1 | 0 | 0 | 0 | 0 | 1 | 1 | 0 | 0 | 8 | 8 | $\sqrt{8}$ | 0 |
| 13260 | 0 | 0 | 1 | 1 | 0 | 0 | 1 | 1 | 1 | 1 | 0 | 0 | 1 | 1 | 0 | 0 | 8 | 8 | $\sqrt{8}$ | 0 |
| 15555 | 1 | 1 | 0 | 0 | 0 | 1 | 1 | 0 | 0 | 1 | 1 | 0 | 0 | 1 | 1 | 0 | 8 | 8 | $\sqrt{8}$ | 0 |
| 24990 | 0 | 1 | 1 | 1 | 1 | 0 | 0 | 1 | 1 | 0 | 0 | 0 | 0 | 1 | 1 | 0 | 8 | 8 | $\sqrt{8}$ | 0 |
| 26520 | 0 | 0 | 0 | 1 | 1 | 0 | 0 | 1 | 1 | 1 | 1 | 0 | 0 | 1 | 1 | 0 | 8 | 8 | $\sqrt{8}$ | 0 |
| 31110 | 0 | 1 | 1 | 0 | 0 | 0 | 0 | 1 | 1 | 0 | 0 | 1 | 1 | 1 | 1 | 0 | 8 | 8 | $\sqrt{8}$ | 0 |
| 34425 | 1 | 0 | 1 | 1 | 1 | 1 | 0 | 0 | 1 | 1 | 0 | 0 | 0 | 0 | 1 | 8 | 8 | 8 | $\sqrt{8}$ | 0 |
| 39015 | 1 | 1 | 1 | 0 | 0 | 1 | 1 | 0 | 0 | 0 | 0 | 1 | 1 | 0 | 0 | 1 | 8 | 8 | $\sqrt{8}$ | 0 |
| 40545 | 1 | 0 | 0 | 0 | 1 | 1 | 0 | 0 | 1 | 1 | 1 | 1 | 0 | 0 | 0 | 1 | 8 | 8 | $\sqrt{8}$ | 0 |
| 49980 | 0 | 0 | 1 | 1 | 1 | 1 | 0 | 0 | 1 | 1 | 0 | 0 | 0 | 0 | 1 | 1 | 8 | 8 | $\sqrt{8}$ | 0 |
| 52275 | 1 | 1 | 0 | 0 | 1 | 1 | 0 | 0 | 0 | 0 | 1 | 1 | 0 | 0 | 1 | 1 | 8 | 8 | $\sqrt{8}$ | 0 |
| 53040 | 0 | 0 | 0 | 1 | 1 | 0 | 0 | 1 | 1 | 1 | 1 | 0 | 0 | 1 | 1 | 0 | 8 | 8 | $\sqrt{8}$ | 0 |
| 58905 | 1 | 0 | 0 | 1 | 1 | 0 | 0 | 0 | 0 | 1 | 1 | 0 | 0 | 1 | 1 | 1 | 8 | 8 | $\sqrt{8}$ | 0 |
| 62220 | 0 | 0 | 1 | 1 | 0 | 0 | 0 | 0 | 1 | 1 | 0 | 0 | 1 | 1 | 1 | 1 | 8 | 8 | $\sqrt{8}$ | 0 |

TABLE 12

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 3285 | 1 | 0 | 0 | 0 | 1 | 1 | 1 | 1 | 0 | 1 | 1 | 1 | 0 | 0 | 0 | 0 | 8 | 8 | $\sqrt{8}$ | 0 |
| 4335 | 1 | 1 | 1 | 1 | 0 | 1 | 1 | 1 | 0 | 0 | 0 | 0 | 1 | 0 | 0 | 0 | 8 | 8 | $\sqrt{8}$ | 0 |
| 7650 | 0 | 1 | 0 | 0 | 0 | 1 | 1 | 1 | 1 | 0 | 1 | 1 | 1 | 0 | 0 | 0 | 8 | 8 | $\sqrt{8}$ | 0 |
| 8670 | 0 | 1 | 1 | 1 | 1 | 0 | 1 | 1 | 1 | 0 | 0 | 0 | 0 | 1 | 0 | 0 | 8 | 8 | $\sqrt{8}$ | 0 |
| 15300 | 0 | 0 | 1 | 0 | 0 | 0 | 1 | 1 | 1 | 0 | 1 | 1 | 1 | 0 | 0 | 0 | 8 | 8 | $\sqrt{8}$ | 0 |
| 17340 | 0 | 0 | 1 | 1 | 1 | 1 | 0 | 1 | 1 | 1 | 0 | 0 | 0 | 1 | 0 | 0 | 8 | 8 | $\sqrt{8}$ | 0 |
| 30600 | 0 | 0 | 0 | 1 | 0 | 0 | 0 | 1 | 1 | 1 | 0 | 1 | 1 | 1 | 0 | 0 | 8 | 8 | $\sqrt{8}$ | 0 |
| 30855 | 1 | 1 | 1 | 0 | 0 | 0 | 0 | 1 | 0 | 0 | 0 | 1 | 1 | 1 | 1 | 0 | 8 | 8 | $\sqrt{8}$ | 0 |
| 34680 | 0 | 0 | 0 | 1 | 1 | 1 | 0 | 1 | 1 | 1 | 0 | 0 | 0 | 0 | 1 | 8 | 8 | 8 | $\sqrt{8}$ | 0 |
| 34935 | 1 | 1 | 1 | 0 | 1 | 1 | 1 | 0 | 0 | 0 | 0 | 1 | 0 | 0 | 0 | 1 | 8 | 8 | $\sqrt{8}$ | 0 |
| 48195 | 1 | 1 | 0 | 0 | 0 | 0 | 1 | 0 | 0 | 0 | 1 | 1 | 1 | 0 | 1 | 1 | 8 | 8 | $\sqrt{8}$ | 0 |
| 50235 | 1 | 1 | 0 | 1 | 1 | 1 | 0 | 0 | 0 | 0 | 1 | 0 | 0 | 0 | 1 | 1 | 8 | 8 | $\sqrt{8}$ | 0 |
| 56865 | 1 | 0 | 0 | 0 | 0 | 1 | 0 | 0 | 0 | 1 | 1 | 1 | 0 | 1 | 1 | 1 | 8 | 8 | $\sqrt{8}$ | 0 |
| 57885 | 1 | 0 | 1 | 1 | 1 | 0 | 0 | 0 | 0 | 1 | 0 | 0 | 1 | 1 | 1 | 1 | 8 | 8 | $\sqrt{8}$ | 0 |
| 61200 | 0 | 0 | 0 | 0 | 1 | 0 | 0 | 0 | 1 | 1 | 1 | 0 | 1 | 1 | 1 | 1 | 8 | 8 | $\sqrt{8}$ | 0 |
| 61710 | 0 | 1 | 1 | 1 | 0 | 0 | 0 | 0 | 1 | 0 | 0 | 0 | 1 | 1 | 1 | 1 | 8 | 8 | $\sqrt{8}$ | 0 |

TABLE 13

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 4845 | 1 | 0 | 1 | 1 | 0 | 1 | 1 | 1 | 0 | 1 | 0 | 0 | 1 | 0 | 0 | 0 | 8 | 8 | $\sqrt{8}$ | 0 |
| 9690 | 0 | 1 | 0 | 1 | 1 | 0 | 1 | 1 | 1 | 0 | 1 | 0 | 0 | 1 | 0 | 0 | 8 | 8 | $\sqrt{8}$ | 0 |
| 11985 | 1 | 0 | 0 | 0 | 1 | 0 | 1 | 1 | 0 | 1 | 1 | 1 | 0 | 1 | 0 | 0 | 8 | 8 | $\sqrt{8}$ | 0 |
| 17595 | 1 | 1 | 0 | 1 | 1 | 1 | 0 | 1 | 0 | 0 | 1 | 0 | 0 | 0 | 1 | 0 | 8 | 8 | $\sqrt{8}$ | 0 |

TABLE 13-continued

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 19380 | 0 | 0 | 1 | 0 | 1 | 1 | 0 | 1 | 1 | 1 | 0 | 1 | 0 | 0 | 1 | 0 | 8 | 8 | $\sqrt{8}$ | 0 |
| 23970 | 0 | 1 | 0 | 0 | 0 | 1 | 0 | 1 | 1 | 0 | 1 | 1 | 1 | 0 | 1 | 0 | 8 | 8 | $\sqrt{8}$ | 0 |
| 26775 | 1 | 1 | 1 | 0 | 1 | 0 | 0 | 1 | 0 | 0 | 0 | 1 | 0 | 1 | 1 | 0 | 8 | 8 | $\sqrt{8}$ | 0 |
| 30345 | 1 | 0 | 0 | 1 | 0 | 0 | 0 | 1 | 0 | 1 | 1 | 0 | 1 | 1 | 1 | 0 | 8 | 8 | $\sqrt{8}$ | 0 |
| 35190 | 0 | 1 | 1 | 0 | 1 | 1 | 1 | 0 | 1 | 0 | 0 | 1 | 0 | 0 | 0 | 1 | 8 | 8 | $\sqrt{8}$ | 0 |
| 38760 | 0 | 0 | 0 | 1 | 0 | 1 | 1 | 0 | 1 | 1 | 1 | 0 | 1 | 0 | 0 | 1 | 8 | 8 | $\sqrt{8}$ | 0 |
| 41565 | 1 | 0 | 1 | 1 | 1 | 0 | 1 | 0 | 0 | 1 | 0 | 0 | 0 | 1 | 0 | 1 | 8 | 8 | $\sqrt{8}$ | 0 |
| 46155 | 1 | 1 | 0 | 1 | 0 | 0 | 1 | 0 | 0 | 0 | 1 | 0 | 1 | 1 | 0 | 1 | 8 | 8 | $\sqrt{8}$ | 0 |
| 47940 | 0 | 0 | 1 | 0 | 0 | 0 | 1 | 0 | 1 | 1 | 0 | 1 | 1 | 1 | 0 | 1 | 8 | 8 | $\sqrt{8}$ | 0 |
| 53550 | 0 | 1 | 1 | 1 | 0 | 1 | 0 | 0 | 1 | 0 | 0 | 0 | 1 | 0 | 1 | 1 | 8 | 8 | $\sqrt{8}$ | 0 |
| 55845 | 1 | 0 | 1 | 0 | 0 | 1 | 0 | 0 | 0 | 1 | 0 | 1 | 1 | 0 | 1 | 1 | 8 | 8 | $\sqrt{8}$ | 0 |
| 60690 | 0 | 1 | 0 | 0 | 1 | 0 | 0 | 0 | 1 | 0 | 1 | 1 | 0 | 1 | 1 | 1 | 8 | 8 | $\sqrt{8}$ | 0 |

TABLE 14

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 5355 | 1 | 1 | 0 | 1 | 0 | 1 | 1 | 1 | 0 | 0 | 1 | 0 | 1 | 0 | 0 | 0 | 8 | 8 | $\sqrt{8}$ | 0 |
| 10710 | 0 | 1 | 1 | 0 | 1 | 0 | 1 | 1 | 1 | 0 | 0 | 1 | 0 | 1 | 0 | 0 | 8 | 8 | $\sqrt{8}$ | 0 |
| 15045 | 1 | 0 | 1 | 0 | 0 | 0 | 1 | 1 | 0 | 1 | 0 | 1 | 1 | 1 | 0 | 0 | 8 | 8 | $\sqrt{8}$ | 0 |
| 20145 | 1 | 0 | 0 | 0 | 1 | 1 | 0 | 1 | 0 | 1 | 1 | 1 | 0 | 0 | 1 | 0 | 8 | 8 | $\sqrt{8}$ | 0 |
| 21420 | 0 | 0 | 1 | 1 | 0 | 1 | 0 | 1 | 1 | 1 | 0 | 0 | 1 | 0 | 1 | 0 | 8 | 8 | $\sqrt{8}$ | 0 |
| 22695 | 1 | 1 | 1 | 0 | 0 | 1 | 0 | 1 | 0 | 0 | 0 | 1 | 1 | 0 | 1 | 0 | 8 | 8 | $\sqrt{8}$ | 0 |
| 25245 | 1 | 0 | 1 | 1 | 1 | 0 | 0 | 0 | 1 | 0 | 0 | 0 | 1 | 1 | 1 | 0 | 8 | 8 | $\sqrt{8}$ | 0 |
| 30090 | 0 | 1 | 0 | 1 | 0 | 0 | 1 | 1 | 0 | 1 | 0 | 1 | 1 | 1 | 0 | 0 | 8 | 8 | $\sqrt{8}$ | 0 |
| 35445 | 1 | 0 | 1 | 0 | 1 | 1 | 1 | 0 | 0 | 1 | 0 | 1 | 0 | 0 | 0 | 1 | 8 | 8 | $\sqrt{8}$ | 0 |
| 40290 | 0 | 1 | 0 | 0 | 0 | 1 | 1 | 0 | 1 | 0 | 1 | 1 | 1 | 0 | 0 | 1 | 8 | 8 | $\sqrt{8}$ | 0 |
| 42840 | 0 | 0 | 0 | 1 | 1 | 0 | 1 | 0 | 1 | 1 | 1 | 0 | 0 | 1 | 0 | 1 | 8 | 8 | $\sqrt{8}$ | 0 |
| 44115 | 1 | 1 | 0 | 0 | 1 | 0 | 1 | 0 | 0 | 0 | 1 | 1 | 0 | 1 | 0 | 1 | 8 | 8 | $\sqrt{8}$ | 0 |
| 45390 | 0 | 1 | 1 | 1 | 0 | 0 | 1 | 0 | 0 | 0 | 1 | 1 | 0 | 1 | 0 | 1 | 8 | 8 | $\sqrt{8}$ | 0 |
| 50490 | 0 | 1 | 0 | 1 | 1 | 1 | 0 | 0 | 1 | 0 | 1 | 0 | 0 | 1 | 1 | 1 | 8 | 8 | $\sqrt{8}$ | 0 |
| 54825 | 1 | 0 | 0 | 1 | 0 | 1 | 0 | 0 | 0 | 1 | 1 | 0 | 1 | 0 | 1 | 1 | 8 | 8 | $\sqrt{8}$ | 0 |
| 60180 | 0 | 0 | 1 | 0 | 1 | 0 | 0 | 0 | 1 | 1 | 0 | 1 | 0 | 1 | 1 | 1 | 8 | 8 | $\sqrt{8}$ | 0 |

TABLE 15

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 5865 | 1 | 0 | 0 | 1 | 0 | 1 | 1 | 1 | 0 | 1 | 1 | 0 | 1 | 0 | 0 | 0 | 8 | 8 | $\sqrt{8}$ | 0 |
| 8925 | 1 | 0 | 1 | 1 | 1 | 0 | 1 | 1 | 0 | 1 | 0 | 0 | 0 | 1 | 0 | 0 | 8 | 8 | $\sqrt{8}$ | 0 |
| 11730 | 0 | 1 | 0 | 0 | 1 | 0 | 1 | 1 | 1 | 0 | 1 | 1 | 0 | 1 | 0 | 0 | 8 | 8 | $\sqrt{8}$ | 0 |
| 17850 | 0 | 1 | 0 | 1 | 1 | 1 | 0 | 1 | 1 | 0 | 1 | 0 | 0 | 0 | 1 | 0 | 8 | 8 | $\sqrt{8}$ | 0 |
| 18615 | 1 | 1 | 1 | 0 | 1 | 1 | 0 | 1 | 0 | 0 | 0 | 1 | 0 | 0 | 1 | 0 | 8 | 8 | $\sqrt{8}$ | 0 |
| 23460 | 0 | 0 | 1 | 0 | 0 | 1 | 0 | 1 | 1 | 1 | 0 | 1 | 1 | 0 | 1 | 0 | 8 | 8 | $\sqrt{8}$ | 0 |
| 28305 | 1 | 0 | 0 | 0 | 0 | 1 | 0 | 1 | 1 | 0 | 1 | 1 | 0 | 1 | 1 | 0 | 8 | 8 | $\sqrt{8}$ | 0 |
| 29835 | 1 | 1 | 0 | 1 | 0 | 0 | 0 | 1 | 0 | 0 | 1 | 0 | 1 | 1 | 1 | 0 | 8 | 8 | $\sqrt{8}$ | 0 |
| 35700 | 0 | 0 | 1 | 0 | 1 | 1 | 1 | 0 | 1 | 1 | 0 | 1 | 0 | 0 | 0 | 1 | 8 | 8 | $\sqrt{8}$ | 0 |
| 37230 | 0 | 1 | 1 | 1 | 0 | 1 | 1 | 0 | 1 | 0 | 0 | 0 | 1 | 0 | 0 | 1 | 8 | 8 | $\sqrt{8}$ | 0 |
| 42075 | 1 | 1 | 0 | 1 | 0 | 1 | 0 | 0 | 0 | 0 | 1 | 0 | 1 | 1 | 0 | 1 | 8 | 8 | $\sqrt{8}$ | 0 |
| 46920 | 0 | 0 | 0 | 1 | 0 | 0 | 1 | 0 | 1 | 1 | 1 | 0 | 1 | 1 | 0 | 1 | 8 | 8 | $\sqrt{8}$ | 0 |
| 47685 | 1 | 0 | 1 | 0 | 0 | 0 | 1 | 0 | 0 | 1 | 0 | 1 | 1 | 1 | 0 | 1 | 8 | 8 | $\sqrt{8}$ | 0 |
| 53805 | 1 | 0 | 1 | 0 | 1 | 0 | 0 | 0 | 1 | 0 | 0 | 1 | 0 | 1 | 1 | 1 | 8 | 8 | $\sqrt{8}$ | 0 |
| 56610 | 0 | 1 | 0 | 0 | 0 | 1 | 0 | 0 | 1 | 1 | 1 | 0 | 1 | 1 | 1 | 0 | 8 | 8 | $\sqrt{8}$ | 0 |
| 59670 | 0 | 1 | 1 | 0 | 1 | 0 | 0 | 0 | 1 | 0 | 0 | 1 | 0 | 1 | 1 | 1 | 8 | 8 | $\sqrt{8}$ | 0 |

TABLE 16

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 6375 | 1 | 1 | 1 | 0 | 0 | 1 | 1 | 1 | 0 | 0 | 0 | 1 | 0 | 0 | 0 | 0 | 8 | 8 | $\sqrt{8}$ | 0 |
| 7395 | 1 | 1 | 0 | 0 | 0 | 1 | 1 | 1 | 0 | 0 | 1 | 1 | 0 | 0 | 0 | 0 | 8 | 8 | $\sqrt{8}$ | 0 |
| 12750 | 0 | 1 | 1 | 1 | 0 | 0 | 1 | 1 | 1 | 0 | 0 | 0 | 1 | 1 | 0 | 0 | 8 | 8 | $\sqrt{8}$ | 0 |
| 14535 | 1 | 1 | 1 | 0 | 0 | 0 | 1 | 1 | 0 | 0 | 0 | 1 | 1 | 1 | 0 | 0 | 8 | 8 | $\sqrt{8}$ | 0 |
| 14790 | 0 | 1 | 1 | 0 | 0 | 0 | 1 | 1 | 1 | 0 | 0 | 1 | 1 | 1 | 0 | 0 | 8 | 8 | $\sqrt{8}$ | 0 |

TABLE 16-continued

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 25500 | 0 | 0 | 1 | 1 | 1 | 0 | 0 | 1 | 1 | 1 | 0 | 0 | 0 | 1 | 1 | 0 | 8 | 8 | $\sqrt{8}$ | 0 |
| 29070 | 0 | 1 | 1 | 1 | 0 | 0 | 0 | 1 | 1 | 0 | 0 | 0 | 1 | 1 | 1 | 0 | 8 | 8 | $\sqrt{8}$ | 0 |
| 29580 | 0 | 0 | 1 | 1 | 0 | 0 | 1 | 1 | 1 | 0 | 0 | 1 | 1 | 1 | 0 | 0 | 8 | 8 | $\sqrt{8}$ | 0 |
| 35955 | 1 | 1 | 0 | 0 | 1 | 1 | 1 | 0 | 0 | 0 | 1 | 1 | 0 | 0 | 0 | 1 | 8 | 8 | $\sqrt{8}$ | 0 |
| 36465 | 1 | 0 | 0 | 0 | 1 | 1 | 1 | 0 | 0 | 1 | 1 | 1 | 0 | 0 | 0 | 1 | 8 | 8 | $\sqrt{8}$ | 0 |
| 40035 | 1 | 1 | 0 | 0 | 0 | 1 | 1 | 0 | 0 | 0 | 1 | 1 | 1 | 0 | 0 | 1 | 8 | 8 | $\sqrt{8}$ | 0 |
| 50745 | 1 | 0 | 0 | 1 | 1 | 1 | 0 | 0 | 0 | 1 | 1 | 0 | 0 | 0 | 1 | 1 | 8 | 8 | $\sqrt{8}$ | 0 |
| 51000 | 0 | 0 | 0 | 1 | 1 | 1 | 0 | 0 | 1 | 1 | 1 | 0 | 0 | 0 | 1 | 1 | 8 | 8 | $\sqrt{8}$ | 0 |
| 52785 | 1 | 0 | 0 | 0 | 1 | 1 | 0 | 0 | 0 | 1 | 1 | 1 | 0 | 0 | 1 | 1 | 8 | 8 | $\sqrt{8}$ | 0 |
| 58140 | 0 | 0 | 1 | 1 | 1 | 0 | 0 | 0 | 1 | 1 | 0 | 0 | 0 | 1 | 1 | 1 | 8 | 8 | $\sqrt{8}$ | 0 |
| 59160 | 0 | 0 | 0 | 1 | 1 | 0 | 0 | 0 | 1 | 1 | 1 | 0 | 0 | 1 | 1 | 1 | 8 | 8 | $\sqrt{8}$ | 0 |

TABLE 17

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 6885 | 1 | 0 | 1 | 0 | 0 | 1 | 1 | 1 | 0 | 1 | 0 | 1 | 1 | 0 | 0 | 0 | 8 | 8 | $\sqrt{8}$ | 0 |
| 1055 | 1 | 1 | 1 | 0 | 1 | 0 | 1 | 1 | 0 | 0 | 0 | 1 | 0 | 1 | 0 | 0 | 8 | 8 | $\sqrt{8}$ | 0 |
| 13770 | 0 | 1 | 0 | 1 | 0 | 0 | 1 | 1 | 1 | 0 | 1 | 0 | 1 | 1 | 0 | 0 | 8 | 8 | $\sqrt{8}$ | 0 |
| 18105 | 1 | 0 | 0 | 1 | 1 | 1 | 0 | 1 | 0 | 1 | 1 | 0 | 0 | 0 | 1 | 0 | 8 | 8 | $\sqrt{8}$ | 0 |
| 20910 | 0 | 1 | 1 | 1 | 0 | 1 | 0 | 1 | 1 | 0 | 0 | 0 | 1 | 0 | 1 | 0 | 8 | 8 | $\sqrt{8}$ | 0 |
| 23715 | 1 | 1 | 0 | 0 | 0 | 1 | 0 | 1 | 0 | 0 | 1 | 1 | 1 | 0 | 1 | 0 | 8 | 8 | $\sqrt{8}$ | 0 |
| 27540 | 0 | 0 | 1 | 0 | 1 | 0 | 0 | 1 | 1 | 1 | 0 | 1 | 0 | 1 | 1 | 0 | 8 | 8 | $\sqrt{8}$ | 0 |
| 29325 | 1 | 0 | 1 | 1 | 0 | 0 | 0 | 0 | 1 | 0 | 0 | 1 | 1 | 1 | 1 | 0 | 8 | 8 | $\sqrt{8}$ | 0 |
| 36210 | 0 | 1 | 0 | 0 | 1 | 1 | 1 | 0 | 1 | 0 | 1 | 1 | 0 | 0 | 0 | 1 | 8 | 8 | $\sqrt{8}$ | 0 |
| 37995 | 1 | 1 | 0 | 1 | 0 | 1 | 1 | 0 | 0 | 0 | 1 | 0 | 1 | 0 | 0 | 1 | 8 | 8 | $\sqrt{8}$ | 0 |
| 41820 | 0 | 0 | 1 | 1 | 1 | 0 | 1 | 0 | 1 | 1 | 0 | 0 | 0 | 1 | 0 | 1 | 8 | 8 | $\sqrt{8}$ | 0 |
| 44625 | 1 | 0 | 0 | 0 | 0 | 1 | 0 | 1 | 1 | 1 | 1 | 0 | 1 | 0 | 1 | 1 | 8 | 8 | $\sqrt{8}$ | 0 |
| 47430 | 0 | 1 | 1 | 0 | 0 | 0 | 1 | 0 | 1 | 0 | 0 | 1 | 1 | 1 | 0 | 1 | 8 | 8 | $\sqrt{8}$ | 0 |
| 51765 | 1 | 0 | 1 | 0 | 1 | 1 | 0 | 0 | 0 | 1 | 0 | 1 | 0 | 0 | 1 | 1 | 8 | 8 | $\sqrt{8}$ | 0 |
| 55080 | 0 | 0 | 0 | 1 | 0 | 1 | 0 | 0 | 1 | 1 | 1 | 0 | 1 | 0 | 1 | 1 | 8 | 8 | $\sqrt{8}$ | 0 |
| 58650 | 0 | 1 | 0 | 1 | 1 | 0 | 0 | 0 | 1 | 0 | 1 | 0 | 0 | 1 | 1 | 1 | 8 | 8 | $\sqrt{8}$ | 0 |

TABLE 18

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 9435 | 1 | 1 | 0 | 1 | 1 | 0 | 1 | 1 | 0 | 0 | 1 | 0 | 0 | 1 | 0 | 0 | 8 | 8 | $\sqrt{8}$ | 0 |
| 9945 | 1 | 0 | 0 | 1 | 1 | 0 | 1 | 1 | 0 | 1 | 1 | 0 | 0 | 1 | 0 | 0 | 8 | 8 | $\sqrt{8}$ | 0 |
| 14025 | 1 | 0 | 0 | 1 | 0 | 0 | 1 | 1 | 0 | 1 | 1 | 0 | 1 | 1 | 0 | 0 | 8 | 8 | $\sqrt{8}$ | 0 |
| 18870 | 0 | 1 | 1 | 0 | 1 | 0 | 1 | 1 | 1 | 0 | 0 | 1 | 0 | 0 | 1 | 0 | 8 | 8 | $\sqrt{8}$ | 0 |
| 19890 | 0 | 1 | 0 | 0 | 1 | 1 | 0 | 1 | 1 | 0 | 1 | 1 | 0 | 0 | 1 | 0 | 8 | 8 | $\sqrt{8}$ | 0 |
| 25755 | 1 | 1 | 0 | 1 | 1 | 0 | 0 | 1 | 0 | 0 | 1 | 0 | 0 | 1 | 1 | 0 | 8 | 8 | $\sqrt{8}$ | 0 |
| 27795 | 1 | 1 | 0 | 0 | 1 | 0 | 0 | 1 | 0 | 0 | 1 | 1 | 0 | 1 | 1 | 0 | 8 | 8 | $\sqrt{8}$ | 0 |
| 28050 | 0 | 1 | 0 | 0 | 0 | 0 | 1 | 1 | 1 | 1 | 0 | 1 | 1 | 0 | 0 | 0 | 8 | 8 | $\sqrt{8}$ | 0 |
| 37485 | 1 | 0 | 1 | 1 | 0 | 1 | 1 | 0 | 0 | 1 | 0 | 0 | 1 | 0 | 0 | 1 | 8 | 8 | $\sqrt{8}$ | 0 |
| 37740 | 0 | 0 | 1 | 1 | 0 | 1 | 1 | 0 | 1 | 0 | 0 | 1 | 0 | 0 | 1 | 1 | 8 | 8 | $\sqrt{8}$ | 0 |
| 39780 | 0 | 0 | 1 | 0 | 0 | 1 | 1 | 0 | 1 | 1 | 0 | 1 | 0 | 0 | 0 | 1 | 8 | 8 | $\sqrt{8}$ | 0 |
| 45645 | 1 | 0 | 1 | 1 | 0 | 1 | 0 | 0 | 1 | 0 | 0 | 1 | 1 | 0 | 1 | 1 | 8 | 8 | $\sqrt{8}$ | 0 |
| 46665 | 1 | 0 | 0 | 1 | 0 | 0 | 1 | 0 | 0 | 1 | 1 | 0 | 1 | 1 | 0 | 1 | 8 | 8 | $\sqrt{8}$ | 0 |
| 51510 | 0 | 1 | 1 | 0 | 1 | 1 | 0 | 0 | 1 | 0 | 0 | 1 | 0 | 0 | 1 | 1 | 8 | 8 | $\sqrt{8}$ | 0 |
| 55590 | 0 | 1 | 1 | 0 | 0 | 1 | 0 | 0 | 1 | 0 | 1 | 0 | 1 | 1 | 0 | 1 | 8 | 8 | $\sqrt{8}$ | 0 |
| 56100 | 0 | 0 | 1 | 0 | 0 | 1 | 0 | 0 | 1 | 1 | 0 | 1 | 1 | 0 | 1 | 1 | 8 | 8 | $\sqrt{8}$ | 0 |

TABLE 19

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 10965 | 1 | 0 | 1 | 0 | 1 | 0 | 1 | 1 | 0 | 1 | 0 | 1 | 0 | 1 | 0 | 0 | 8 | 8 | $\sqrt{8}$ | 0 |
| 19125 | 1 | 0 | 1 | 0 | 1 | 1 | 0 | 1 | 0 | 1 | 0 | 0 | 1 | 0 | 1 | 0 | 8 | 8 | $\sqrt{8}$ | 0 |
| 21165 | 1 | 0 | 1 | 1 | 0 | 1 | 0 | 1 | 0 | 0 | 1 | 0 | 1 | 0 | 1 | 0 | 8 | 8 | $\sqrt{8}$ | 0 |
| 21675 | 1 | 1 | 0 | 1 | 0 | 1 | 0 | 0 | 1 | 0 | 1 | 0 | 1 | 0 | 1 | 0 | 8 | 8 | $\sqrt{8}$ | 0 |
| 21930 | 0 | 1 | 0 | 1 | 0 | 1 | 1 | 0 | 1 | 0 | 1 | 0 | 1 | 0 | 1 | 0 | 8 | 8 | $\sqrt{8}$ | 0 |
| 22185 | 1 | 0 | 0 | 1 | 0 | 1 | 0 | 1 | 1 | 0 | 1 | 0 | 1 | 0 | 1 | 0 | 8 | 8 | $\sqrt{8}$ | 0 |
| 23205 | 1 | 0 | 1 | 0 | 0 | 1 | 0 | 1 | 0 | 1 | 0 | 1 | 1 | 0 | 1 | 0 | 8 | 8 | $\sqrt{8}$ | 0 |

TABLE 19-continued

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 27285 | 1 | 0 | 1 | 0 | 1 | 0 | 0 | 1 | 0 | 1 | 0 | 1 | 0 | 1 | 1 | 0 | 8 | 8 | $\sqrt{8}$ | 0 |
| 38250 | 0 | 1 | 0 | 1 | 0 | 1 | 1 | 0 | 1 | 0 | 1 | 0 | 1 | 0 | 0 | 1 | 8 | 8 | $\sqrt{8}$ | 0 |
| 42330 | 0 | 1 | 0 | 1 | 1 | 0 | 1 | 0 | 1 | 0 | 1 | 0 | 0 | 1 | 0 | 1 | 8 | 8 | $\sqrt{8}$ | 0 |
| 43350 | 0 | 1 | 1 | 0 | 1 | 0 | 1 | 0 | 1 | 0 | 0 | 1 | 0 | 1 | 0 | 1 | 8 | 8 | $\sqrt{8}$ | 0 |
| 43605 | 1 | 0 | 1 | 0 | 1 | 0 | 1 | 0 | 0 | 1 | 0 | 1 | 0 | 1 | 0 | 1 | 8 | 8 | $\sqrt{8}$ | 0 |
| 43860 | 0 | 0 | 1 | 0 | 1 | 0 | 1 | 0 | 1 | 1 | 0 | 1 | 0 | 1 | 0 | 1 | 8 | 8 | $\sqrt{8}$ | 0 |
| 44370 | 0 | 1 | 0 | 0 | 1 | 0 | 1 | 0 | 1 | 0 | 1 | 1 | 0 | 1 | 0 | 1 | 8 | 8 | $\sqrt{8}$ | 0 |
| 46410 | 0 | 1 | 0 | 1 | 0 | 0 | 1 | 0 | 1 | 0 | 1 | 0 | 1 | 1 | 0 | 1 | 8 | 8 | $\sqrt{8}$ | 0 |
| 54570 | 0 | 1 | 0 | 1 | 0 | 1 | 0 | 0 | 1 | 0 | 1 | 0 | 1 | 0 | 1 | 1 | 8 | 8 | $\sqrt{8}$ | 0 |

TABLE 20

| Index | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $w_H$ | min $d_H$ | min $d_E$ | p |
|---|---|---|---|---|---|---|---|---|---|---|---|---|---|---|---|---|---|---|---|---|
| 11475 | 1 | 1 | 0 | 0 | 1 | 0 | 1 | 1 | 0 | 0 | 1 | 1 | 0 | 1 | 0 | 0 | 8 | 8 | $\sqrt{8}$ | 0 |
| 13005 | 1 | 0 | 1 | 1 | 0 | 0 | 1 | 1 | 0 | 1 | 0 | 0 | 1 | 1 | 0 | 0 | 8 | 8 | $\sqrt{8}$ | 0 |
| 13515 | 1 | 1 | 0 | 1 | 0 | 0 | 1 | 1 | 0 | 1 | 0 | 1 | 1 | 0 | 0 | 0 | 8 | 8 | $\sqrt{8}$ | 0 |
| 19635 | 1 | 1 | 0 | 0 | 1 | 1 | 0 | 1 | 0 | 0 | 1 | 1 | 0 | 0 | 1 | 0 | 8 | 8 | $\sqrt{8}$ | 0 |
| 22950 | 0 | 1 | 1 | 0 | 0 | 1 | 0 | 1 | 1 | 0 | 0 | 1 | 1 | 0 | 1 | 0 | 8 | 8 | $\sqrt{8}$ | 0 |
| 26010 | 0 | 1 | 0 | 1 | 1 | 0 | 0 | 1 | 1 | 0 | 1 | 0 | 0 | 1 | 1 | 0 | 8 | 8 | $\sqrt{8}$ | 0 |
| 26265 | 1 | 0 | 0 | 1 | 1 | 0 | 1 | 0 | 1 | 1 | 0 | 0 | 1 | 1 | 0 | 0 | 8 | 8 | $\sqrt{8}$ | 0 |
| 27030 | 0 | 1 | 1 | 0 | 1 | 0 | 0 | 1 | 1 | 0 | 0 | 1 | 0 | 1 | 1 | 0 | 8 | 8 | $\sqrt{8}$ | 0 |
| 38505 | 1 | 0 | 0 | 1 | 0 | 1 | 1 | 0 | 0 | 1 | 1 | 0 | 1 | 0 | 0 | 1 | 8 | 8 | $\sqrt{8}$ | 0 |
| 39270 | 0 | 1 | 1 | 0 | 0 | 1 | 1 | 0 | 1 | 0 | 0 | 1 | 1 | 0 | 0 | 1 | 8 | 8 | $\sqrt{8}$ | 0 |
| 39525 | 1 | 0 | 1 | 0 | 0 | 1 | 1 | 0 | 1 | 0 | 1 | 1 | 0 | 0 | 0 | 1 | 8 | 8 | $\sqrt{8}$ | 0 |
| 42585 | 1 | 0 | 0 | 1 | 1 | 0 | 1 | 0 | 0 | 1 | 1 | 0 | 0 | 1 | 0 | 1 | 8 | 8 | $\sqrt{8}$ | 0 |
| 45900 | 0 | 0 | 1 | 1 | 0 | 0 | 1 | 0 | 1 | 1 | 0 | 0 | 1 | 0 | 1 | 1 | 8 | 8 | $\sqrt{8}$ | 0 |
| 52020 | 0 | 0 | 1 | 0 | 1 | 1 | 0 | 0 | 1 | 1 | 0 | 0 | 1 | 1 | 0 | 1 | 8 | 8 | $\sqrt{8}$ | 0 |
| 52530 | 0 | 1 | 0 | 0 | 1 | 1 | 0 | 1 | 0 | 1 | 1 | 0 | 0 | 1 | 0 | 1 | 8 | 8 | $\sqrt{8}$ | 0 |
| 54060 | 0 | 0 | 1 | 1 | 0 | 1 | 0 | 0 | 1 | 1 | 0 | 0 | 1 | 0 | 1 | 1 | 8 | 8 | $\sqrt{8}$ | 0 |

At step 204, the method 200 includes determining whether each spreading sequence in the circular shift equivalent set meets the pre-defined spreading sequence criteria such as the balanced criteria, the non-repetition criteria, the non-circular criteria, and the conjugate criteria. If it is determined at step 204, that each spreading sequence in the circular shift equivalent set does not meets the pre-defined spreading sequence criteria, then the method 200 includes generating circular shift equivalent sets of spreading sequences as mentioned in step 202.

If it is determined at step 204, that each spreading sequence meets the pre-defined spreading sequence criteria, then at step 206, the method 200 includes obtaining a variable spreading factor sequence by selecting one of a sequence from the circular shift equivalent set associated with a particular spreading factor. Among the circular equivalent sets for variable spreading factors, the proposed method creates a hierarchical codebook structure by combining different code word from each spreading factor.

In an embodiment, the method proposed two kinds of orthogonal expansion of preamble sequences.

$$c_m = [1_{m/4} \otimes c_2 1_{m/4} \otimes \tilde{c}_2] \text{ for}$$

$$m \stackrel{\Delta}{=} 2^t \text{ and } t \geq 2. \quad \text{Orthogonal Expansion 1:}$$

$c_2$=[1 0], $c_4$=[1 0 0 1], $c_8$=[1 0 1 0 0 1 0 1], $c_{16}$=[1 0 1 0 1 0 0 1 0 1 0 1 0 1 0 1]

At step 208, the method 200 includes forming a set of sequences from the sequence based on orthogonal expansion-1. The larger length sequences in the set are constructed by repeating the lowest spreading factor sequence for one half of the length of the larger sequence and a conjugate of the first half for the other half of the sequence.

In an example, the sequences can be of length {2, 4, 8, 16} etc. Once the sequences of lengths {2, 4, 8, 16} are obtained they can be repeated a number of times as shown in Table-21 below.

TABLE 21

| m = 2 | 1 | 0 | 1 | 0 | 1 | 0 | 1 | 0 | 1 | 0 | 1 0 1 0 1 0 |
| m = 4 | 1 | 0 | 0 | 1 | 1 | 0 | 0 | 1 | 1 | 0 | 0 1 1 0 0 1 |
| m = 8 | 1 | 0 | 1 | 0 | 0 | 1 | 0 | 1 | 1 | 0 | 1 0 0 1 0 1 |
| m = 16 | 1 | 0 | 1 | 0 | 1 | 0 | 1 | 0 | 0 | 1 | 0 1 0 1 0 1 |

As shown in the Table-21 above, the larger length sequences and its resulting conjugate mirror sequence is used for generating variable spreading factor sequences. The sequences may be periodically repeated for generation of the synchronization preamble.

$$c_m = [c_{m/2} \tilde{c}_{m/2}] \text{ for } m \stackrel{\Delta}{=} 2^t \text{ and } t \geq 2. \quad \text{Orthogonal Expansion 2:}$$

$c_2$=[1 0], $c_4$=[1 0 0 1], $c_8$=[1 0 0 1 0 1 1 0], $c_{16}$=[1 0 0 1 0 1 1 0 0 1 1 0 1 0 0 1]

At step 208, the method 200 includes obtaining the variable, spreading factor sequences by forming a set of sequences based on orthogonal expansion-2. The sequence of a particular length is constructed by concatenation of a preceding sequence and its complement. The preceding sequence is an element of its corresponding shift equivalent set.

TABLE 22

| m = 2 | 1 | 0 | 1 | 0 | 1 | 0 | 1 | 0 | 1 | 0 | 1 0 1 0 1 0 |
| m = 4 | 1 | 0 | 0 | 1 | 1 | 0 | 0 | 1 | 1 | 0 | 0 1 1 0 0 1 |
| m = 8 | 1 | 0 | 0 | 1 | 0 | 1 | 1 | 0 | 0 | 1 | 0 1 0 1 1 0 |
| m = 16 | 1 | 0 | 0 | 1 | 0 | 1 | 1 | 0 | 0 | 1 | 1 0 1 0 0 1 |

Table-22 above shows orthogonal expansion-2 where a sequence is constructed from its preceding sequence and it's conjugate for variable spreading factor sequences. The sequences may be periodically repeated for generation of the synchronization preamble. Note that conjugated sequence is defined as $\tilde{c}_m = c_m \oplus 1_m$ where $\oplus$ the binary exclusive or (XOR) operation.

As shown in the table-22 above, the sequences are typically of length $\{2, 4, 8, 16\}$. The larger spreading factor length sequence is of length 16. A sequence of a particular length is obtained by the concatenation of preceding sequence and its complement. For example the sequence $c_{16}$ is formed by the concatenation of $c_8$ the complement of $c_8$. Similarly $c_8$ is constructed by the concatenation of $c_4$ and the complement of $c_4$. Similarly $c_4$ is the concatenation of $c_2$ and the complement of $c_2$.

At step 210, the method 200 includes selecting said spreading sequence from orthogonal expansion-1 and/or orthogonal expansion-2.

The various actions, acts, blocks, steps, and the like in method 200 may be performed in the order presented, in a different order or simultaneously. Further, in some embodiments, some actions, acts, blocks, steps, and the like may be omitted, added, modified, skipped, and the like without departing from the scope of the invention.

In an embodiment, the proposed method adapts non-coherent preamble and spreading sequences for coherent mode of operation. Due to different complexity limitations in coherent and non-coherent receivers, these preamble sequences are designed to provide different periods for coherent and non-coherent receivers in the transmission of a common sequence. That is, the preamble for coherent receiver is designed based on the repetitive extension of the preamble for non-coherent receiver.

Ternary Sequence Adaptation:

TABLE 23

| Label | Basic Sequence | Repetition | Length | Number of 1s |
|---|---|---|---|---|
| OOK-2 or ½-OOK | 1 0 | 32 | 64 | 32 |
| OOK-4 or ¼-OOK | 1 0 0 1 | 32 | 128 | 64 |
| OOK-8 or ⅛-OOK | 1 0 1 0 0 1 0 1 | 32 | 256 | 128 |
| OOK-16 or ¹⁄₁₆-OOK | 1 0 1 0 1 0 1 0 0 1 0 1 0 1 0 1 | 32 | 512 | 256 |

Above Table-23 shows exemplary variable spreading factor sequences for m=2, 4, 8, 16 and their number of repetitions. These are labeled as OOK-2, OOK-4, OOK-8 and OOK-16 respectively. Alternatively these are labeled as ½-OOK, ¼-OOK, ⅛-OOK and ¹⁄₁₆-OOK respectively. In an embodiment, the above Table-23 summarizes the description of the non-coherent sequences. There can be plurality of repetitions of the basic sequence which correspondingly changes the length of the sequence and also the number of is in the sequence.

In order to generate a ternary sequence out of the above non-coherent sequences with good correlation properties, the sequence should be the same in the non-coherent mode. After applying an envelope detector on the ternary sequence at the receiver, the resulting sequence should be the corresponding non-coherent sequence. In the coherent mode, the is in the non-coherent sequences can take values $\{1$ or $-1\}$. However the positions of the zeros remain unchanged.

The proposed method obtains ternary sequences from the non-coherent sequences such that:
The alphabets to be used are $\{-1, 0, 1\}$
The positions of the zeros are fixed depending on the non-coherent sequences in Table 1.
The ones in the non-coherent sequences can take on values $\{-1, 1\}$
Under the above constraints, the ternary sequences for all the modes namely OOK-2, OOK-4, OOK-8 and OOK-16 are required to have good correlation properties Further, the proposed method achieves good procession gain by considering long length over which the correlation is carried out. However the proposed method also considers that the length should not be too long which will overshoot memory requirements which are critical in low power communications. In an embodiment, the proposed method considers lengths as 16, 32 and 64. The procedure adopted for the 16 length and 32 length preambles are the same (refer FIG. 3). Although the same procedure may be adopted for the 64 length correlation, the procedure adopted for the 64 length case is different as the search space is too large and hence coming out with the sequence is time consuming. Also, the method adopted for the 64 length sequence can be adopted for other lengths.

Figure 3:
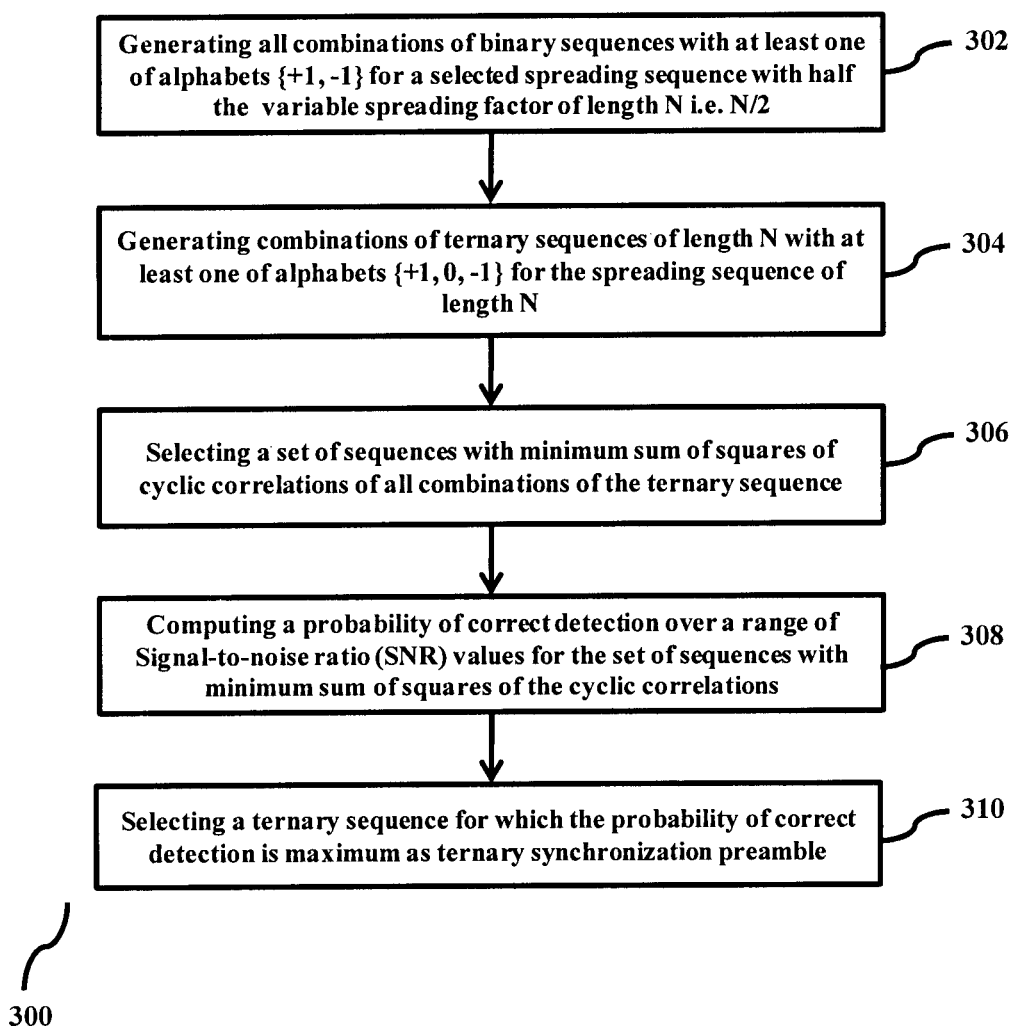
FIG. 3 is a flow diagram illustrating a method for selecting an N length ternary sequence with elements {1, 0, −1} from a spreading sequence of length N with elements {1 0} in coherent mode, according to embodiments as disclosed herein.

FIG. 3 is a flow diagram illustrating a method 300 for selecting an N length ternary sequence with elements $\{1, 0, -1\}$ from a spreading sequence of length N=16 and N=32 with elements $\{1\ 0\}$ in coherent mode, according to embodiments as disclosed herein. In an embodiment, the length over which the correlation is computed decides the period of the ternary sequence. A plurality of such periods may be employed for the above ternary sequence to improve the synchronization performance.

At step 302, the method 300 includes generating all combinations of binary sequences with at least one of alphabets $\{+1, -1\}$ for a selected spreading sequence with half the variable spreading factor of length N i.e. N/2. In an embodiment, the selected spreading sequence has alphabets $\{1, 0\}$.

At step 304, the method 300 includes generating $2^{N/2}$ combinations of ternary sequences of length N with at least one of alphabets $\{+1, 0, -1\}$ for the selected spreading sequence of length N.

Let such sequences be represented as $$A_i = \{a_0^i, a_1^i, a_2^i, La_{N-1}^i\},\ 0 \leq i \leq 2^{N/2}-1$$

In an embodiment, the $2^{N/2}$ combinations are generated by substituting positions of N/2 ones in the selected spreading sequence of length N by all possible $2^{N/2}$ combinations of the N/2 length binary sequences with at least one of alphabets $\{1, -1\}$.

Calculate the cyclic correlations of all the $2^{N/2}$ ternary sequences $$R_{aa}^i(\tau) = \sum_{n=0}^{P-1} a_n^i a_{(n+\tau) \bmod P}^i,$$

$$0 \leq i \leq 2^{N/2} - 1$$

Calculate the sum of the squares of the side correlations of the $2^{N/2}$ ternary sequences $$S_i = \sum_{\tau=1}^{P-1} [R_{aa}^i(\tau)]^2,$$

$$0 \leq i \leq 2^{N/2} - 1$$

At step 306, the method 300 includes selecting a set of sequences with minimum sum of squares of cyclic correlations of all combinations of the ternary sequence.

$$Z=\min\{S_i\}$$

The number of such sequences is typically very less compared to $2^{N/2}$. For example for N=32, the number of such sequences are typically lesser than $2^{16}/50$.

At step 308, the method 300 includes computing a probability of correct detection over a range of Signal-to-noise ratio (SNR) values for the set of sequences with minimum sum of squares of the cyclic correlations. For these reduced set of sequences Z, computing the probability of correct detection over a range of SNR values. In an embodiment, the SNR range is chosen such that the probability of correct detection varies from 0.1 to the lowest SNR at which the probability of correct detection is 1.

To obtain the range of SNR values any one of the sequences in the set Z is used. The probability of correct detection is computed for various SNRs. The SNR range at which the probability of correct detection varies from 0.1 to 1 is observed. This SNR range is set as the SNR range over which the probability of correct detection is to be computed. The probability of correct detection for all the sequences in Z is computed over this SNR range.

In an embodiment, the probability of correct detection is computed by the method described herein.

The ternary sequence preamble is appended to the data payload of 20 bytes to form the packet. A random integer offsets is added to the packet. Then the packet is passed through an additive white Gaussian noise channel. The received signal is then correlated with the same ternary sequence preamble.

$$R_{ay}(\tau) = \frac{\sum_{n=0}^{N-1} a_n y(n+\tau)}{N\sigma_a \sigma_y}$$

Here $\sigma_a$ and $\sigma_y$ are the standard deviations of the sequence and the received signal respectively. The above correlation is compared to a pre-defined threshold and the packet is said to be detected if the correlation $R_{ay}(\tau)$ exceeds this threshold. The packet is said to be detected correctly if the detection occurs at the correct index. Repeated such trials are carried out with various packets and various random offsets and the average probability of correct detection is calculated. This is performed for the range of SNRs.

At step 310, the method 300 includes selecting a ternary sequence for which the probability of correct detection is maximum as ternary synchronization preamble. In an embodiment, for each sequence in Z, the sum of the probabilities of correct detection over the said SNR range is computed. The sequence, for which the sum of the probabilities of correct detection is maximum, is chosen as the ternary synchronization preamble.

The various actions, acts, blocks, steps, and the like in method 300 may be performed in the order presented, in a different order or simultaneously. Further, in some embodiments, some actions, acts, blocks, steps, and the like may be omitted, added, modified, skipped, and the like without departing from the scope of the invention.

In an embodiment, the method 300 can be used for arbitrary lengths of N. As N increases, the search space for the sequences increases exponentially. Exemplary codes when the length for correlation, i.e. N=32 and N=16 are given in Tables 24 and 25 below respectively. The synchronization preamble sequences can use a plurality of such ternary sequences to improve performance

TABLE 24

| Label | Equivalent Ternary Sequence with N = 32 |
|---|---|
| OOK-2<br>½ OOK | [-1 0 -1 0 1 0 1 0 -1 0 -1 0 1 0 -1 0<br>1 0 1 0 1 0 -1 0 -1 0 1 0 -1 0 -1 0] |
| OOK-4<br>¼-OOK | [1 0 0 1 1 0 0 1 1 0 0 1 1 0 0 -1<br>-1 0 0 1 -1 0 0 1 -1 0 0 1 -1 0 0 -1] |
| OOK-8<br>⅛-OOK | [1 0 -1 0 0 -1 0 -1 1 0 1 0 0 -1 0 1<br>1 0 1 0 0 -1 0 1 -1 0 1 0 0 1 0 1]; |
| OOK-16<br>1/16-OOK | [-1 0 -1 0 -1 0 -1 0 0 -1 0 1 0 1 0 -1<br>-1 0 1 0 -1 0 1 0 0 1 0 1 0 -1 0 -1]; |

Table-24 above shows exemplary ternary sequences obtained from the sequences in Table-23 for ternary sequence length N=32.

TABLE 25

| Label | Equivalent Ternary Sequence with N = 16 |
|---|---|
| OOK-2<br>½ OOK | Seq1 = [-1 0 1 0 1 0 1 0 1 0 -1 0 1 0 -1 0]; |
| OOK-4<br>¼-OOK | Seq1 = [-1 0 0 1 1 0 0 -1 1 0 0 1 1 0 0 1]<br>Seq2 = [-1 0 0 1 -1 0 0 1 1 0 0 1 -1 0 0 -1] |
| OOK-8<br>⅛-OOK | Seq1 = [1 0 -1 0 0 -1 0 1 1 0 1 0 0 1 0 1];<br>Seq2 = [-1 0 -1 0 0 -1 0 -1 1 0 -1 0 0 -1 0 1]; |
| OOK-16<br>1/16-OOK | Seq1 = [1 0 -1 0 -1 0 1 0 0 1 0 -1 0 -1 0 -1];<br>Seq2 = [-1 0 -1 0 1 0 1 0 0 1 0 -1 0 1 0 1]; |

Table-25 above shows exemplary ternary sequences obtained from the sequences in Table-23 for ternary sequence length N=16.

Figure 4A:
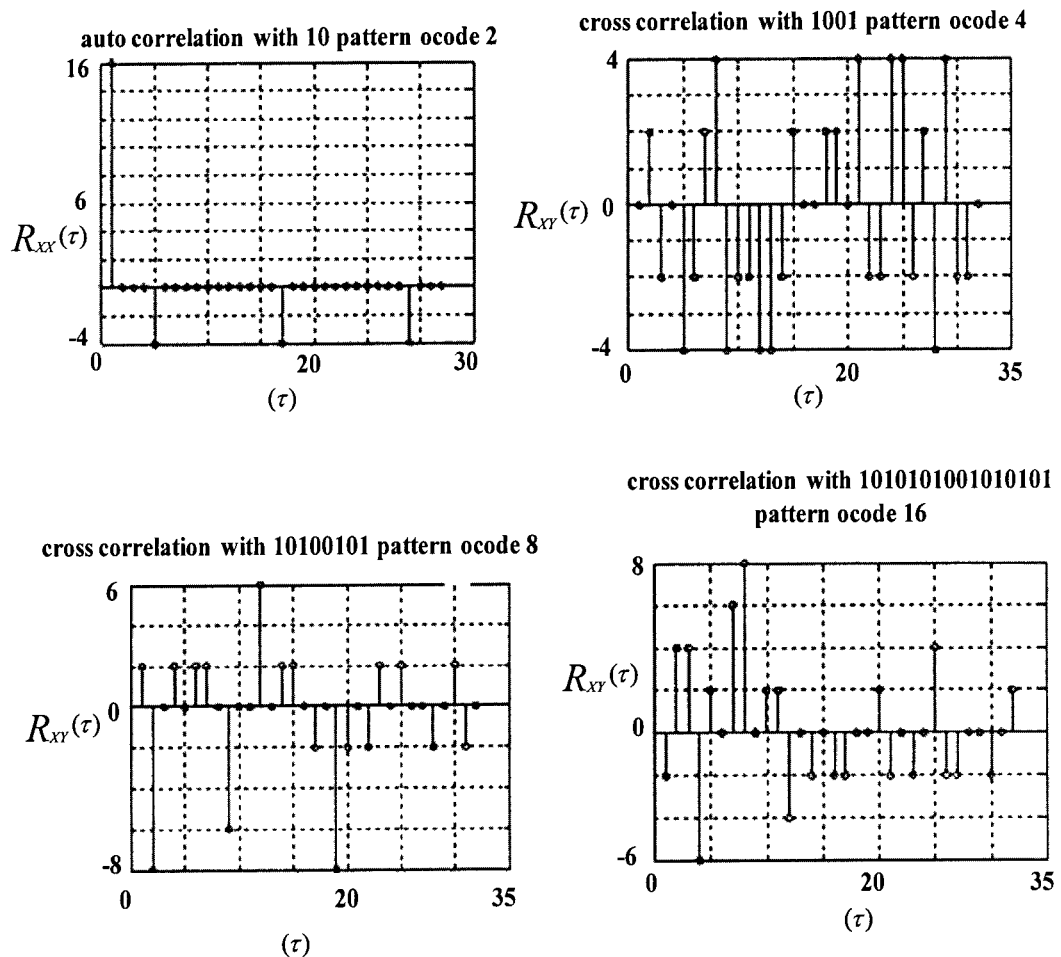
FIG. 4a shows graphs of autocorrelation and cross correlation properties for OOK-2 for N=32, according to embodiments as disclosed herein.

FIG. 4a shows graphs of autocorrelation and cross correlation properties for OOK-2 for N=32, according to embodiments as disclosed herein. The cross correlation properties are with OOK-4, OOK-8 and OOK-16.

Figure 4B:
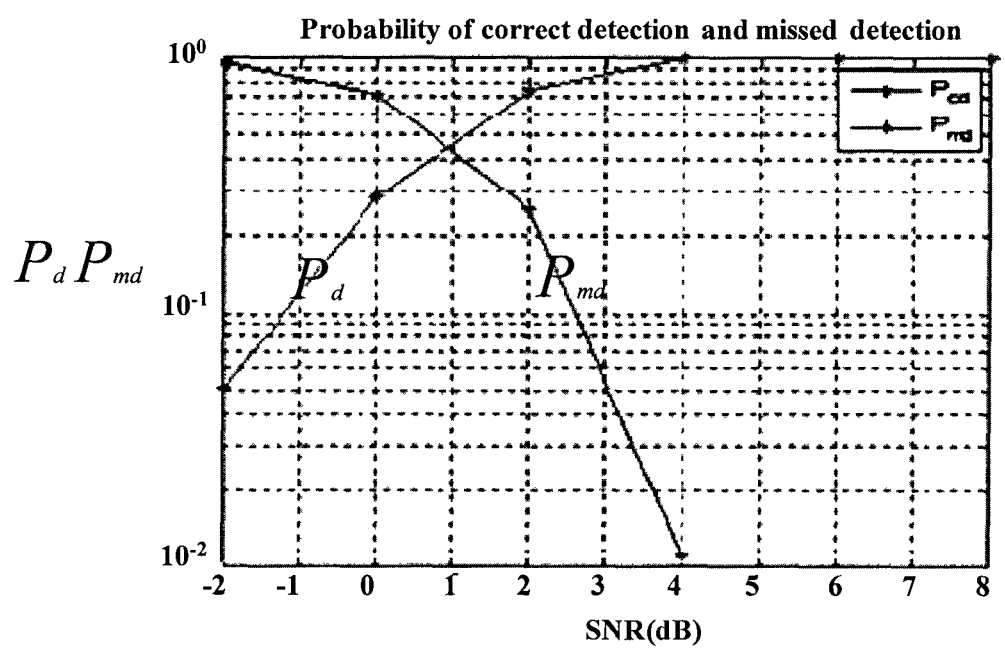
FIG. 4b shows a graph of probability of correct detection for N=32OOK-2, according to embodiments as disclosed herein.

FIG. 4b shows a graph of probability of correct detection for N=32 OOK-2, according to embodiments as disclosed herein. The probability of correct detection and probability of missed detection as a function of SNR are displayed for OOK 2.

Figure 5A:
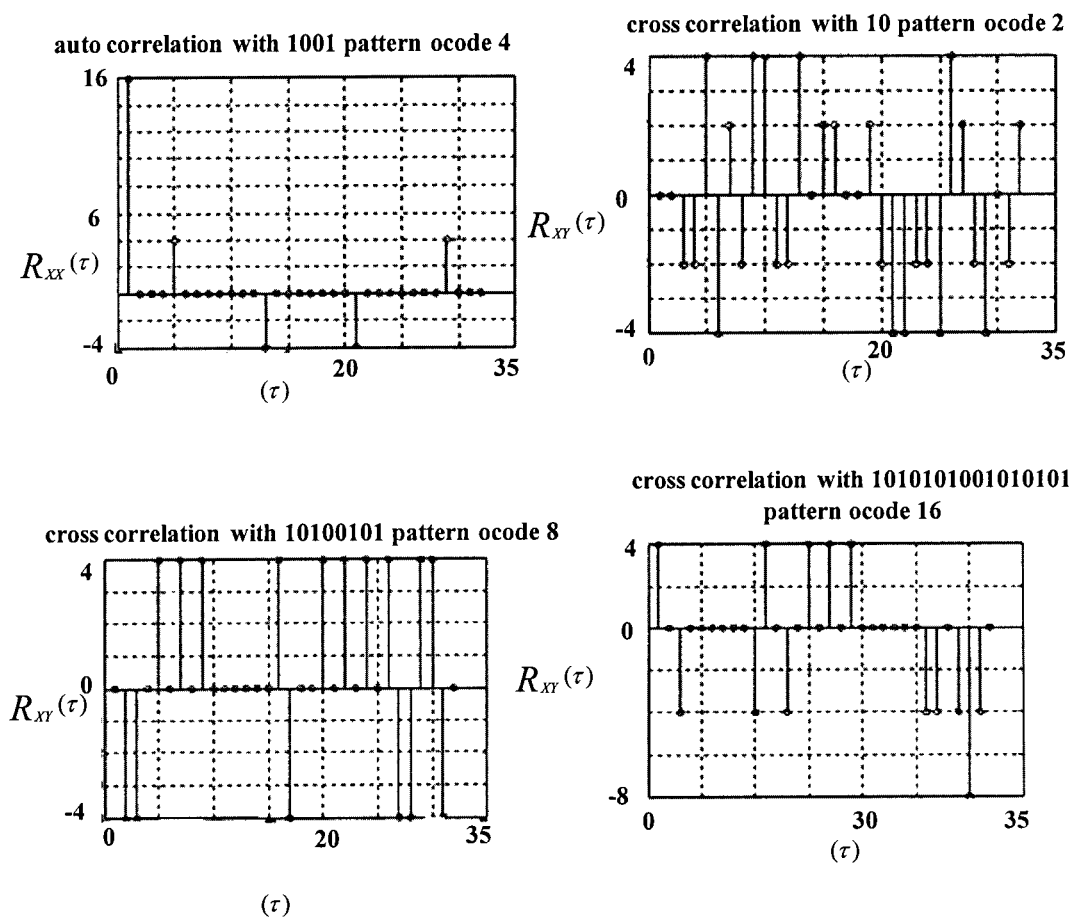
FIG. 5a shows graphs of autocorrelation and cross correlation properties for OOK-4 for N=32, according to embodiments as disclosed herein.

FIG. 5a shows graphs of autocorrelation and cross correlation properties for OOK-4 for N=32, according to embodiments as disclosed herein. The cross correlation properties are with OOK-2, OOK-8 and OOK-16.

Figure 5B:
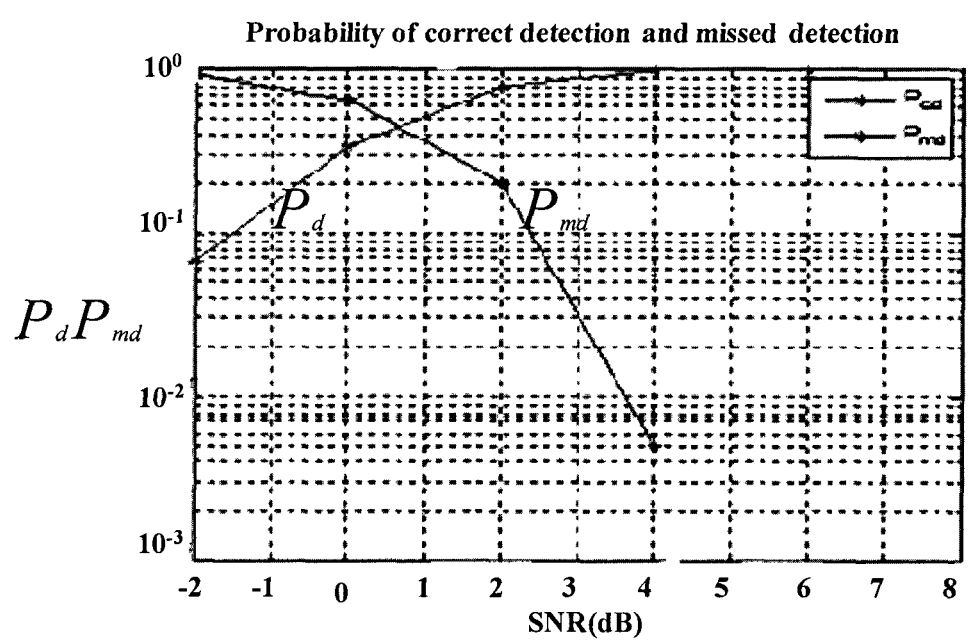
FIG. 5b shows a graph of probability of correct detection for N=32OOK-4, according to embodiments as disclosed herein.

FIG. 5b shows a graph of probability of correct detection for N=32 OOK-4, according to embodiments as disclosed herein. The probability of correct detection and probability of missed detection as a function of SNR are displayed for OOK-4.

Figure 6A:
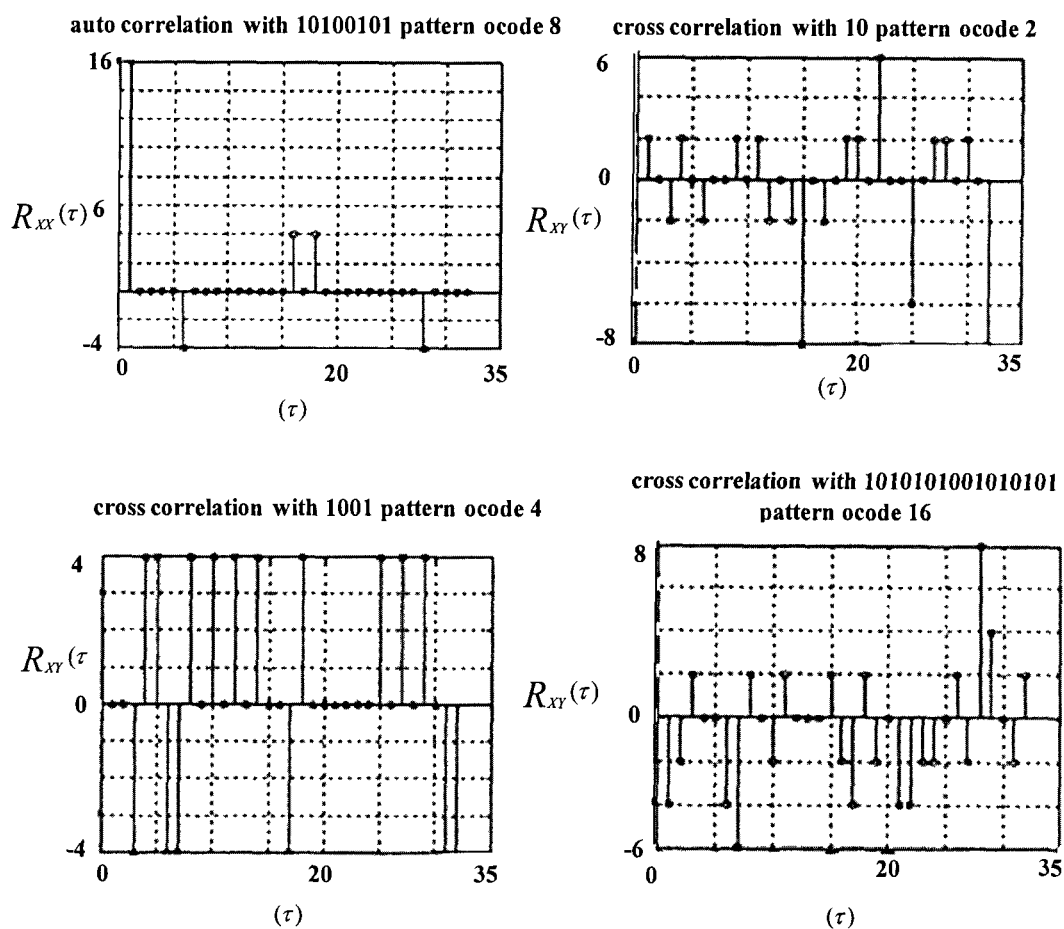
FIG. 6a shows graphs of autocorrelation and cross correlation properties for OOK-8 for N=32, according to embodiments as disclosed herein.

FIG. 6a shows graphs of autocorrelation and cross correlation properties for OOK-8 for N=32, according to embodiments as disclosed herein. The cross correlation properties are with OOK-2, OOK-4 and OOK-16.

Figure 6B:
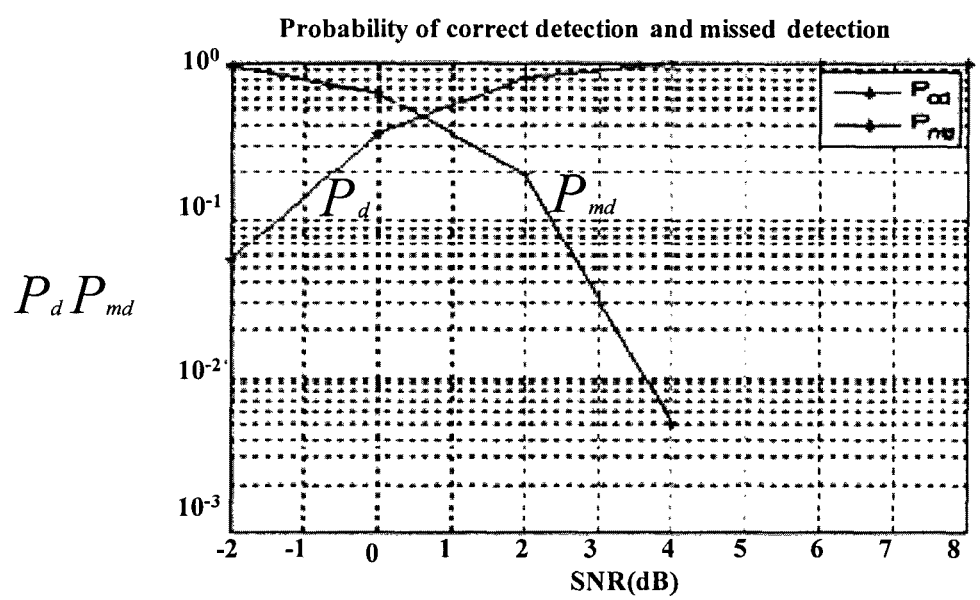
FIG. 6b shows a graph of probability of correct detection for N=32OOK-8, according to embodiments as disclosed herein.

FIG. 6b shows a graph of probability of correct detection for N=32 OOK-8, according to embodiments as disclosed herein. The probability of correct detection and probability of missed detection as a function of SNR are displayed for OOK-8.

Figure 7A:
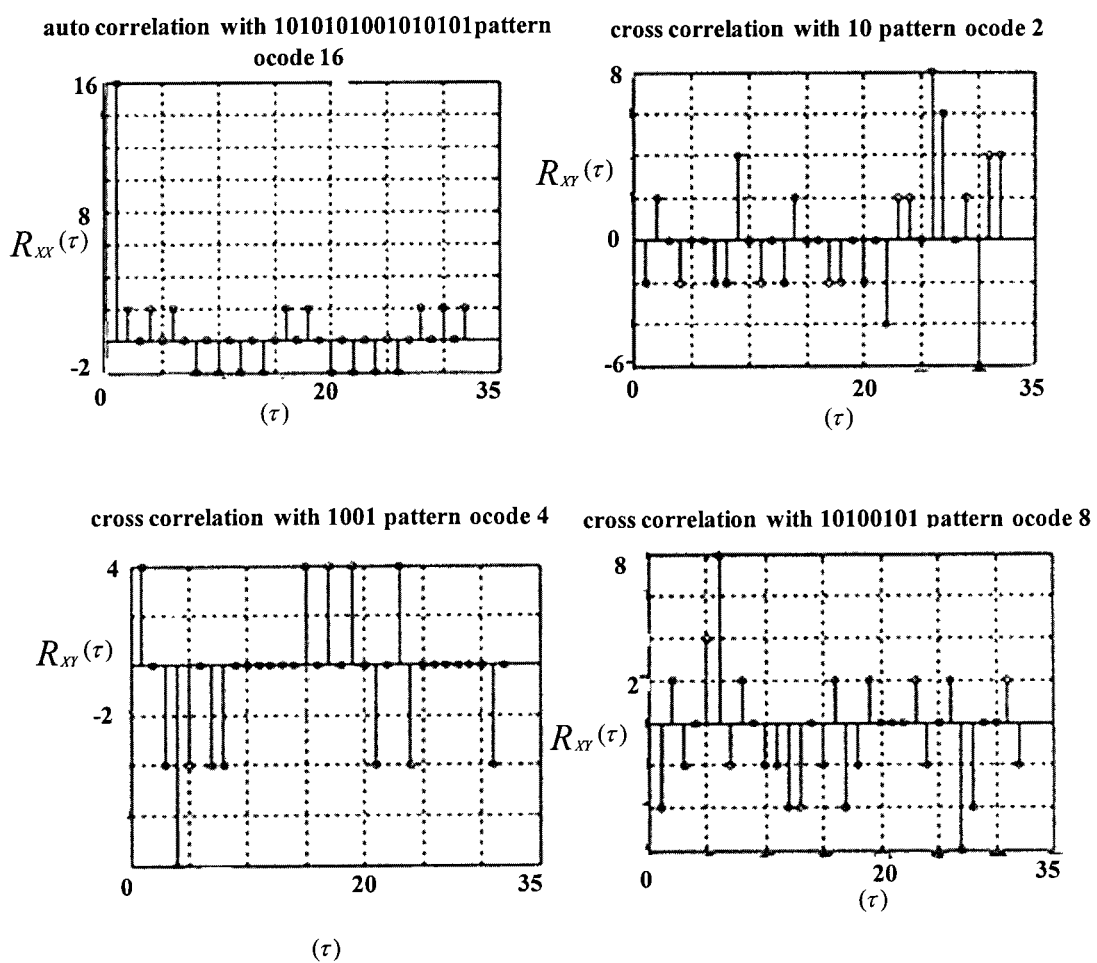
FIG. 7a shows graphs of autocorrelation and cross correlation properties for OOK-16 for N=32, according to embodiments as disclosed herein.

FIG. 7a shows graphs of autocorrelation and cross correlation properties for OOK-16 for N=32, according to embodiments as disclosed herein. The cross correlation properties are with OOK-2, OOK-4 and OOK-8.

Figure 7B:
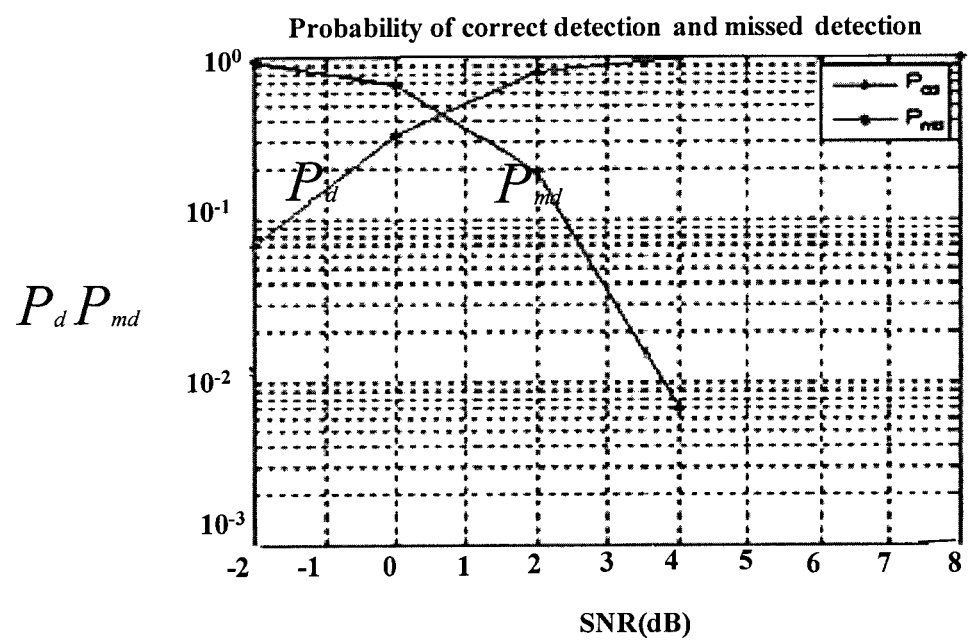
FIG. 7b shows a graph of probability of correct detection for N=32OOK-16, according to embodiments as disclosed herein.

FIG. 7b shows a graph of probability of correct detection for N=32 OOK-16, according to embodiments as disclosed herein. The probability of correct detection and probability of missed detection as a function of SNR are displayed for OOK 16.

Figure 8A:
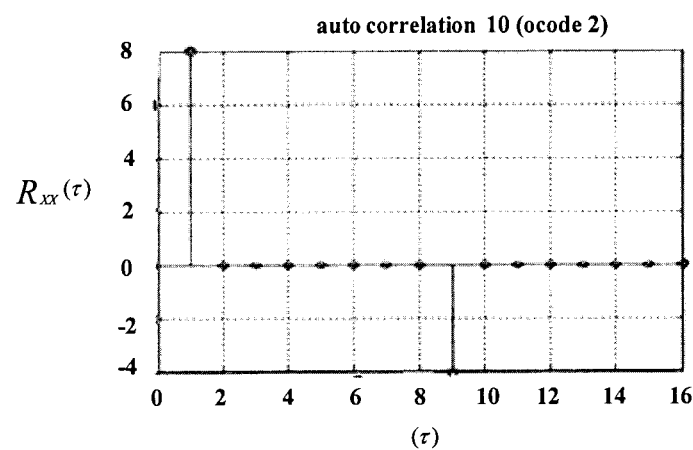
FIG. 8a shows a graph for auto-correlation properties of ternary OOK-2 sequence 1 for N=16, according to embodiments as disclosed herein.
Figure 8B:
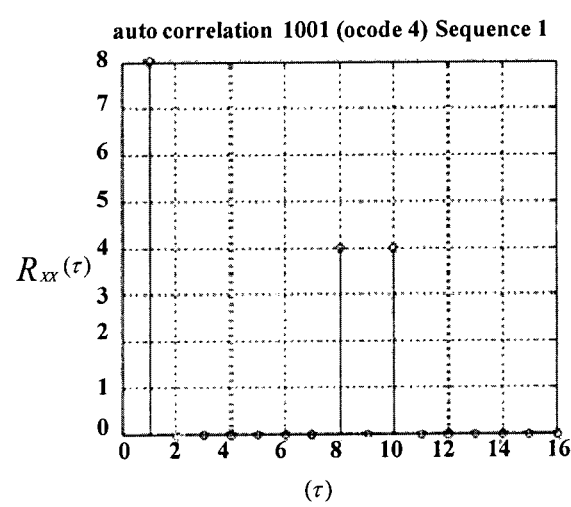
FIGS. 8b and 8c show graphs for auto-correlation properties of ternary OOK-4 sequences 1 and 2 for N=16, according to embodiments as disclosed herein.
Figure 8C:
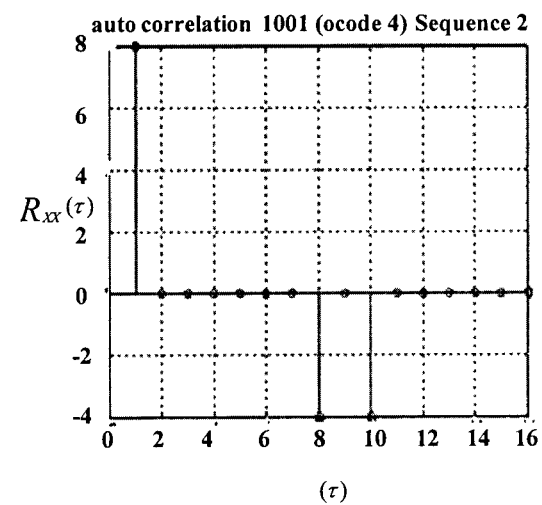
Figure 9A:
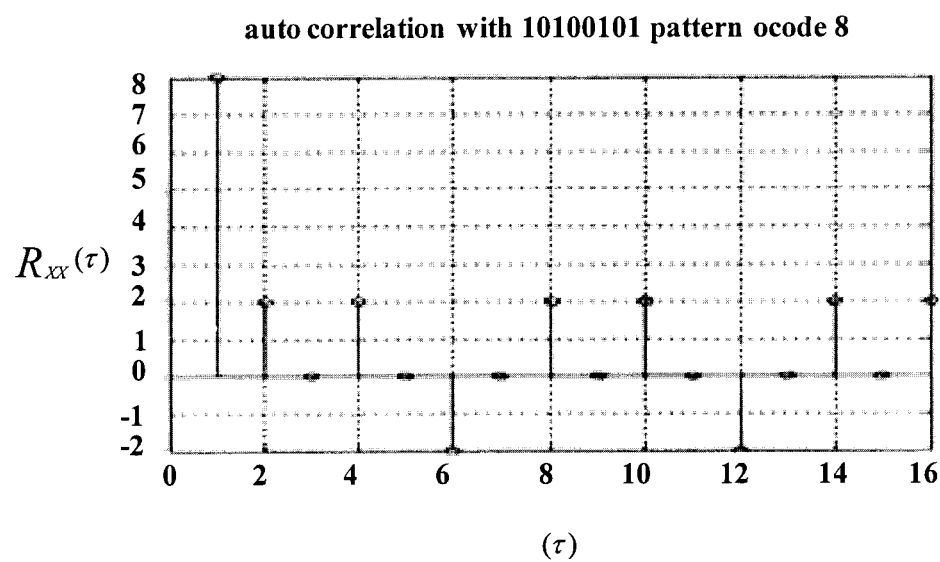
FIG. 9a shows a graph for auto-correlation properties of ternary OOK-8 sequence 1 for N=16, according to embodiments as disclosed herein.

FIG. 8a shows a graph for auto-correlation properties of ternary OOK-2 sequence 1 for N=16, according to embodiments as disclosed herein;

FIGS. 8b and 8c show graphs for auto-correlation properties of ternary OOK-4 sequences 1 and 2 for N=16, according to embodiments as disclosed herein;

FIG. 9a shows a graph for auto-correlation properties of ternary OOK-8 sequence 1 for N=16, according to embodiments as disclosed herein.

Figure 9B:
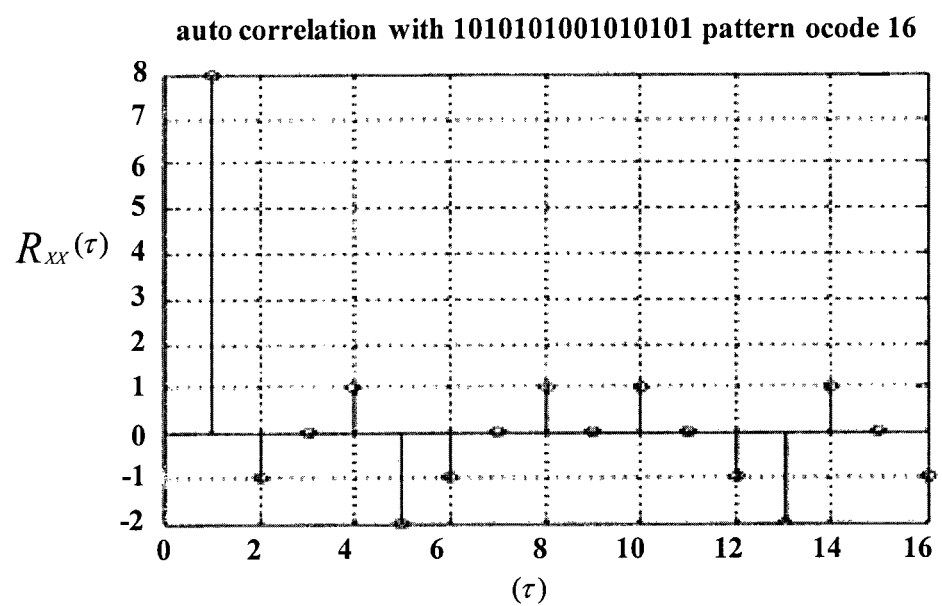
FIG. 9b shows a graph for auto-correlation properties of ternary OOK-16 sequence 1 for N=16, according to embodiments as disclosed herein.

FIG. 9b shows a graph for auto-correlation properties of ternary OOK-16 sequence 1 for N=16, according to embodiments as disclosed herein.

Figure 10:
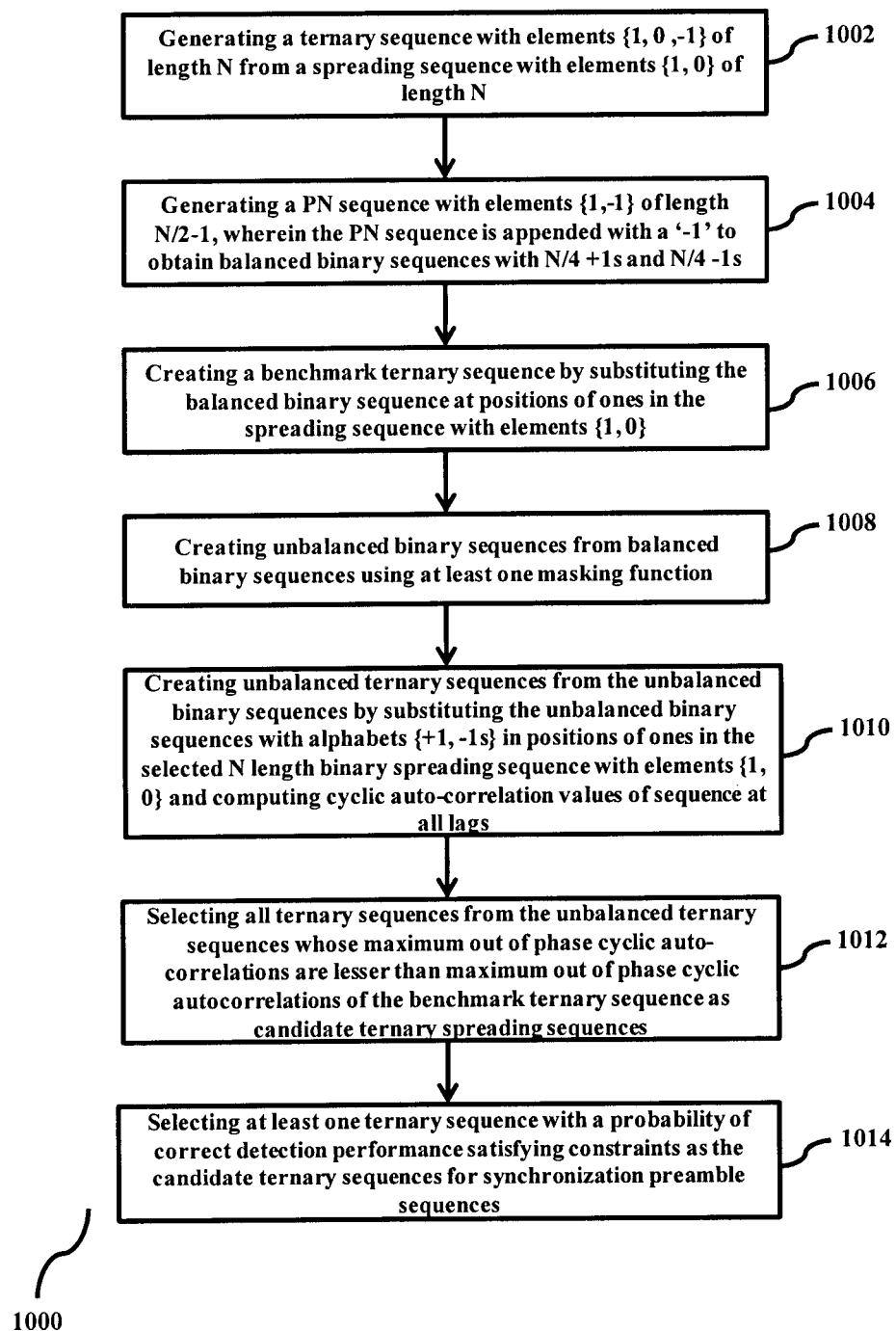
FIG. 10 is a flow diagram illustrating a method for selecting an N length ternary sequence with elements {1, 0, −1} from a spreading sequence of length N=64 with elements {1, 0}, according to embodiments as disclosed herein.

FIG. 10 is a flow diagram illustrating a method 1000 for selecting an N length ternary sequence with elements {1, 0, −1} from a spreading sequence of length N=64 with elements {1, 0}, according to embodiments as disclosed herein. Although the search procedure mentioned for N=16 and N=32 may be employed for N=64 (the length over which the auto-correlation is performed), the search space is very high. The sequence that maximizes the probability of correct detection needs to be searched from typically around ($2^{32}$/50≈8.5e7) sequences. Thus, the search space is very large. Hence the method proposes a separate search procedure for N=64.

It is known that good correlation properties are obtained by providing an imbalance to the ternary sequences. That is the number of 1s (np) in the sequence exceeds the number of −1s (nm) or vice-versa. The admissible values for the number of 1s and −1s (np, nm) in ternary sequences with perfect periodic correlation are (3, 1), (6, 3), (10, 6), (15, 10), (21, 15).

Although it is impossible to directly adopt this result to arrive at the ternary sequences from the binary sequences, the proposed method uses this as a guideline to define masking functions to be element wise multiplied on balanced ternary sequences to obtain reduced side (out of phase) correlations.

In an embodiment, the method 1000 can be generalized to arbitrary length ternary sequences. The method 1000 is in general applicable to adapt any given binary sequence with binary alphabets {0, 1} to a ternary sequence with alphabets {1, −1, 0}. The 64 length ternary sequences are with 32 zeros and a total of 32, +1s and −1s. Hence, the method 1000 explains a procedure to obtain sequences with an imbalance in the number of +1s and −1s approximately around the (21, 15) case. That is the numbers of 1s exceed the number of −1s approximately by 6. This forms a guideline.

At step 1002, the method 1000 includes generating a ternary sequence with elements {1, 0, −1} of length N from a spreading sequence with elements {1, 0} of length N. The non-coherent sequence with alphabets {1,0} of a particular length is provided. This is to be adapted into a ternary sequence with values {1, 0, −1} such that when an absolute value of the ternary sequence is taken, the original binary sequence is obtained back.

At step 1004, the method 1000 includes generating a pseudo-noise (PN) sequence with elements {1,−1} of length N/2−1, wherein the PN sequence is appended with a '−1' to obtain balanced binary sequences with N/4+1s and N/4-1s.

In an embodiment, the method 1000 generates a 31 length PN sequence. This sequence has $n_p$=16, (+1s) and $n_m$=15, (−1s). First a 32 length balanced sequence is generated by appending a −1 at the end.

Let the 32 length sequence is represented as $B_n$={$b_0$, $b_1$, ... $b_{N/2-1}$} where Bn={1 −1 −1 −1 −1 1 −1 1 −1 1 1 1 −1 1 1 −1 −1 −1 1 1 1 1 1 −1 −1 1 1 −1 1 −1 −1 −1}.

At step 1006, the method 1000 includes creating a benchmark ternary sequence by substituting the balanced binary sequence at positions of ones in the spreading sequence with elements {1, 0}. In an embodiment, the 32 length sequences with alphabets {+1, −1} are substituted in the positions of the is in the sequences OOK-2, OOK-4, OOK-8 and OOK-16 to create the benchmark ternary sequence. It is observed that the maximum side correlations for the sequences are 8 and the peak correlation is +32. So sequences which reduce the side correlations below 8 are attractive.

At step 1008, the method 1000 includes creating unbalanced binary sequences from balanced binary sequences using at least one masking function. In an embodiment, the masking function operators are used on the PN sequences to obtain side correlations below 8 in the 64 length ternary sequences. Masking functions are defined to create an imbalance in the number of +1s and −1s in the 32 length sequences which has an equal number of +1s and −1s.

When the masking function $M_i$ is element wise multiplied '.*' with the 32 length sequence like $B_n$ as in step 1002, the method obtains another sequence C with an imbalance in the number of +1s and −1s.

$$C_i = B_n .* M_i$$

It is observed from the investigations that perfect ternary sequences of a particular length, if they exist, have their weight (number of non-zero elements) which is nearly half their length.

Hence, for 64 length sequences it is important to consider ternary sequences having weight 32. However, the closest admissible value of the weight for ternary sequences around weight 32 is 36 with a balance of (+1,−1) as (21, 15). A corresponding value for 32 length is (19, 13).

At step 1010, the method 1000 includes creating unbalanced ternary sequences from the unbalanced binary sequences by substituting the unbalanced binary sequences with alphabets {+1, −1s} in positions of ones in the selected N length binary spreading sequence with elements {1, 0} and computing all cyclic auto-correlation values of sequence at all lags.

In an embodiment, masking creates the imbalance between (+1,−1) around the values (19,13). The proposed method does not deviate too much from the (19,13) case since it is not required to significantly change the mean value of the sequence from 0.

In an embodiment, an exhaustive search is carried out for all combinations of sequences with the number of (+1,−1) ranging from (20, 12), (19,13) and (18,14) by defining corresponding masking functions and multiplying them with the base sequence $B_n$. Hence $B_n$ is element wise multiplied with various masking functions $M_i$ such that all possible sequences $C_i$ are generated with the number of (+1,−1) being (20,12). Similarly $B_n$ is element wise multiplied with various masking functions $M_i$ such that all possible sequences $C_i$ are generated with the number of (+1,−1) being (19, 13). Also $B_n$ is element wise multiplied with various masking functions $M_i$ such that all possible sequences $C_i$ are generated with the number of (+1,−1) being (18, 14). Hence, all possible sequences $C_i$ are generated which have the unequal number of (+1,−1) as decided a-priori based on step 1006.

At step 1012, the method 1000 includes selecting all ternary sequences from the unbalanced ternary sequences whose maximum out of phase cyclic auto-correlations are lesser that maximum out of phase cyclic autocorrelations of the benchmark ternary sequence as candidate ternary spreading sequences.

In an embodiment, all the 32 length sequences are used to form 64 length sequences by replacing the 32+1s in the 64 length sequence in step 1002 with the 32 length sequences having +1 and −1 generated in step 1008. These sequences are represented as $D_i$ with elements $d_i$.

The cyclic correlation of all the sequences $d_i$ generated in step 1012 is computed.

$$R_{dd}^i(\tau) = \sum_{n=0}^{64-1} d_n^i d_{(n+\tau) \bmod 64}^i,$$

At step 1014, the method 1000 includes selecting at least one ternary sequence with a probability of correct detection performance satisfying constraints as the candidate ternary sequences for synchronization preamble sequences. In an embodiment, the ternary sequences which have maximum value of side correlations below a value of 8 are the candidate ternary sequences.

In an example, the ternary sequences for the binary sequences in Table-23 are given in Table-26 below.

TABLE 26

| Label | Equivalent Ternary Sequence with N = 64 |
|---|---|
| OOK-2 | $D_2$ = [ 1 0 -1 0 -1 0 -1 0 -1 0 1 0 -1 0 1 0 -1 0 1 0 1 0 1 0 -1 0 1 0 1 0 -1 0 1 0 1 0 1 0 1 0 1 0 -1 0 -1 0 1 0 1 0 -1 0 1 0 1 0 -1 0 -1 0 ] |
| OOK-4 | $D_4$ = [1 0 0 -1 -1 0 0 -1 -1 0 0 1 1 0 0 1 1 0 0 -1 -1 0 0 1 1 0 0 -1 -1 0 0 1 1 0 -1 1 0 0 -1 1 0 0 1 1 0 0 1 1 0 0 -1 -1 0 0 1 1 0 0 -1 -1 0 0 -1 -1 ] |
| OOK-8 | $D_8$ = [ 1 0 1 0 0 -1 0 -1 -1 0 1 0 0 -1 0 1 -1 0 1 0 0 0 1 0 1 1 0 1 0 0 1 0 -1 -1 0 -1 0 0 1 0 1 1 0 1 0 0 1 0 -1 0 -1 -1 0 1 0 1 0 0 -1 -1 0 -1 0 0 1 0 -1 ] |
| OOK-16 | $D_{16}$ = [ 1 0 -1 0 -1 0 -1 0 0 -1 0 1 0 1 0 1 0 1 0 -1 0 1 0 1 0 0 -1 0 1 0 1 0 -1 -1 0 -1 0 1 0 1 0 0 0 1 0 1 0 1 0 -1 -1 0 -1 0 1 0 1 0 -1 0 0 -1 0 -1 0 1 ] |

Masking functions are defined as $M_2$, $M_4$, $M_8$ and $M_{16}$ for OOK2, OOK4, OOK8 and OOK16 in Table-23 respectively.

$M_2$ for OOK2
The elements of the masking function are 1 for all indices except 17 and 30 in which case it is −1.

$M_4$ for OOK4

$M_4 = \{m_i^4\}_{i=1}^{32}$: $m_i^4 = -1$ for $i = \{7,9,17,30\}$ and $m_i^4 = 1$ otherwise The elements of the masking function are 1 for all indices except 7, 9, 17 and 30 in which case it is −1.

$M_8$ for OOK8

$M_8 = \{m_i^8\}_{i=1}^{32}$: $m_i^8 = -1$ for $i = \{2,13,31\}$ and $m_i^8 = 1$ otherwise The elements of the masking function are 1 for all indices except 2, 13 and 31 in which case, it is −1.

$M_{16}$ for OOK16

$M_{16} = \{m_i^{16}\}_{i=1}^{32}$: $m_i^{16} = -1$ for $i = \{7,9,17,31\}$ and $m_i^{16} = 1$ otherwise The elements of the masking function are 1 for all indices except 7, 9, 17 and 31 in which case, it is −1.

The 32 length sequence $B_n$ explained step 1004 is element wise multiplied ('·*') with the masking functions $M_2$, $M_4$, $M_8$ and $M_{16}$ to obtain $C_2$, $C_4$, $C_8$ and $C_{16}$ respectively.

$C_i = B_n \cdot * M_i$, $i = \{2,4,8,16\}$

The 32 length sequences $C_2$, $C_4$, $C_8$ and $C_{16}$ are inserted in the positions of the 1s in the 64 length non-coherent sequences associated with OOK2, OOK4, OOK8 and OOK16 respectively to obtain the corresponding 64 length ternary sequences.

For example, for the 64 length non-coherent OOK2 preamble is formed by repeating the {1 0} sequence 32 times. In this sequence, at the positions of the (1s), $C_2$ is inserted to obtain the 64 length ternary sequence for OOK2 represented as $D_2$.

The 64 length non-coherent OOK4 preamble is formed by repeating the {1 0 0 1} sequence 16 times. In this sequence, at the positions of the (1s), $C_4$ is inserted to obtain the 64 length ternary sequence for OOK4 represented as $D_4$.

The 64 length non-coherent OOK8 preamble is formed by repeating the {1 0 1 0 0 1 0 1} sequence 8 times. In this sequence, at the positions of the (1s), $C_8$ is inserted to obtain the 64 length ternary sequence for OOK8 represented as $D_8$.

The 64 length non-coherent OOK16 preamble is formed by repeating the {1 0 1 0 1 0 1 0 0 1 0 1 0 1 0 1} sequence 4 times. In this sequence, at the positions of the (1s), $C_{16}$ is inserted to obtain the 64 length ternary sequence for OOK16 represented as $D_{16}$.

In an embodiment, the synchronization sequence may comprise of a number of repetitions of $D_2$, $D_4$, $D_8$ or $D_{16}$ depending on the requirements.

The various actions, acts, blocks, steps, and the like in method 1000 may be performed in the order presented, in a different order or simultaneously. Further, in some embodiments, some actions, acts, blocks, steps, and the like may be omitted, added, modified, skipped, and the like without departing from the scope of the invention.

Figure 11A:
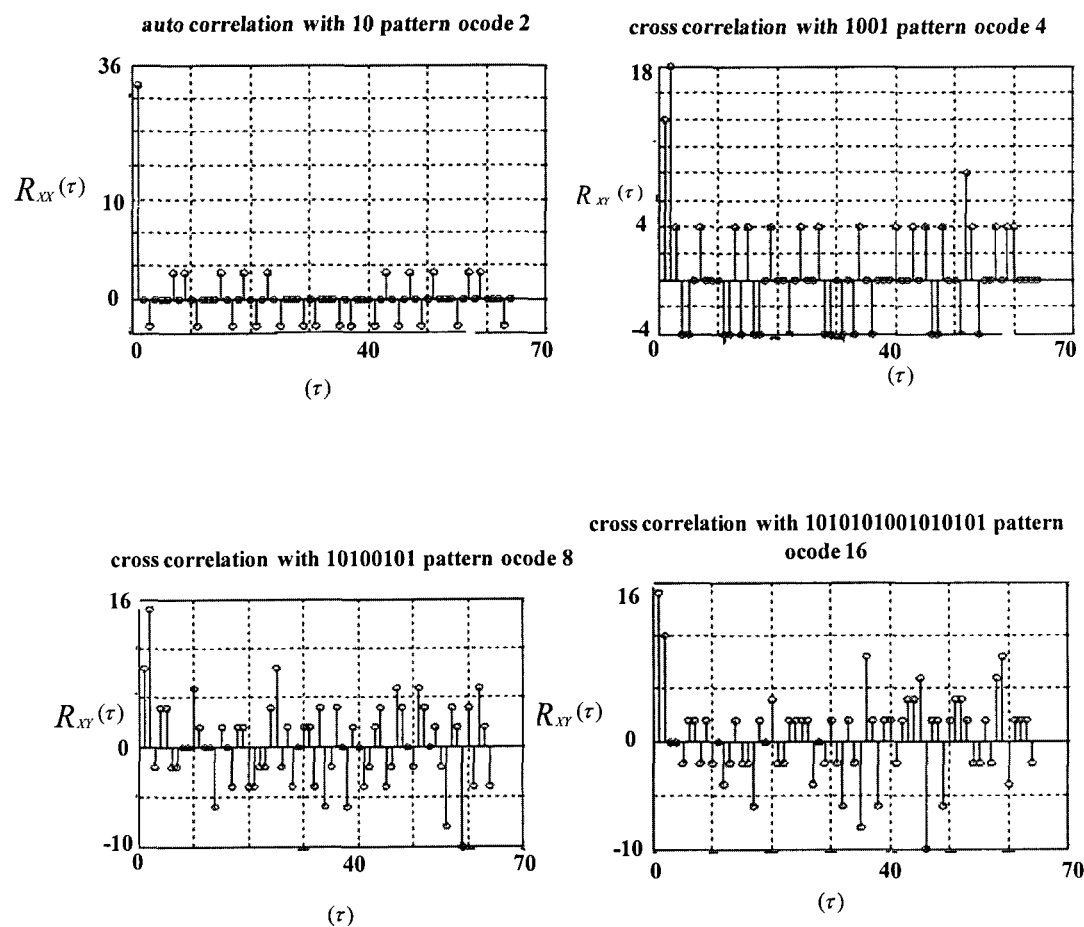
FIG. 11a shows graphs of autocorrelation and cross correlation properties for OOK-2 for N=64, according to embodiments as disclosed herein.

FIG. 11a shows graphs of autocorrelation and cross correlation properties for OOK-2 for N=64, according to embodiments as disclosed herein. The cross correlation properties are with OOK-4, OOK-8 and OOK-16.

Figure 11B:
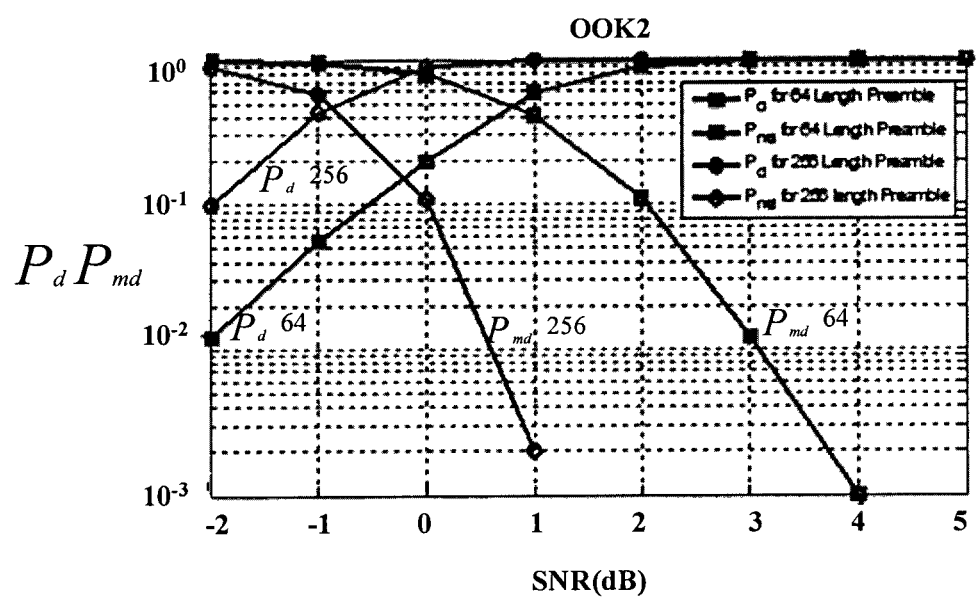
FIG. 11b shows a graph of probability of correct detection for N=64 OOK-2, according to embodiments as disclosed herein.

FIG. 11b shows a graph of probability of correct detection for N=64 OOK-2, according to embodiments as disclosed herein. The probability of correct detection and probability of missed detection as a function of SNR are displayed for OOK-2.

Figure 12A:
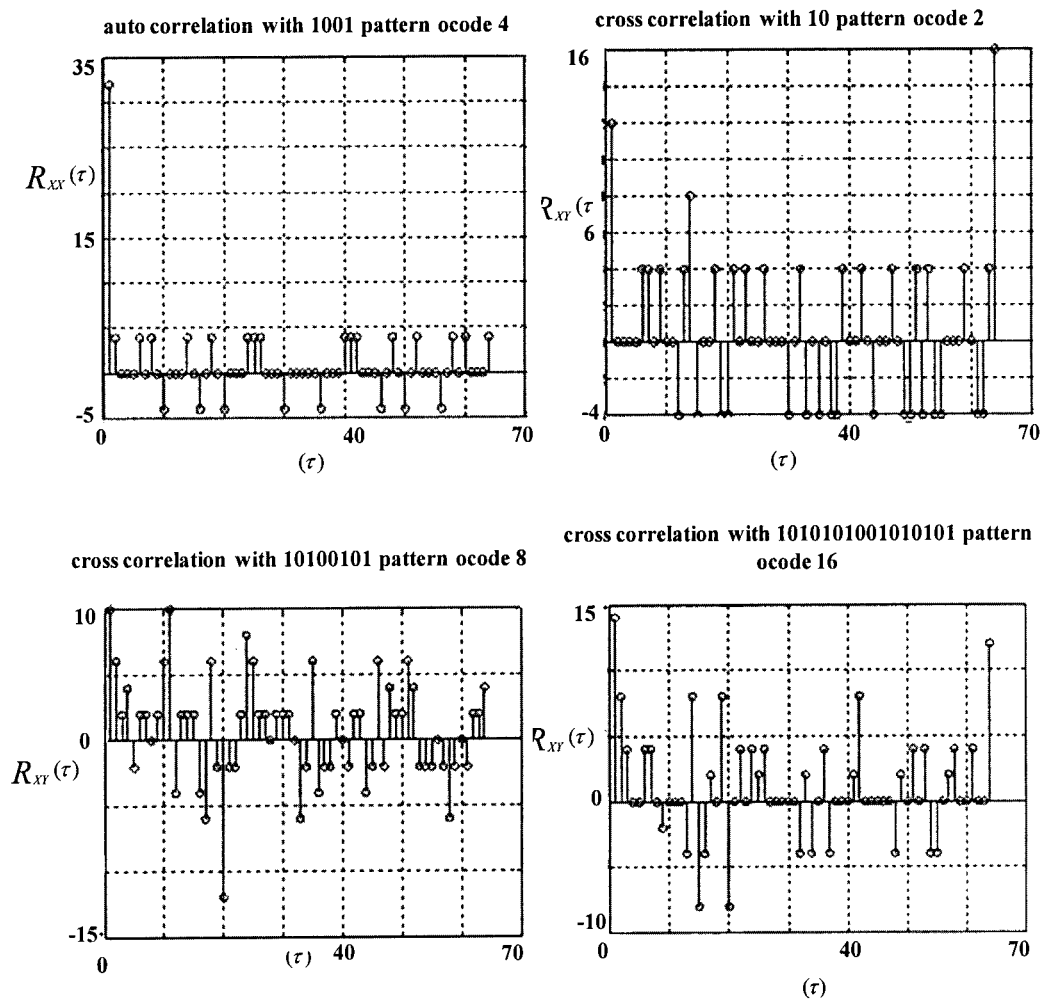
FIG. 12a shows graphs of autocorrelation and cross correlation properties for OOK-4 for N=64, according to embodiments as disclosed herein.

FIG. 12a shows graphs of autocorrelation and cross correlation properties for OOK-4 for N=64, according to embodiments as disclosed herein. The cross correlation properties are with OOK-2, OOK-8 and OOK-16.

Figure 12B:
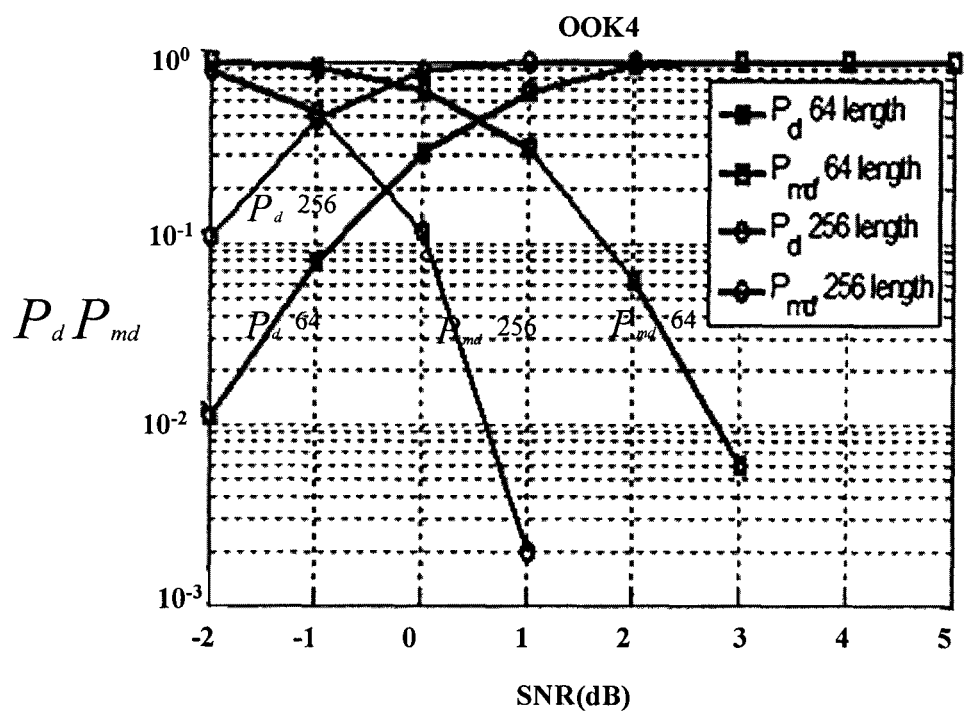
FIG. 12b shows a graph of probability of correct detection for N=64 OOK-4, according to embodiments as disclosed herein.

FIG. 12b shows a graph of probability of correct detection for N=64OOK-4, according to embodiments as disclosed herein. The probability of correct detection and probability of missed detection as a function of SNR are displayed for OOK-4.

Figure 13A:
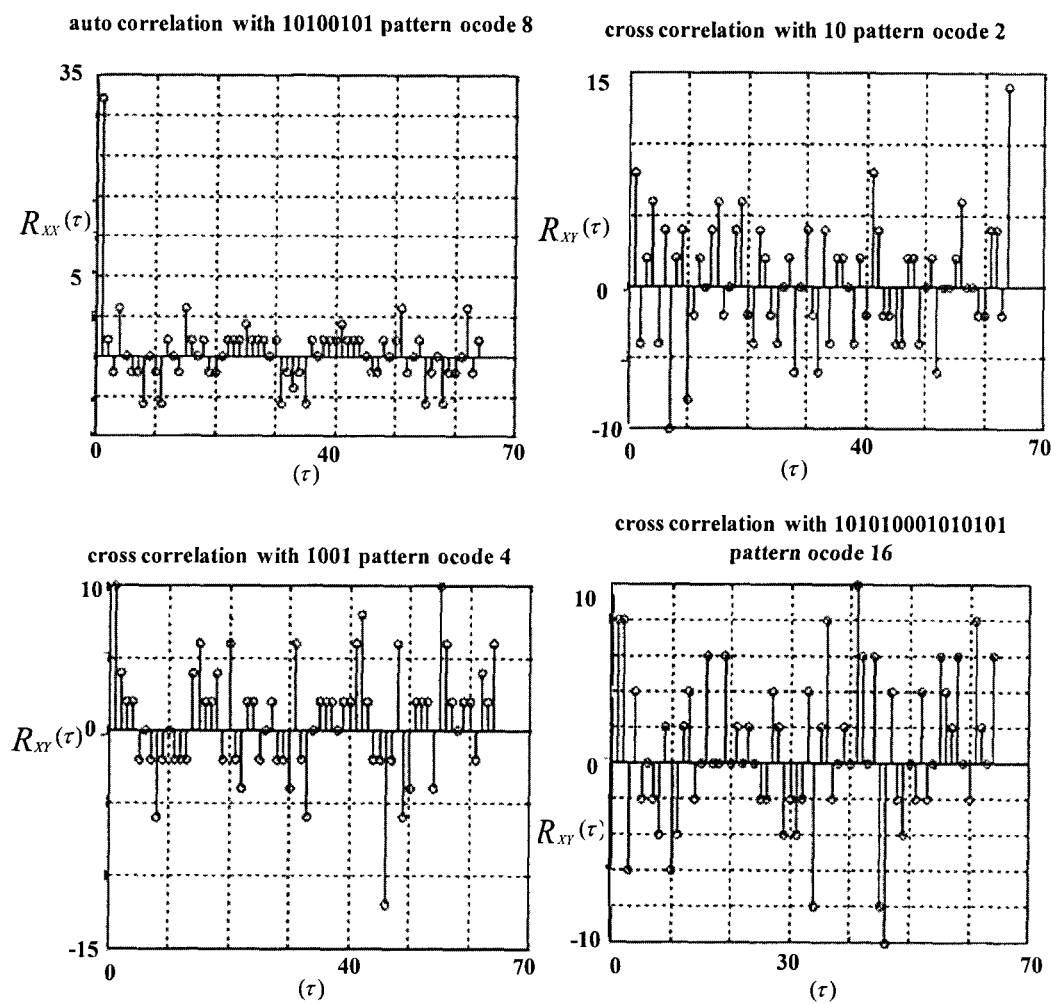
FIG. 13a shows graphs of autocorrelation and cross correlation properties for OOK-8 for N=64, according to embodiments as disclosed herein.

FIG. 13a shows graphs of autocorrelation and cross correlation properties for OOK-8 for N=64, according to embodiments as disclosed herein. The cross correlation properties are with OOK-2, OOK-4 and OOK-16.

Figure 13B:
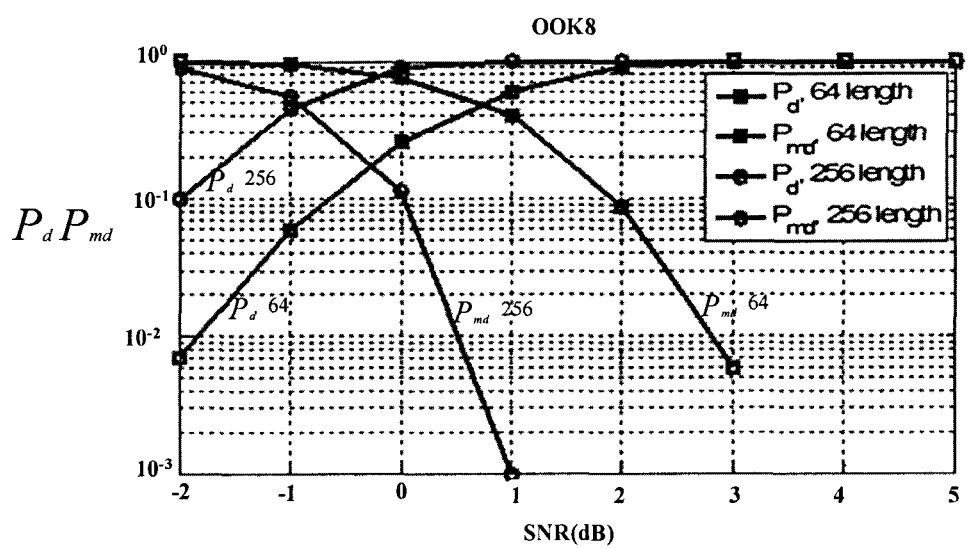
FIG. 13b shows a graph of probability of correct detection for N=64 OOK-8, according to embodiments as disclosed herein.

FIG. 13b shows a graph of probability of correct detection for N=64 OOK-8, according to embodiments as disclosed herein. The probability of correct detection and probability of missed detection as a function of SNR are displayed for OOK-8.

Figure 14A:
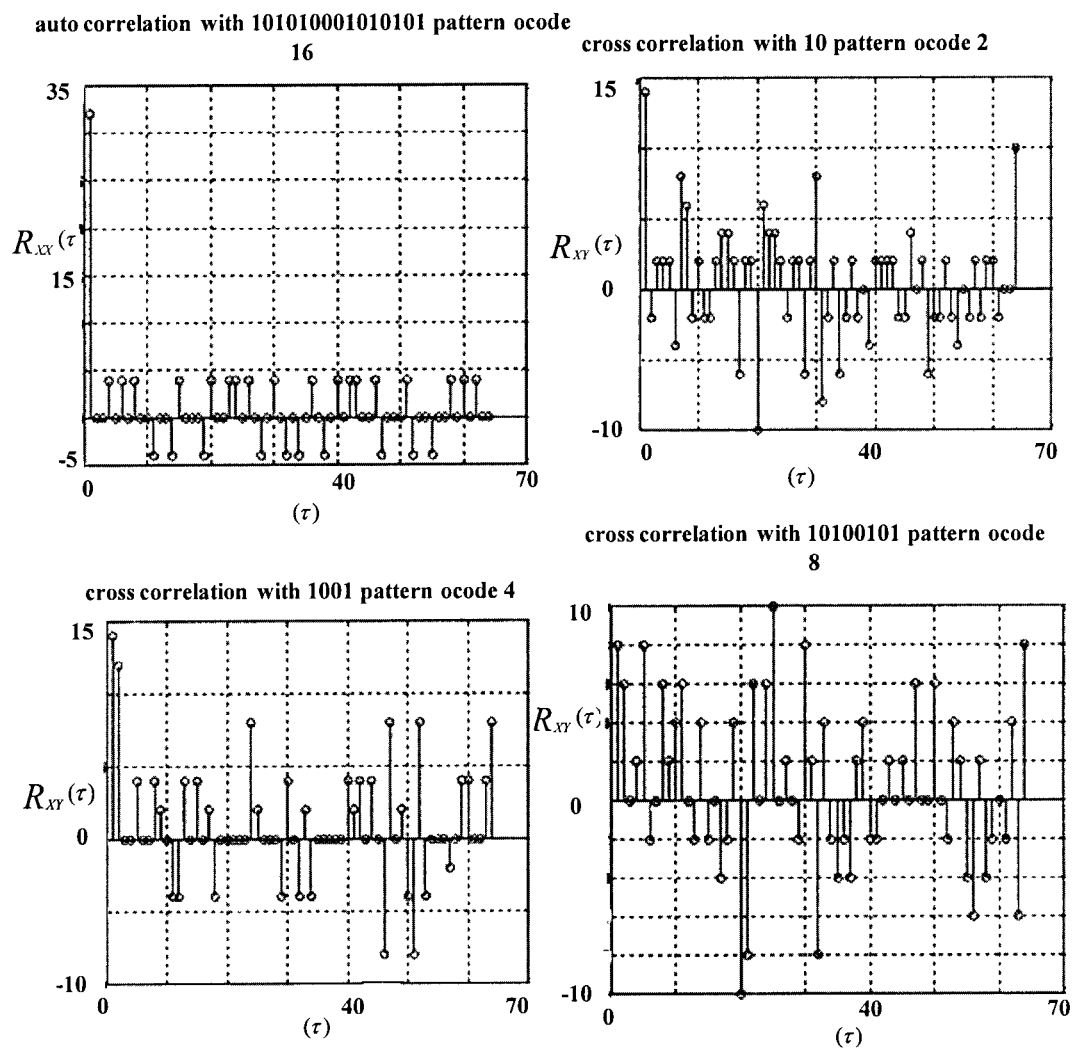
FIG. 14a shows graphs of autocorrelation and cross correlation properties for OOK-16 for N=64, according to embodiments as disclosed herein.

FIG. 14a shows graphs of autocorrelation and cross correlation properties for OOK-16 for N=64, according to embodiments as disclosed herein. The cross correlation properties are with OOK-2, OOK-4 and OOK-8.

Figure 14B:
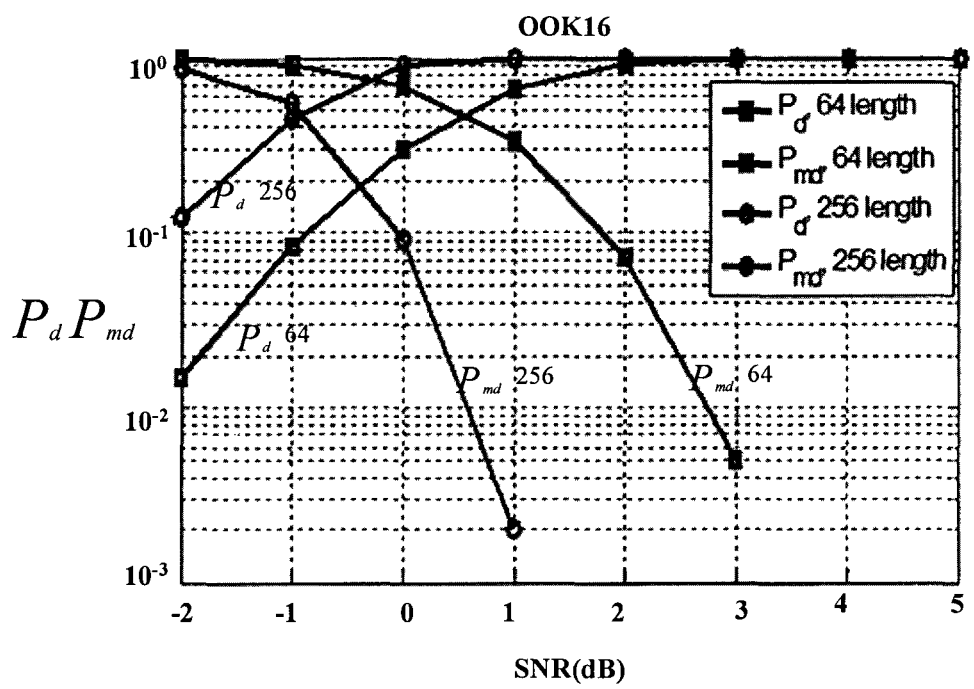
FIG. 14b shows a graph of probability of correct detection for N=64 OOK-16, according to embodiments as disclosed herein.

FIG. 14b shows a graph of probability of correct detection for N=64 OOK-16, according to embodiments as disclosed herein. The probability of correct detection and probability of missed detection as a function of SNR are displayed for OOK-16.

TABLE 27

| M | L | Nomenclature | Orthogonal Sequences (symbols: '0' / '1') |
|---|---|---|---|
| 1 | 1 | ½-OOK | 1/0 |
|   | 2 | ½-OOK | 1 0/0 −1 |
|   | 4 | ¼ -OOK | +1 0 0 +1/0 −1 −1 0 |
|   | 8 | ⅛ -OOK | 1 0 −1 0 0 −1 0 1 / 0 −1 0 1 1 0 −1 0 |

Table-27 reveals the exemplary spreading sequences when they are used for spreading the data symbols. The spreading factors are 1, 2, 4 and 8 respectively.

TABLE 28

| Preamble Def | Spreading Factor (SF) | Base Preamble Sequence | Number of Repetitions ($N_{rep}$) | Number Of Bits | Number Of Chips |
|---|---|---|---|---|---|
| P1 | 2 | −1 0 −1 0 1 0<br>1 0 −1 0 −1 0<br>1 0 −1 0 1 0<br>1 0 1 0 −1 0 −<br>1 0 1 0 −1 0<br>−1 0 | 2 | 32 | 64 |
| P2 | 4 | 1 0 0 1 1 0<br>0 1 1 0 0 1<br>1 0 0 −1 −1 0<br>0 1 −1 0 0 1 −<br>1 0 0 1 −1 0<br>0 −1 | 4 | 32 | 128 |
| P3 | 8 | 1 0 −1 0 0 −1<br>0 −1 1 0 1 0<br>0 −1 0 1 1 0<br>1 0 0 −1 0 1 −<br>1 0 1 0 0 1<br>0 1 | 8 | 32 | 256 |
| P4 | 16 | −1 0 −1 0 −1 0<br>−1 0 0 −1 0 1<br>0 1 0 −1 −1 0<br>1 0 −1 0 1 0<br>0 1 0 1 0 −1<br>0 −1 | 16 | 32 | 512 |

Table-28 above reveals the exemplary spreading sequences used as preamble sequences. These are the preamble sequences listed in Table 2 for N=32.

FIG. 15 is a table showing a preamble sequence, according to embodiments as disclosed herein.

FIG. 16 is a table showing a Start Frame Delimiter (SFD) Sequence, according to embodiments as disclosed herein. This is based on the no-coherent preamble designs. The number of +1s and −1s are balanced in this case.

Figure 17:
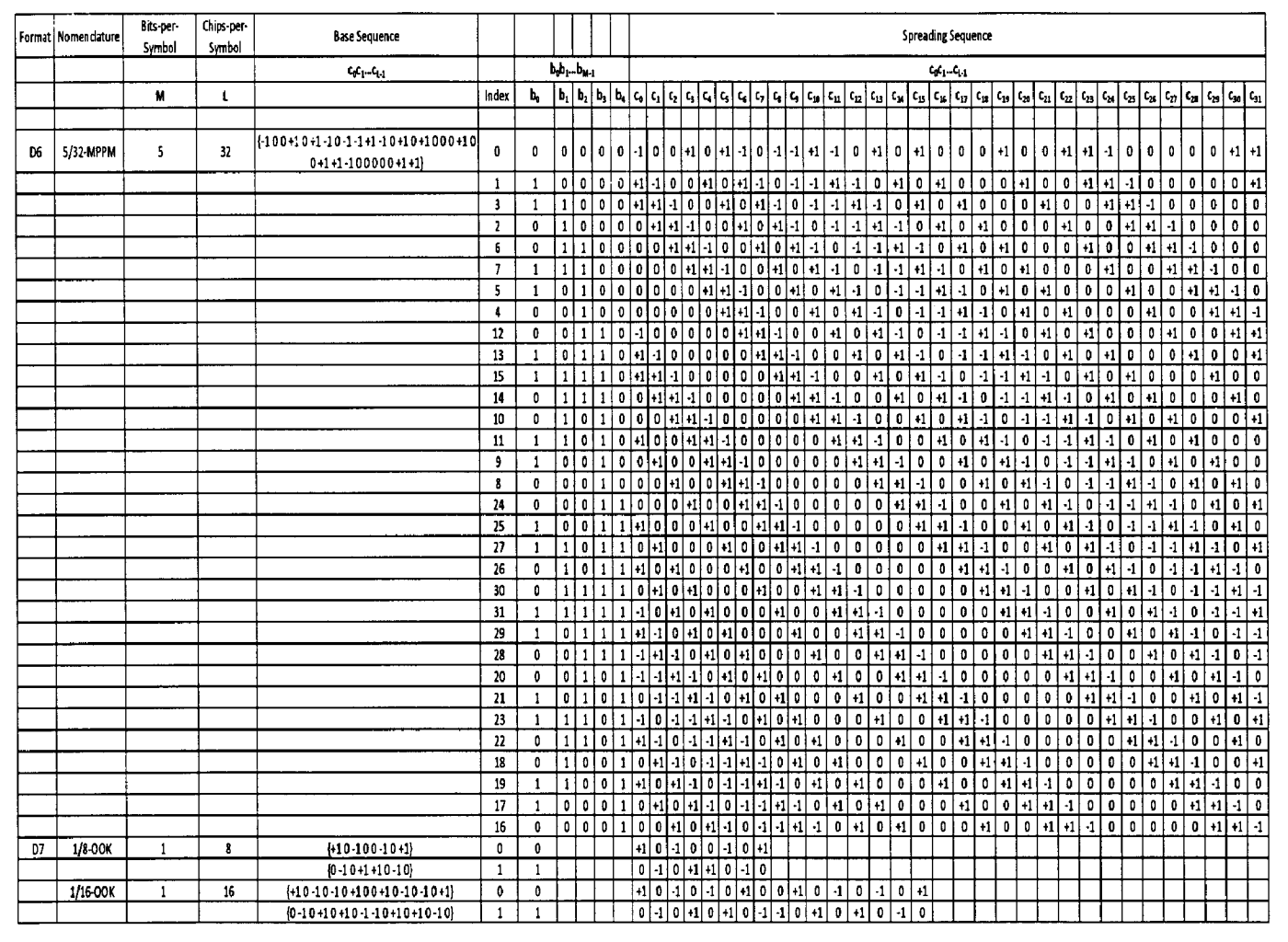

FIG. 17 is a table showing the spreading sequences used for various modulations formats namely orthogonal variable spreading factor on-off keying (OOK) and also single pulse and pseudo-random multi-pulse pulse position modulations, according to embodiments as disclosed herein. The table reveals the spreading sequences used for various modulations formats namely orthogonal variable spreading factor on-off keying (OOK) and also single pulse and pseudo-random multi-pulse pulse position modulations.

FIG. 18 is a table showing exemplary modes of transmission using various spreading sequences and modulations in the preamble, data portion, and also the start frame delimiter, according to embodiments as disclosed herein.

Figure 19:
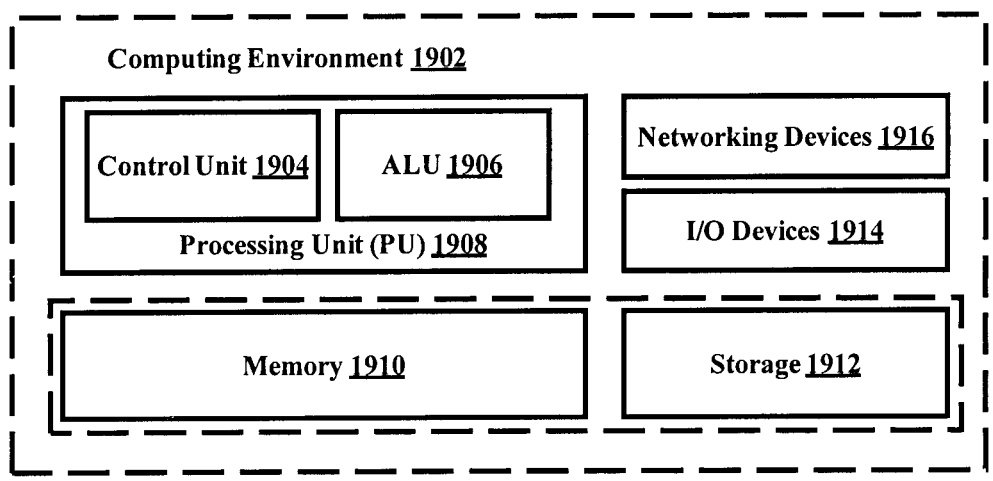
FIG. 19 illustrates a computing environment implementing the method and system for selecting spreading sequences with variable spreading factors, according to embodiments as disclosed herein.

FIG. 19 illustrates a computing environment implementing the method and system for selecting spreading sequences with variable spreading factors, according to embodiments as disclosed herein. As depicted the computing environment 1902 comprises at least one processing unit 1604 that is equipped with a control unit 1904 and an Arithmetic Logic Unit (ALU) 1906, a memory 1910, a storage unit 1912, plurality of networking devices 1916 and a plurality Input output (I/O) devices 1914. The processing unit 1908 is responsible for processing the instructions of the algorithm. The processing unit 1908 receives commands from the control unit in order to perform its processing. Further, any logical and arithmetic operations involved in the execution of the instructions are computed with the help of the ALU 1906.

The overall computing environment 1902 can be composed of multiple homogeneous and/or heterogeneous cores, multiple CPUs of different kinds, special media and other accelerators. The processing unit 1908 is responsible for processing the instructions of the algorithm. Further, the plurality of processing units 1908 may be located on a single chip or over multiple chips.

The algorithm comprising of instructions and codes required for the implementation are stored in either the memory unit 1910 or the storage 1912 or both. At the time of execution, the instructions may be fetched from the corresponding memory 1910 and/or storage 1912, and executed by the processing unit 1908.

In case of any hardware implementations various networking devices 1916 or external I/O devices 1914 may be connected to the computing environment to support the implementation through the networking unit and the I/O device unit.

The embodiments disclosed herein can be implemented through at least one software program running on at least one hardware device and performing network management functions to control the elements. The elements shown in FIG. 1a, 1b, and 16 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for selecting spreading sequences with variable spreading factors, the method comprising:
generating circular shift equivalent sets of spreading sequences by circularly shifting base sequences with elements $\{1, 0\}$ and having at least one said variable spreading factor;
determining whether each said spreading sequence in said circular shift equivalent set meets a pre-defined spreading sequence criteria, wherein said spreading sequence criteria comprises a balanced criteria, a non-repetition criteria, a non-circular criteria, and a conjugate criteria; and
selecting at least one spreading sequence from expansions of at least one said spreading sequence of said circular shift equivalent sets in response to determining that said spreading sequences in said circular shift equivalent sets meets said pre-defined spreading sequence criteria.

2. The method of claim 1, wherein the expansion of at least one said spreading sequence comprises:
obtaining a variable spreading factor sequence by selecting one of said sequences from at least one said circular shift equivalent set associated with a lowest spreading factor; and
forming a set of sequences from said variable spreading factor sequence, wherein larger length sequences in said set are constructed by repeating lowest spreading factor sequence for one half of length of larger sequence and a conjugate of said half for other half of said larger sequence.

3. The method of claim 1, wherein the expansions of at least one said spreading sequence comprises obtaining a variable spreading factor sequence by forming a set of sequences, wherein sequence of a particular length is constructed by concatenation of a preceding sequence and a corresponding complement, wherein said preceding sequence is an element of a corresponding circular shift equivalent set of the circular shift equivalent sets.

4. The method of claim 1, wherein said balanced criteria indicates that a number of zeros in said spreading sequence is equal to a number of non-zeros in said spreading sequence.

5. The method of claim 1, wherein said non-repetition criteria indicates that said spreading sequence cannot be divided into two equal halves with identical elements in each half.

6. The method of claim 1, wherein said non-circular criteria indicates that said spreading sequence cannot be fully comprised of a periodic repetition of other sequences.

7. The method of claim 1, wherein said conjugate criteria indicates that two equal halves of said spreading sequence is complementary to each other.

8. The method of claim 1, wherein said method further comprises:
generating all $2^{N/2}$ combinations of N/2 length binary sequences with at least one of alphabets $\{+1,-1\}$ for at least one of said selected spreading sequence with said variable spreading factor of N, wherein said selected spreading sequence has alphabets $\{1, 0\}$;
generating $2^{N/2}$ combinations of ternary sequences of length N with at least one of alphabets $\{+1, 0, -1\}$ for said selected spreading sequence of length N, wherein said $2^{N/2}$ combinations are generated by substituting positions of N/2 ones in said selected spreading sequence of length N by all $2^{N/2}$ combinations of said N/2 length binary sequences with at least one of alphabets $\{1, -1\}$;
selecting a set of sequences with minimum sum of squares of cyclic correlations of all said $2^{N/2}$ combinations of said ternary sequences;
computing a probability of correct detection over a range of Signal-to-noise ratio (SNR) values for said set of sequences with minimum sum of squares of said cyclic correlations; and
selecting a ternary sequence for which said probability of correct detection is maximum as ternary synchronization preamble.

9. The method of claim 1, wherein said method further comprises:
generating a ternary sequence with elements $\{1, 0, -1\}$ of length N from said selected spreading sequence with elements $\{1, 0\}$ of length N;
generating an PN sequence with elements $\{1,-1\}$ of length N/2−1, wherein said PN sequence is appended with a '−1' to obtain balanced binary sequences with N/4+1s and N/4−1s;
creating a benchmark ternary sequence by substituting said balanced binary sequence at positions of ones in said selected spreading sequence with elements $\{1, 0\}$, and computing all cyclic auto-correlation values of said balanced binary sequence at all lags;
creating unbalanced binary sequences from balanced binary sequences using at least one masking function, wherein said at least one masking function is multiplied with said balanced binary sequences such that number of ones exceed number of zeros;
creating unbalanced ternary sequences from said unbalanced binary sequences by substituting said unbalanced binary sequences with alphabets $\{+1,-1\}$ in positions of ones in said selected N length spreading sequence with elements $\{1, 0\}$ and computing all cyclic auto-correlation values of each sequence of said unbalanced binary sequences at all lags;
selecting all ternary sequences from said unbalanced ternary sequences whose maximum out of phase cyclic auto-correlations are less than maximum out of phase cyclic autocorrelations of said benchmark ternary sequence as candidate ternary spreading sequences; and
selecting, from among the selected all ternary sequences, at least one said ternary sequence with a probability of correct detection performance satisfying constraints as said candidate ternary spreading sequences for synchronization preamble sequences.

10. A computer program product comprising a computer executable program code recorded on a computer readable non-transitory storage medium, wherein said computer executable program code when executed causing the actions as claimed in any one of claim 1, claim 2, claim 3, claim 4, claim 5, claim 6, claim 7, claim 8, and claim 9.

11. A method for selecting an N length ternary sequence with elements $\{1, 0, -1\}$ from a spreading sequence of length N with elements $\{1, 0\}$, the method comprising:
generating all combinations of binary sequences with at least one of alphabets $\{+1, -1\}$ for said spreading sequence with said variable spreading factor of length N;

generating combinations of ternary sequences of length N with at least one of alphabets {+1, 0, −1} for said spreading sequence of length N, wherein said combinations of ternary sequences are generated by substituting positions of ones in said selected spreading sequence of length N by all combinations of at least one of elements {1, −1};

selecting a set of sequences with minimum sum of squares of cyclic correlations of all said combinations of said ternary sequences;

computing a probability of correct detection over a range of Signal-to-noise ratio (SNR) values for said set of sequences with minimum sum of squares of said cyclic correlations; and selecting a ternary sequence for which said probability of correct detection is maximum as ternary synchronization preamble.

12. The method of claim 11, wherein said spreading sequence with elements {1, 0} of length N meets a spreading sequence criteria, wherein said spreading sequence criteria comprises a balanced criteria, a non-repetition criteria, a non-circular criteria, and a conjugate criteria.

13. The method of claim 12, wherein said balanced criteria indicates that a number of zeros in said spreading sequence is equal to a number of non-zeros in said spreading sequence.

14. The method of claim 12, wherein said non-repetition criteria indicates that said spreading sequence cannot be divided into two equal halves with identical elements in each half.

15. The method of claim 12, wherein said non-circular criteria indicates that said spreading sequence cannot be fully comprised of a periodic repetition of other sequences.

16. The method of claim 12, wherein said conjugate criteria indicates that two equal halves of said spreading sequence is complementary to each other.

17. The method of claim 12, wherein said spreading sequence is selected from expansions of at least one said spreading sequences from circular shift equivalent sets, wherein said circular shift equivalent sets are obtained by circularly shifting a base sequence with elements {1,0} based on said variable spreading factor.

18. The method of claim 17, wherein the expansions of at least one said spreading sequences comprises:
obtaining a variable spreading factor sequence by selecting one of said sequences from at least one said circular shift equivalent set associated with a lowest spreading factor; and
forming a set of sequences from said variable spreading factor sequence, wherein larger length sequences in said set are constructed by repeating lowest spreading factor sequence for one half of length of larger sequence and a conjugate of said half for other half of said larger sequence.

19. The method of claim 17, wherein the expansions of at least one said spreading sequences comprises obtaining variable spreading factor sequences by forming a set of sequences, wherein sequence of a particular length is constructed by concatenation of a preceding sequence and a corresponding complement wherein said preceding sequence is an element of a corresponding circular shift equivalent set of the circular shift equivalent sets.

20. A computer program product comprising a computer executable program code recorded on a computer readable non-transitory storage medium, wherein said computer executable program code when executed causing the actions as claimed in any one of claim 11, claim 12, claim 13, claim 14, claim 15, claim 16, claim 17, claim 18, and claim 19.

21. A method for selecting an N length ternary sequence with elements {1, 0, −1} from a spreading sequence of length N with elements {1, 0}, the method comprising:
generating a ternary sequence with elements {1, 0, −1} of length N from said spreading sequence with elements {1, 0} of length N;
generating an PN sequence with elements {1,−1} of length N/2−1, wherein said PN sequence is appended with a '−1' to obtain balanced binary sequences with N/4+1s and N/4−1s;
creating a benchmark ternary sequence by substituting said balanced binary sequence at positions of ones in said spreading sequence with elements {1, 0}, wherein said balanced binary sequence is multiplied with various masking functions and computing all cyclic autocorrelation values of said balanced binary sequence at all lags;
creating unbalanced binary sequences from balanced binary sequences using at least one masking function, wherein said at least one masking function is multiplied with said balanced binary sequences such that number of ones exceed number of zeros;
creating unbalanced ternary sequences from said unbalanced binary sequences by substituting said unbalanced binary sequences with alphabets {+1, −1s} in positions of ones in said selected N length spreading sequence with elements {1, 0} and computing all cyclic autocorrelation values of each sequence of said unbalanced binary sequences at all lags;
selecting all ternary sequences from said unbalanced ternary sequences whose maximum out of phase cyclic auto-correlations are less than maximum out of phase cyclic autocorrelations of said benchmark ternary sequence as candidate ternary spreading sequences; and
selecting, from among the selected all ternary sequences, at least one said ternary sequence with a probability of correct detection performance satisfying constraints as said candidate ternary spreading sequences for synchronization preamble sequences.

22. The method of claim 21, wherein said spreading sequence for elements {1,0} of length N meets a spreading sequence criteria, wherein said spreading sequence criteria comprises a balanced criteria, a non-repetition criteria, a non-circular criteria, and a conjugate criteria.

23. The method of claim 22, wherein said balanced criteria indicates that a number of zeros in said spreading sequence is equal to a number of non-zeros in said spreading sequence.

24. The method of claim 22, wherein said non-repetition criteria indicates that said spreading sequence cannot be divided into two equal halves with identical elements in each half.

25. The method of claim 22, wherein said non-circular criteria indicates that said spreading sequence cannot be fully comprised of a periodic repetition of other sequences.

26. The method of claim 22, wherein said conjugate criteria indicates that two equal halves of said spreading sequence is complementary to each other.

27. The method of claim 22, wherein said spreading sequence is selected from expansions of at least one said spreading sequences from circular shift equivalent sets, wherein said circular shift equivalent sets are obtained by circularly shifting a base sequence with elements {1, 0} based on a variable spreading factor.

28. The method of claim 27, wherein the expansions of at least one said spreading sequences comprises:
  obtaining a variable spreading factor sequence by selecting one of said sequences from at least one said circular shift equivalent set associated with a lowest spreading factor; and
  forming a set of sequences from said variable spreading factor sequence, wherein larger length sequences in said set are constructed by repeating lowest spreading factor sequence for one half of length of larger sequence and a conjugate of said half for other half of said larger sequence.

29. The method of claim 27, wherein the expansions of at least one said spreading sequences comprises obtaining variable spreading factor sequences by forming a set of sequences, wherein sequence of a particular length is constructed by concatenation of a preceding sequence and a corresponding complement, wherein said preceding sequence is an element of a corresponding circular shift equivalent set of the circular shift equivalent sets.

30. A computer program product comprising a computer executable program code recorded on a computer readable non-transitory storage medium, wherein said computer executable program code when executed causing the actions as claimed in any one of claim 21, claim 22, claim 23, claim 24, claim 25, claim 26, claim 27, claim 28, claim 29.

31. A system for selecting spreading sequences with variable spreading factors, the system is configured to:
  generate circular shift equivalent sets of spreading sequences by circularly shifting a base sequence with elements $\{1, 0\}$ and having at least one said variable spreading factor;
  determine whether each said spreading sequence in said circular shift equivalent set meets a pre-defined spreading sequence criteria, wherein said spreading sequence criteria comprises a balanced criteria, a non-repetition criteria, a non-circular criteria, and a conjugate criteria; and
  select at least one spreading sequence from expansions of at least one said spreading sequence of said circular shift equivalent sets in response to determining that said spreading sequences in said circular shift equivalent sets meets said pre-defined spreading sequence criteria.

32. The system of claim 31, wherein the expansions of at least one said spreading sequences comprises:
  obtain a variable spreading factor sequence by selecting one of said sequences from at least one said circular shift equivalent set associated with a lowest spreading factor; and
  form a set of sequences from said variable spreading factor sequence, wherein larger length sequences in said set are constructed by repeating lowest spreading factor sequence for one half of length of larger sequence and a conjugate of said half for other half of said larger sequence.

33. The system of claim 31, wherein the expansions of at least one said spreading sequences comprises obtain a variable spreading factor sequence by forming a set of sequences, wherein sequence of a particular length is constructed by concatenation of a preceding sequence and a corresponding complement wherein said preceding sequence is an element of a corresponding circular shift equivalent set of the circular shift equivalent sets.

34. The system of claim 31, wherein said balanced criteria indicates that a number of zeros in said spreading sequence is equal to a number of non-zeros in said spreading sequence.

35. The system of claim 31, wherein said non-repetition criteria indicates that said spreading sequence cannot be divided into two equal halves with identical elements in each half.

36. The system of claim 31, wherein said non-circular criteria indicates that said spreading sequence cannot be fully comprised of a periodic repetition of other sequences.

37. The system of claim 31, wherein said conjugate criteria indicates that two equal halves of said spreading sequence is complementary to each other.

38. The system of claim 31, wherein said system is further configured to:
  generate all $2^{N/2}$ combinations of N/2 length binary sequences with at least one of alphabets $\{+1, -1\}$ for at least one of said selected spreading sequence with said variable spreading factor of N. wherein said selected spreading sequence has alphabets $\{1, 0\}$;
  generate $2^{N/2}$ combinations of ternary sequences of length N with at least one of alphabets $\{+1, 0, -1\}$ for said selected spreading sequence of length N, wherein said $2^{N/2}$ combinations are generated by substituting positions of N/2 ones in said selected spreading sequence of length N by all $2^{N/2}$ combinations of said N/2 length binary sequences with at least one of alphabets $\{1, -1\}$;
  select a set of sequences with minimum sum of squares of cyclic correlations of said $2^{N/2}$ combinations of said ternary sequences;
  compute a probability of correct detection over a range of SNR values for said set of sequences with minimum sum of squares of said cyclic correlations; and
  select a ternary sequence for which said probability of correct detection is maximum as ternary synchronization preamble.

39. The system of claim 31, wherein said system is further configured to:
  generate a ternary sequence with elements $\{1, 0, -1\}$ of length N from said selected spreading sequence with elements $\{1, 0\}$ of length N;
  generate an PN sequence with elements $\{1,-1\}$ of length N/2−1, wherein said PN sequence is appended with a '−1' to obtain balanced sequences with N/4+1s and N/4−1s;
  create a benchmark ternary sequence by substituting said balanced binary sequence at positions of ones in said selected spreading sequence with elements $\{1, 0\}$, wherein said balanced binary sequence is multiplied with various masking functions and computing all cyclic auto-correlation values of said balanced binary sequence at all lags;
  create unbalanced binary sequences from balanced binary sequences using at least one masking function, wherein said at least one masking function is multiplied with said balanced binary sequences such that number of ones exceed number of zeros;
  create unbalanced ternary sequences from said unbalanced binary sequences by substituting said unbalanced binary sequences with alphabets $\{+1,-1\}$ in positions of ones in said selected N length spreading sequence with elements $\{1, 0\}$ and computing all cyclic auto-correlation values of each sequence of said unbalanced binary sequences at all lags;
  select all ternary sequences from said unbalanced ternary sequences whose maximum out of phase cyclic autocorrelations are less than maximum out of phase cyclic autocorrelations of said benchmark ternary sequence as candidate ternary spreading sequences; and select, from the selected all ternary sequences, at least one said ternary sequences with a probability of correct detection performance satisfying constraints as said candidate ternary spreading sequences for synchronization preamble sequences.

40. A system for selecting an N length ternary sequence with elements {1, 0, −1} from a spreading sequence of length N with elements {1,0}, the system is configured to:

generate all combinations of binary sequences with at least one of alphabets {+1, −1} for said spreading sequence with said variable spreading factor of length N;

generate combinations of ternary sequences of length N with at least one of alphabets {+1, 0, −1} for said spreading sequence of length N, wherein said combinations of ternary sequences are generated by substituting positions of ones in said selected spreading sequence of length N by all combinations of at least one of elements {1, −1};

select a set of sequences with minimum sum of squares of cyclic correlations of all said combinations of said ternary sequences;

compute a probability of correct detection over a range of SNR values for said set of sequences with minimum sum of squares of said cyclic correlations; and select a ternary sequence for which said probability of correct detection is maximum as ternary synchronization preamble.

41. The system of claim 40, wherein said spreading sequence with elements {1, 0} of length N meets a spreading sequence criteria, wherein said spreading sequence criteria comprises a balanced criteria, a non-repetition criteria, a non-circular criteria, and a conjugate criteria.

42. The system of claim 41, wherein said balanced criteria indicates that a number of zeros in said spreading sequence is equal to a number of non-zeros in said spreading sequence.

43. The system of claim 41, wherein said non-repetition criteria indicates that said spreading sequence cannot be divided into two equal halves with identical elements in each half.

44. The system of claim 41, wherein said non-circular criteria indicates that said spreading sequence cannot be fully comprised of a periodic repetition of other sequences.

45. The system of claim 41, wherein said conjugate criteria indicates that two equal halves of said spreading sequence is complementary to each other.

46. The system of claim 40, wherein said spreading sequence is selected from expansions of at least one said spreading sequences from circular shift equivalent sets, wherein said circular shift equivalent sets are obtained by circularly shifting a base sequence with elements {1, 0} based on said variable spreading factor.

47. The system of claim 46, wherein the expansions of at least one said spreading sequences comprises:

obtain a variable spreading factor sequence by selecting one of said sequences from at least one said circular shift equivalent set associated with a lowest spreading factor; and form a set of sequences from said variable spreading factor sequence, wherein larger length sequences in said set are constructed by repeating lowest spreading factor sequence for one half of length of larger sequence and a conjugate of said first half for other half of said larger sequence.

48. The system of claim 46, wherein the expansions of at least one said spreading sequences comprises obtain variable spreading factor sequences by forming a set of sequences, wherein sequence of a particular length is constructed by concatenation of a preceding sequence and a corresponding complement wherein said preceding sequence is an element of a corresponding circular shift equivalent set of the circular shift equivalent sets.

49. A system for selecting an N length ternary sequence with elements {1, 0, −1} from a spreading sequence of length N with elements {1, 0}, the system is configured to:

generate a ternary sequence with elements {1, 0, −1} of length N from said spreading sequence with elements {1, 0} of length N;

generate an PN sequence with elements {1,−1} of length N/2−1, wherein said PN sequence is appended with a '−1' to obtain balanced binary sequences with N/4+1s and N/4−1s;

create a benchmark ternary sequence by substituting said balanced binary sequence at positions of ones in said spreading sequence with elements {1, 0}, wherein said balanced binary sequence is multiplied with various masking functions and computing all cyclic auto-correlation values of said balanced binary sequence at all lags;

create unbalanced binary sequences from balanced binary sequences using at least one masking function, wherein said at least one masking function is multiplied with said balanced binary sequences such that number of ones exceed number of zeros;

create unbalanced ternary sequences from said unbalanced binary sequences by substituting said unbalanced binary sequences with alphabets {+1, −1s} in positions of ones in said selected N length spreading sequence with elements {1, 0} and computing all cyclic auto-correlation values of each sequence of said unbalanced binary sequences at all lags;

select all ternary sequences from said unbalanced ternary sequences whose maximum out of phase cyclic auto-correlations are less than maximum out of phase cyclic autocorrelations of said benchmark ternary sequence as candidate ternary spreading sequences; and select, from the selected all ternary sequences, at least one said ternary sequence with a probability of correct detection performance as said candidate ternary spreading sequences for synchronization preamble sequences.

50. The system of claim 49, wherein said spreading sequence for elements {1, 0} of length N meets a spreading sequence criteria, wherein said spreading sequence criteria comprises a balanced criteria, a non-repetition criteria, a non-circular criteria, and a conjugate criteria.

51. The system of claim 50, wherein said balanced criteria indicates that a number of zeros in said spreading sequence is equal to a number of non-zeros in said spreading sequence.

52. The system of claim 50, wherein said non-repetition criteria indicates that said spreading sequence cannot be divided into two equal halves identical elements in each half.

53. The system of claim 50, wherein said non-circular criteria indicates that said spreading sequence cannot be fully comprised of a periodic repetition of other sequences.

54. The system of claim 50, wherein said conjugate criteria indicates that two equal halves of said spreading sequence is complementary to each other.

55. The system of claim 49, wherein said spreading sequence is selected from expansions of at least one said spreading sequences from circular shift equivalent sets, wherein said circular shift equivalent sets are obtained by circularly shifting a base sequence with elements {1, 0} based on a variable spreading factor.

56. The system of claim 55, wherein the expansions of at least one said spreading sequences comprises:
   obtain a variable spreading factor sequence by selecting one of said sequences from at least one said circular shift equivalent set associated with a lowest spreading factor; and
   form a set of sequences from said variable spreading factor sequence, wherein larger length sequences in said set are constructed by repeating lowest spreading factor sequence for one half of length of larger sequence and a conjugate of said half for other half of said larger sequence.

57. The system of claim 55, wherein the expansions of at least one said spreading sequences comprises obtain variable spreading factor sequences by forming a set of sequences, wherein sequence of a particular length is constructed by concatenation of a preceding sequence and a corresponding complement wherein said preceding sequence is an element of a corresponding circular shift equivalent set of the circular shift equivalent sets.

* * * * *